(12) United States Patent
Mitsuda

(10) Patent No.: US 9,683,348 B2
(45) Date of Patent: Jun. 20, 2017

(54) ENGINE DEVICE

(71) Applicant: YANMAR CO., LTD., Osaka (JP)

(72) Inventor: Masataka Mitsuda, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/773,857

(22) PCT Filed: Mar. 13, 2014

(86) PCT No.: PCT/JP2014/056611
§ 371 (c)(1),
(2) Date: Sep. 9, 2015

(87) PCT Pub. No.: WO2014/142224
PCT Pub. Date: Sep. 18, 2014

(65) Prior Publication Data
US 2016/0024752 A1 Jan. 28, 2016

(30) Foreign Application Priority Data

Mar. 15, 2013 (JP) .................................. 2013-053899
Mar. 15, 2013 (JP) .................................. 2013-053900
Mar. 15, 2013 (JP) .................................. 2013-053901

(51) Int. Cl.
E02F 9/08 (2006.01)
F01N 3/20 (2006.01)
(Continued)

(52) U.S. Cl.
CPC ............ *E02F 9/0866* (2013.01); *B62D 25/12* (2013.01); *B62D 63/02* (2013.01); *B66F 9/075* (2013.01);
(Continued)

(58) Field of Classification Search
CPC ..... B62D 25/10; B62D 25/12; F01N 2340/00; F01N 2340/04; B60K 3/04; B66F 9/075; B66F 9/07527
See application file for complete search history.

(56) References Cited

U.S. PATENT DOCUMENTS 4,090,579 A * 5/1978 Stedman ................ B62D 25/10
180/69.2
5,042,602 A * 8/1991 Nakatani ............... E02F 9/0866
165/41
(Continued)

FOREIGN PATENT DOCUMENTS

EP 1462579 A1 9/2004
EP 2518290 A1 10/2012
(Continued)

Primary Examiner — Brian Swenson
(74) Attorney, Agent, or Firm — Norris McLaughlin & Marcus, P.A.

(57) ABSTRACT

It is a technical problem to provide an engine device that includes an exhaust gas purification device, which can be efficiently arranged in an engine installation space. The engine is arranged on the lower side of an operating seat, and a flywheel housing is arranged in such a manner as to be positioned on the front portion side of a traveling machine body, and the exhaust gas purification device is arranged on the upper side of the rear of the engine. Also, the engine is coupled with an air cleaner that draws in fresh air on the left side thereof. Furthermore, a hood includes a hood cover configured to be openable/closable in the rear thereof and covers the upper portion of the exhaust gas purification device.

9 Claims, 44 Drawing Sheets

(51) Int. Cl.
*F01N 13/18* (2010.01)
*F01N 3/035* (2006.01)
*B66F 9/075* (2006.01)
*B62D 25/12* (2006.01)
*B62D 63/02* (2006.01)
*F01N 3/02* (2006.01)
*F01N 3/021* (2006.01)
*F01N 3/28* (2006.01)
*F01N 3/10* (2006.01)
*F01N 13/00* (2010.01)

(52) U.S. Cl.
CPC ...... *B66F 9/07527* (2013.01); *B66F 9/07595* (2013.01); *E02F 9/0891* (2013.01); *F01N 3/021* (2013.01); *F01N 3/0205* (2013.01); *F01N 3/035* (2013.01); *F01N 3/2066* (2013.01); *F01N 13/18* (2013.01); *F01N 13/1805* (2013.01); *F01N 3/106* (2013.01); *F01N 3/28* (2013.01); *F01N 13/009* (2014.06); *F01N 13/0097* (2014.06); *F01N 2340/04* (2013.01); *F01N 2610/02* (2013.01); *Y02T 10/24* (2013.01)

(56) References Cited

U.S. PATENT DOCUMENTS

| | | | |
|---|---|---|---|
| 5,524,721 A * | 6/1996 | Yamauchi | B60N 2/10 180/69.2 |
| 7,895,829 B2 * | 3/2011 | Suzuki | F01N 3/0821 60/286 |
| 8,857,557 B2 * | 10/2014 | Sakamoto | B60K 11/04 180/296 |
| 2006/0185200 A1 * | 8/2006 | Sugiyama | B62D 25/10 37/466 |
| 2010/0031644 A1 | 2/2010 | Keane et al. | |
| 2010/0178215 A1 | 7/2010 | Honda et al. | |
| 2010/0236855 A1 * | 9/2010 | Matsushita | B62D 25/10 180/69.2 |
| 2012/0247861 A1 | 10/2012 | Mizuno et al. | |
| 2013/0008528 A1 | 1/2013 | Mitsuda et al. | |

FOREIGN PATENT DOCUMENTS

| | | |
|---|---|---|
| JP | 2000-14430 | 5/2000 |
| JP | 2006-168612 | 6/2006 |
| JP | 2007-182705 | 7/2007 |
| JP | 2008-149937 | 7/2008 |
| JP | 2010-071177 A | 4/2010 |
| JP | 2010-096153 | 4/2010 |
| JP | 2010090788 A | 4/2010 |
| JP | 2010166878 A | 8/2010 |
| JP | 2012246771 A | 12/2012 |
| WO | 2008-240695 A | 10/2008 |
| WO | 2009/041104 A1 | 4/2009 |
| WO | WO-2010/032646 | 3/2010 |
| WO | WO-2011/118527 | 9/2011 |
| WO | WO-2011/129030 | 10/2011 |
| WO | WO-2011/152306 | 12/2011 |

* cited by examiner

ENGINE DEVICE

TECHNICAL FIELD

The present invention of the instant application relates to an engine device such as a diesel engine in which an exhaust gas purification device is provided, and more specifically relates to an engine device mounted on a work machine, for example, a wheel loader, a backhoe, or a forklift car.

BACKGROUND OF THE INVENTION

There has conventionally been developed a technology that an exhaust gas purification device (diesel particulate filter) is provided in the exhaust path of an engine, and the exhaust gas discharged from a diesel engine is purified and treated by means of the oxidation catalyst of the exhaust gas purification device or a soot filter (for example, see Patent Literature 1). Also, in recent years, in the fields of work machines such as a construction machine or an agricultural machine, it has been demanded that the exhaust gas purification device is provided in the diesel engine used in the aforementioned machines, in view of environmental countermeasures (for example, see Patent Literature 2).

CITATION LIST

PTL 1: Japanese Unexamined Patent Application Publication No. 2000-145430
PTL 2: Japanese Unexamined Patent Application Publication No. 2007-182705

SUMMARY OF THE INVENTION

Incidentally, when the exhaust gas purification device is provided, and the exhaust gas purification device is merely arranged in the exhaust path of the engine in place of a silencer (muffler), the exhaust gas purification device is markedly heavy, compared with the silencer. Accordingly, even when the supporting structure of the silencer in the construction machine disclosed in Patent Literature 2 is applied to the supporting structure of the exhaust gas purification device, there is a problem in that the exhaust gas purification device cannot be stably assembled. In particular, regarding the work machine such as the wheel loader, the miniaturization of a travelling machine body itself is demanded, in order to reduce its turning radius for the purpose of prevention of contact with the periphery, so that the installation space of the engine is limited.

Also, the construction machine disclosed in Patent Literature 2 is provided as one that supports the silencer with the engine. However, when the exhaust gas purification device is arranged in the installation space of the engine and placed in close proximity of the engine, the high-frequency vibration of the engine is transmitted to the exhaust gas purification device, there is apprehension that it is likely that the exhaust gas purification device is damaged.

On the other hand, when the exhaust gas purification device is arranged apart from the engine in order to suppress the influence of the high-frequency vibration of the engine, the distance from the exhaust manifold of the engine to the exhaust gas purification device is extended. Accordingly, the temperature of the exhaust gas flown into the exhaust gas purification device is reduced, particulate matter included in the exhaust gas is not sufficiently combusted and removed, but accumulated in the exhaust gas purification device, and as a result, there is a problem in that the reduction in the engine output is caused.

Accordingly, it is an object of the present invention of the instant application to provide an engine device, in which improvements are made in the light of such current circumstances.

The present invention may be such that an engine device is configured to be mounted on a work machine in which an operating seat is arranged on a hood provided in a rear of a travelling machine body, and an engine is arranged in the hood, and the engine device includes an exhaust gas purification device configured to purify and treat exhaust gas of the engine, and a protrusion cover portion in which a rear side of the maneuvering seat on the hood protrudes upward, wherein the protrusion cover portion is configured to be openable/closable, and the exhaust gas purification device is arranged in the protrusion cover portion.

With respect to the engine device, the present invention may be such that the exhaust gas purification device is arranged above the engine in such a manner that a transfer direction of the exhaust gas is orthogonal to a longitudinal direction of an output shaft of the engine, wherein the exhaust gas purification device is coupled with a machine body frame of the travelling machine body.

With respect to the engine device, the present invention may be such that the exhaust gas purification device is arranged above the engine in such a manner that a transfer direction of the exhaust gas is orthogonal to a longitudinal direction of an output shaft of the engine, wherein the exhaust gas purification device is coupled with a cylinder head of the engine.

With respect to the engine device, the present invention may be such that an exhaust gas inlet side of the exhaust gas purification device is connected to an exhaust manifold of the engine via an exhaust connecting pipe, wherein an exhaust temperature increasing mechanism configured to increase a temperature of the exhaust gas leading to the exhaust gas purification device is provided in a midway portion of the exhaust connecting pipe.

With respect to the engine device, the present invention may be such that the exhaust gas purification device is configured to include a first purification device that removes particulate matter in the exhaust gas of the engine, and a second purification device that removes nitrogen oxides in the exhaust gas of the engine.

With respect to the engine device, the present invention may be such that the first and second purification devices are arranged parallel to each other in such a manner that a transfer direction of the exhaust gas is oriented along a right-and-left direction in a rear of the maneuvering seat.

With respect to the engine device, the present invention may be such that it is constituted that the exhaust gas circulates from the first purification device to the second purification device, wherein a reducing agent mixing pipe that connects an exhaust gas outlet pipe of the first purification device to an exhaust gas inlet pipe of the second purification device is provided in such a manner that respective transfer directions of the exhaust gas in the first purification device and the second purification device are identical, and wherein it is constituted that a reducing agent is injected into the reducing agent mixing pipe.

With respect to the engine device, the present invention may be such that an exhaust gas inlet side of the exhaust gas purification device is connected to an exhaust manifold of the engine via an exhaust connecting pipe, wherein an exhaust temperature increasing mechanism configured to increase a temperature of the exhaust gas leading to the exhaust gas purification device is provided in a midway portion of the exhaust connecting pipe.

The present invention may be such that an engine device is configured to be mounted on a work machine in which an operating seat is arranged on a hood provided in a rear of a travelling machine body, and an engine is arranged in the hood, and the engine device includes an exhaust manifold configured to be provided on one right-and-left lateral surface of the engine and configured to include an exhaust gas outlet above, and an exhaust gas purification device configured to be supported above the exhaust manifold and configured to purify exhaust gas of the engine by coupling an exhaust gas outlet side of the exhaust manifold with an exhaust gas inlet side of the exhaust manifold, wherein the exhaust gas purification device is arranged parallel to one lateral surface of the engine between a head cover of the engine and one right-and-left inner lateral surface of the hood.

With respect to the engine device, the present invention may be such that the exhaust gas purification device is supported by support bodies coupled with a cylinder head of the engine, wherein the support bodies are a first bracket leg fixed on a side of a cooling fan of the engine and a second bracket leg fixed on a side of a flywheel housing of the engine, and wherein the second bracket leg supports an upstream side in a transfer direction of the exhaust gas in the exhaust gas purification device, and the first bracket leg supports a downstream side in the transfer direction of the exhaust gas in the exhaust gas purification device, and wherein the exhaust gas purification device couples with the exhaust manifold at a position between the first bracket leg and the second bracket leg.

According to the present invention of the instant application, the engine device is configured to be mounted on a work machine in which the maneuvering seat is arranged on the hood provided in the rear of the travelling machine body, and the engine is arranged in the hood, and the engine device includes the exhaust gas purification device configured to purify and treat exhaust gas of the engine, and the protrusion cover portion in which the rear side of the maneuvering seat on the hood protrudes upward, wherein the protrusion cover portion is configured to be openable/closable, and the exhaust gas purification device is arranged in the protrusion cover portion, so that a degree of freedom regarding the layout of the engine and the exhaust gas purification device, by extension, a degree of freedom of design can be improved, and the engine and the exhaust gas purification device can be mounted with sufficient space in the hood. Moreover, the exhaust gas purification device is covered by the protrusion cover portion, so that the reduction of the temperature of the exhaust gas purification device, which is attributed to wind, rain, and the like, can be suppressed, and the appropriate temperature of the exhaust gas purification device is easily maintained. The risk that the operator comes in contact with the exhaust gas purification device can be reduced. Furthermore, when the protrusion cover portion is opened, the upper side in the rear of the engine is released, which facilitates access to the exhaust gas purification device, so that the maintenance work is easily performed.

According to the present invention of the instant application, the exhaust gas purification device is arranged above the engine in such a manner that the transfer direction of the exhaust gas is orthogonal to the longitudinal direction of an output shaft of the engine, wherein the exhaust gas purification device is coupled with the machine body frame of the travelling machine body, so that the exhaust gas purification device, which a heavy object, can be supported with high rigidity by coupling the exhaust gas purification device with the machine body frame, which is the intensity member of the travelling machine body and the vibration system being different from the engine. The transmission of vibration from the engine to the exhaust gas purification device can be suppressed, and the exhaust gas purification device can be protected from the vibration of the engine, and the improvement of durability or the enhancement of longevity of the exhaust gas purification device can be achieved.

According to the present invention of the instant application, the exhaust gas inlet side of the exhaust gas purification device is connected to the exhaust manifold of the engine via the exhaust pipe, and part of the exhaust pipe is constituted by the flexible pipe, so that load applied on the exhaust pipe that connects the engine and the exhaust gas purification device, each of which belongs to a different vibration system, can be absorbed by the flexible pipe, and the damage of the exhaust pipe can be prevented. The direct transmission of vibration from the engine to the exhaust gas purification device via the exhaust pipe can be prevented, and the exhaust gas purification device can be protected from the vibration of the engine, and high effects in terms of the improvement of durability or the enhancement of longevity of the exhaust gas purification device can be exerted.

According to the present invention of the instant application, the exhaust gas purification device is arranged above the engine in such a manner that the transfer direction of the exhaust gas is orthogonal to the longitudinal direction of the output shaft of the engine, and the exhaust gas purification device is coupled with the cylinder head of the engine, so that the exhaust gas purification device can be integrally assembled with the engine, and therefore the exhaust gas purification device assembled with the engine can be shipped at an engine assembly plant.

According to the present invention of the instant application, the exhaust gas inlet side of the exhaust gas purification device is connected to the exhaust manifold of the engine via the exhaust connecting pipe, and the exhaust temperature increasing mechanism configured to increase the temperature of the exhaust gas leading to the exhaust gas purification device is provided in the midway portion of the exhaust connecting pipe, so that, even when the exhaust gas purification device is arranged apart from the engine, the positive increase in temperature of the exhaust gas by means of the exhaust temperature increasing mechanism can suppress the accumulation of the particulate matter in the exhaust gas purification device.

According to the present invention of the instant application, the exhaust gas purification device is configured to include the first purification device that removes particulate matter in the exhaust gas of the engine, and the second purification device that removes nitrogen oxides in the exhaust gas of the engine, so that a degree of freedom regarding the layout of the engine, the first purification device, and the second purification device, by extension, a degree of freedom of design can be improved, and the engine can be mounted with sufficient space in the hood.

According to the present invention of the instant application, the engine device is configured to be mounted on the work machine in which the maneuvering seat is arranged on the hood provided in the rear of the travelling machine body, and the engine is arranged in the hood, and the engine device includes the first purification device that removes particulate matter in the exhaust gas of the engine, and the second purification device that removes nitrogen oxides in the exhaust gas of the engine, and the first and second purification devices are arranged parallel to each other in such a manner that the transfer direction of the exhaust gas is oriented along the right-and-left direction in the rear of the maneuvering seat, so that a degree of freedom regarding the layout of the engine, the first purification device, and the second purification device, by extension, a degree of freedom of design can be improved, and the engine can be mounted with sufficient space in the hood.

According to the present invention of the instant application, the protrusion cover portion, in which the rear side of the maneuvering seat on the hood protrudes upward, is included, and the protrusion cover portion is configured to be openable/closable, and the first and second purification devices are arranged in the protrusion cover portion, so that the exhaust gas purification device, which a heavy object, can be supported with high rigidity by coupling the exhaust gas purification device with the machine body frame, which is the intensity member of the travelling machine body and the vibration system being different from the engine. The transmission of vibration from the engine to the exhaust gas purification device can be suppressed, and the exhaust gas purification device can be protected from the vibration of the engine, and the improvement of durability or the enhancement of longevity of the exhaust gas purification device can be achieved.

According to the present invention of the instant application, it is constituted that the exhaust gas circulates from the first purification device to the second purification device, and the reducing agent mixing pipe that connects the exhaust gas outlet pipe of the first purification device to the exhaust gas inlet pipe of the second purification device is provided in such a manner that respective transfer directions of the exhaust gas in the first purification device and the second purification device are identical, and it is constituted that a reducing agent is injected into the reducing agent mixing pipe, so that the reducing agent and the exhaust gas can be sufficiently mixed in the exhaust connecting pipe through the effective use of a relatively long distance existed between the exhaust gas outlet side of the first purification device and the exhaust gas inlet side of the second purification device.

According to the present invention of the instant application, the exhaust gas inlet side of the exhaust gas purification device is connected to the exhaust manifold of the engine via the exhaust connecting pipe, and the exhaust temperature increasing mechanism configured to increase the temperature of the exhaust gas leading to the exhaust gas purification device is provided in the midway portion of the exhaust connecting pipe, so that, even when the exhaust gas purification device is arranged apart from the engine, the positive increase in temperature of the exhaust gas by means of the exhaust temperature increasing mechanism can suppress the accumulation of the particulate matter in the exhaust gas purification device.

According to the present invention of the instant application, the engine device is configured to be mounted on a work machine in which the maneuvering seat is arranged on the hood provided in the rear of the travelling machine body, and the engine is arranged in the hood, and the engine device includes the exhaust manifold configured to be provided on one right-and-left lateral surface of the engine and configured to include the exhaust gas outlet above, and the exhaust gas purification device configured to be supported above the exhaust manifold and configured to purify the exhaust gas of the engine by coupling the exhaust gas outlet side of the exhaust manifold with the exhaust gas inlet side of the exhaust manifold, wherein the exhaust gas purification device is arranged parallel to one lateral surface of the engine between the head cover of the engine and one right-and-left inner lateral surface of the hood, so that the exhaust gas purification device can be firmly coupled with the exhaust manifold being a high rigidity member as one of constituent components of the engine 1, and the damage of the exhaust gas purification device due to the vibration of the engine can be prevented. Then, the exhaust gas purification device can be communicated with the exhaust manifold of the engine at point-blank range, so that the appropriate temperature in the exhaust gas purification device is easily maintained, and the high exhaust gas purification capacity can be maintained. Also, a dead space between the head cover of the engine and the one right-and-left inner lateral surface of the hood can be effectively utilized as the installation space of the exhaust gas purification device, and the efficiency of utilization of the internal space of the hood can be improved. Furthermore, the exhaust gas purification device incorporated in the engine at a manufacturing plant of the engine can be shipped.

According to the present invention of the instant application, it is constituted that the exhaust gas purification device is supported by support bodies coupled with the cylinder head of the engine, so that the exhaust gas purification device is stably coupled and supported by the exhaust manifold and the cylinder head, which are the high-rigidity components. Accordingly, the prevention of the damage of the exhaust gas purification device due to the vibration of the engine or the like can be achieved.

According to the present invention of the instant application, it is constituted that the support bodies are the first bracket leg fixed on the side of the cooling fan of the engine and the second bracket leg fixed on the side of the flywheel housing of the engine, and the first bracket leg supports the upstream side in the transfer direction of the exhaust gas in the exhaust gas purification device, and the first bracket leg supports the downstream side in the transfer direction of the exhaust gas in the exhaust gas purification device, so that the upstream side and the downstream side of the exhaust gas purification device can be stably supported by the cylinder head, which is the high-rigidity component. That is, regarding the cylindrical exhaust gas purification device for which the transfer direction of the exhaust gas is the longitudinal direction, the bilateral end portions in the longitudinal direction are supported by the first and second bracket legs, so that the arrangement of the exhaust gas purification device with respect to the engine can be achieved with high stability.

According to the present invention of the instant application, it is constituted that the exhaust gas purification device couples with the exhaust manifold at a position between the first bracket leg and the second bracket leg, so that the exhaust gas purification device can be supported at three points with respect to the transfer direction of the exhaust gas therein. Accordingly, regarding the cylindrical exhaust gas purification device for which the transfer direction of the exhaust gas is the longitudinal direction, the coupling and fixation with the engine can be achieved with higher stability.

According to the present invention of the instant application, the exhaust gas purification device includes a gas purification body configured to purify the exhaust gas discharged from the engine, a purification casing configured to store the gas purification body, an exhaust gas inlet pipe configured to communicate with an exhaust gas inflow port of the purification casing and configured to be connected to an exhaust gas outlet side of the exhaust manifold, and an exhaust gas outlet pipe configured to communicate with an exhaust gas outflow port of the purification casing, and it is constituted that a portion extended along the purification casing on the pipe wall of the exhaust gas inlet pipe is inclined in such a manner as to come close to the outer lateral surface of the purification casing in leading from the exhaust gas inlet side to the exhaust gas outlet side of the exhaust gas inlet pipe, so that the purification casing can be warmed by the exhaust gas in the exhaust gas inlet pipe (in the introduction path), and the reduction of the temperature of the exhaust gas passing through the purification casing can be suppressed. Accordingly, the exhaust gas purification capacity of the exhaust gas purification device can be improved. The inclined shape of a portion extended along the purification casing on the pipe wall can be used as a guide surface that transfers the exhaust gas to the exhaust gas inflow port. The exhaust gas inlet pipe can be utilized as the intensity member of the purification casing, and the improvement of the rigidity of the purification casing can be achieved with simple constitution without increasing the thickness of the purification casing or without increasing the number of components to an extreme degree, so that the exhaust gas from the engine can be smoothly guided into the purification casing by the inclined shape of the portion extended along the purification casing on the pipe wall. The exhaust gas can be supplied to the wide area of the gas purification body in the purification casing, which contributes to the efficient application of the gas purification body.

DESCRIPTION OF THE PREFERRED EMBODIMENTS

Figure 1:
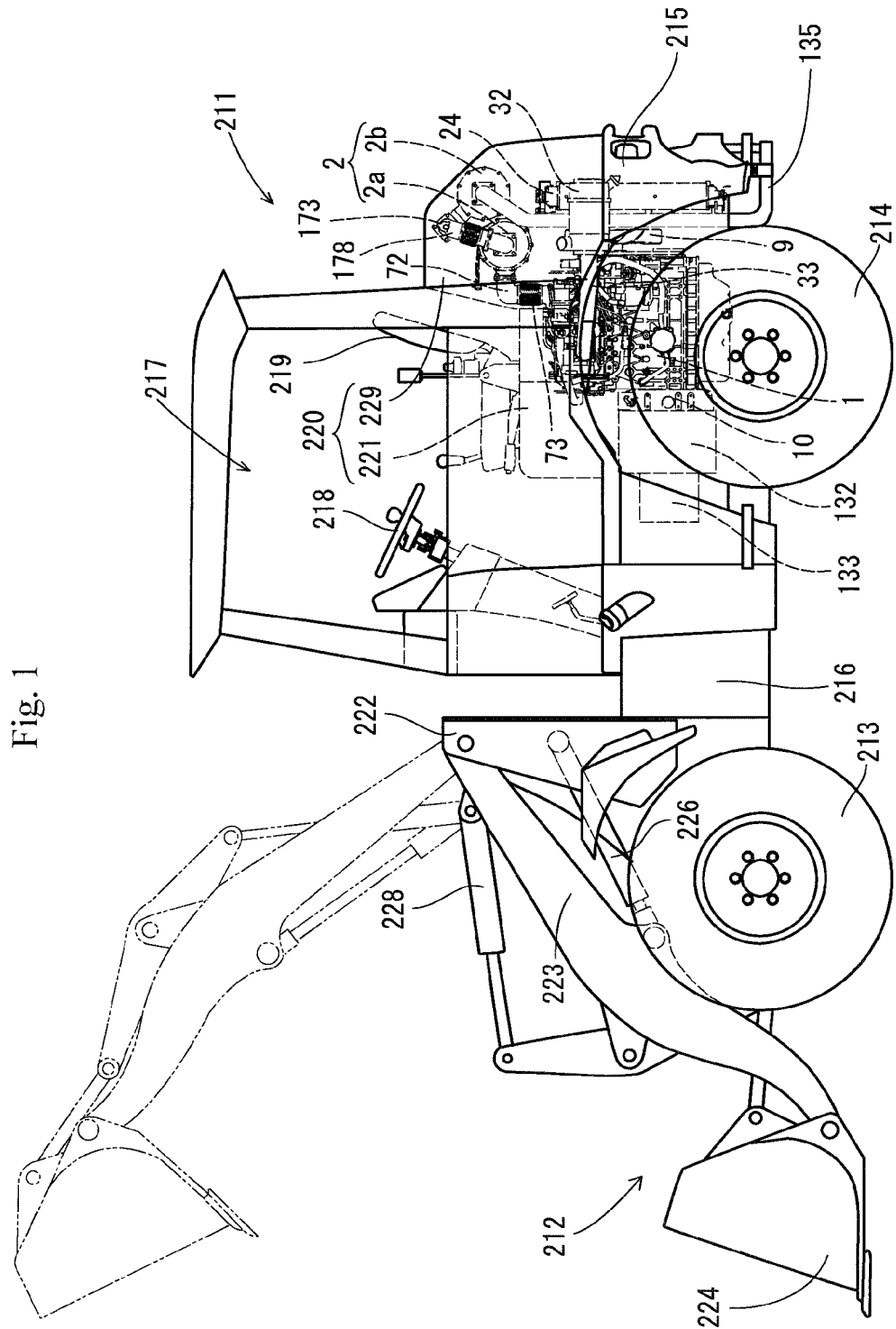
FIG. 1 is a left side view of a wheel loader, which is one example of a work machine of a first embodiment of the present invention of the instant application.
Figure 2:
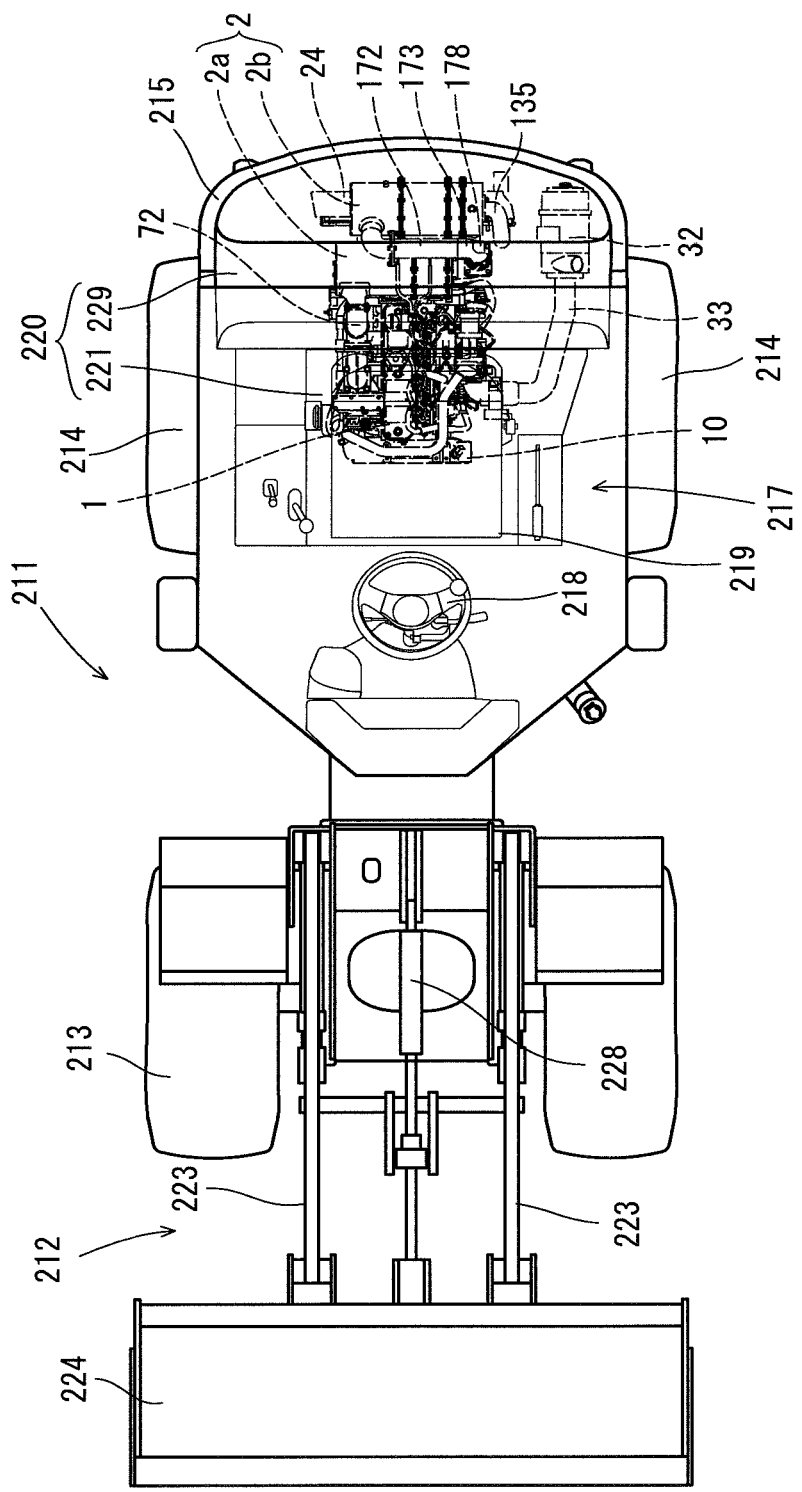
FIG. 2 is a plan view of the wheel loader illustrated in FIG. 1.
Figure 3:
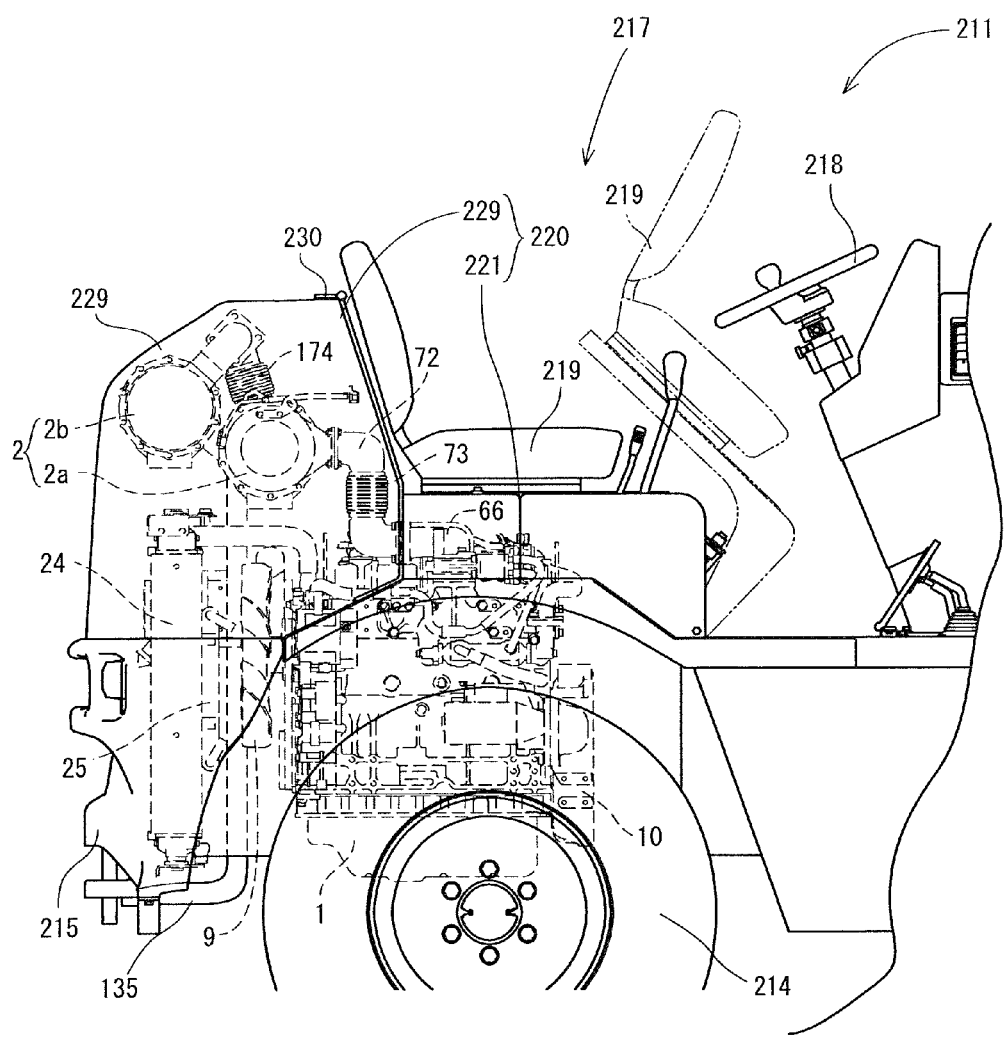
FIG. 3 is an enlarged view of the right lateral surface of the wheel loader illustrated in FIG. 1 to describe the rotation of a sheet.
Figure 4:
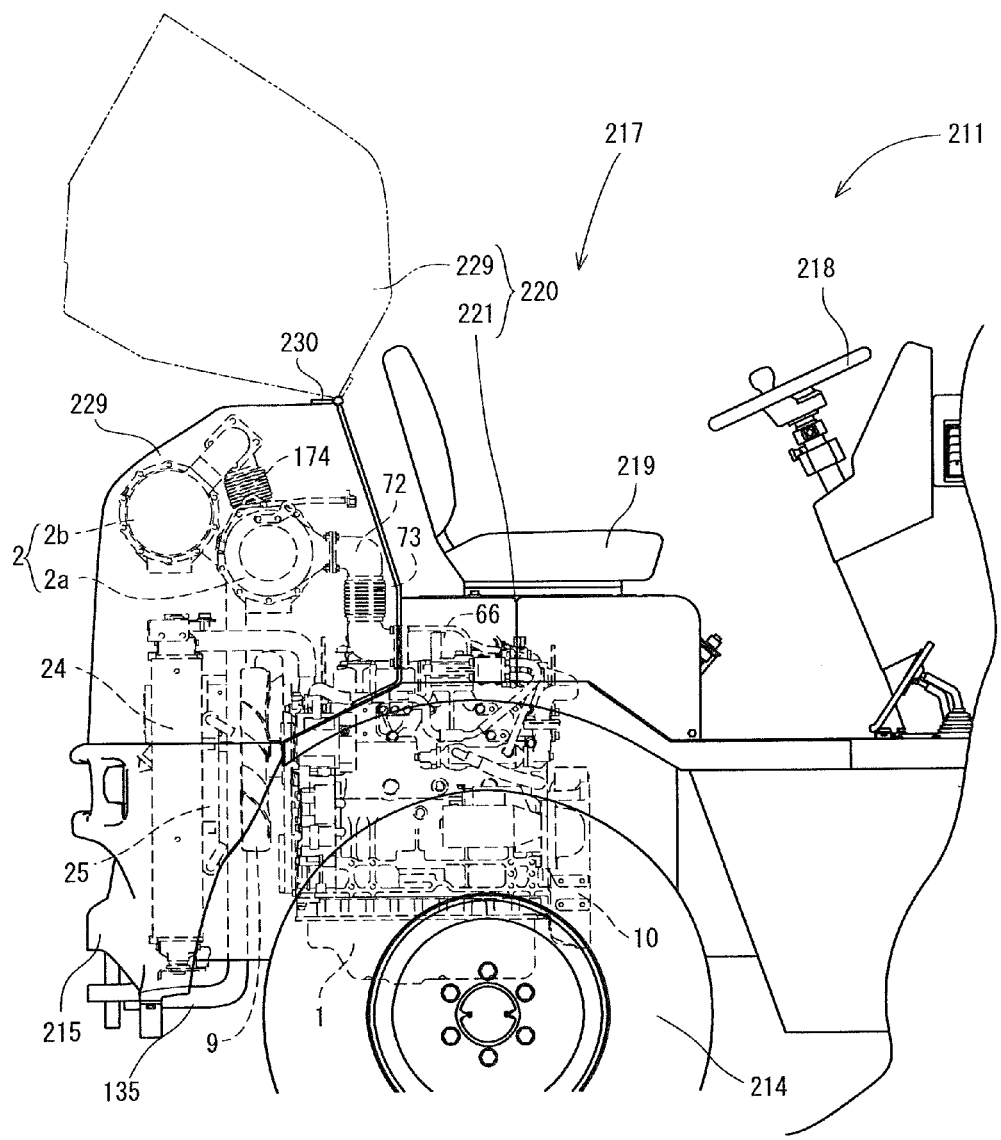
FIG. 4 is an enlarged view of the right lateral surface of the wheel loader illustrated in FIG. 1 to describe the rotation of a hood cover.

Hereinafter, the embodiment (first embodiment) of an engine device of the present invention of the instant application and a work machine that includes the engine device will be described based on drawings with reference to FIGS. 1 to 9. It is noted that, hereinafter, as a work machine in the present embodiment, a wheel loader that includes a loader device as a work unit is exemplified, and the constitution thereof will be described in detail.

A wheel loader 211 illustrated in FIGS. 1 to 4 includes a travelling machine body 216 that includes a pair of right and left front wheels 213 and a pair of right and left rear wheels 214. An operating unit 217 and an engine 1 are mounted on the travelling machine body 216. A loader device 212, which is a work unit, is mounted at the front-side portion of the travelling machine body 216 and is configured to be capable of performing a loader work. An operating seat 219 that an operator takes, a steering wheel 218, an operating means for operating the output of the engine 1 and the like, levers or switches as an operating means for the loader device 212 are arranged in the operating unit 217.

As described above, the loader device 212, which is a work unit, is provided on the front portion of the wheel loader 211 and above the front wheels 213. The loader device 212 includes loader posts 222 arranged on the both right and left sides of the travelling machine body 216, a pair of right and left lift arms 223 coupled with the upper end of each loader post 222 in a swingable manner upward and downward, and a bucket 224 coupled with the tip end portion of the right and left lift arms 223 in a swingable manner upward and downward.

Each lift cylinder 226 for swinging the lift arm 223 upward and downward is provided between the each loader post 222 and the corresponding lift arm 223. A bucket cylinder 228 for swinging the bucket 224 upward and downward is provided between the bucket 224 and the right and left lift arms 223. In this case, it is configured to carry out the loader work in such a manner that the operator in the maneuvering seat 219 operates a loader lever (not illustrated), thereby extending and contracting the lift cylinders 226 or the bucket cylinder 228 and swinging the lift arms 223 or the bucket 224 upward and downward.

In the wheel loader 211, the engine 1 is arranged on the lower side of the maneuvering seat 219, and a flywheel housing 10 is arranged in such a manner as to be positioned on the front portion side of the travelling machine body 216. That is, regarding the engine 1, the engine 1 is arranged in such a manner that the output shaft of the engine is oriented along the front-and-back direction that the loader device 212 and a counter weight 215 are placed side by side. Then, in the rear of the engine 1, a radiator 24 is arranged on the rear side of the front surface of a cooling fan 9, and an exhaust gas purification device 2 is arranged above the cooling fan 9 and the radiator 24.

The exhaust gas purification device 2 is constituted such that a first purification device 2a as a diesel particulate (DPF) and a second purification device 2b as a urea selective catalyst reduction (SCR) system are coupled in series. Then, the first purification device 2a and the second purification device 2b are installed in such a manner that the transfer direction of the exhaust gas flowing through the interior thereof is parallel to the right-and-left direction. In this case, the first purification device 2a and the second purification device 2b are arranged parallel to each other, and the outlet side of the first purification device 2a and the inlet side of the second purification device 2b are connected via a urea mixing pipe 172.

Also, above the engine 1, the first purification device 2a is arranged on the side (front side) of the engine 1, and the second purification device 2b is arranged on the side (rear side) of the radiator 24. Then, the first purification device 2a and the second purification device 2b are installed in such a manner that the transfer directions of the exhaust gas therein are the same, whereas the urea mixing pipe 172 is installed in such a manner that the exhaust gas therein flows in the reverse direction of the exhaust gas flowing through the first purification device 2a and the second purification device 2b. That is, the exhaust gas purification device 2 is constituted such that the first purification device 2a and the second purification device 2b are coupled via the urea mixing pipe 172, so that the exhaust gas purification device 2 is formed in an approximately S shape.

Accordingly, the exhaust gas discharged from the engine 1, first, flows through the first purification device 2a from the right side to the left side, and particulate matter (PM) is removed. The exhaust gas evacuated from the first purification device 2a flows through the urea mixing pipe 172 from the left side to the right side, and is mixed with ammonia generated by urea water injected in the pipe, and flows into the second purification device 2b. Then, in the second purification device 2b, the exhaust gas mixed with ammonia flows from the right side to the left side, and nitrogen oxides (NOx) in the exhaust gas is reduced. The exhaust gas purified by the exhaust gas purification device 2 is discharged from a tail pipe 135 connected to the exhaust side of the second purification device 2b to outside air.

Also, the engine 1 is coupled with an air cleaner 32 that draws in fresh air (outside air) on the left side thereof. The air cleaner 32 is arranged at a position apart from the exhaust gas purification device 2, which is heated by waste heat based on the exhaust gas, in the rear on the left side of the engine 1. That is, the air cleaner 32 is arranged at a position where the air cleaner 32 is not affected by the heat from the exhaust gas purification device 2, on the left side of the radiator 24 in the rear of the engine 1. Accordingly, the air cleaner 32, which is constituted of resin molding and susceptible to heat, can be suppressed from being affected or deformed due to the waste heat based on the exhaust gas passing through the exhaust gas purification device 2.

Thus, the engine 1, the exhaust gas purification device 2, the radiator 24, and the air cleaner 32, which are arranged on the lower side and the rear of the maneuvering seat 219, are covered with a hood 220 arranged on the upper side of the counter weight 215. Regarding the hood 220, the rear portion of the operating unit 217 is configured to be openable/closable, and a portion in the operating unit 217 is configured to serve as a sheet frame 221 protruded from the floor surface of the operating unit 217.

The maneuvering seat 219 is detachably installed on the upper side of the sheet frame 221 of the hood 220. Accordingly, when the maneuvering seat 219 is detached from the sheet frame 221, the upper surface of the sheet frame 221 is opened, which makes it possible to perform maintenance for the engine 1 on the lower side of the sheet frame 221 and the like. It is noted that the present invention is not limited to the constitution in which the maneuvering seat 219 is detachable, but may apply one wherein the maneuvering seat 219 is tilted to the front side above the sheet frame 221, which allows the upper surface of the sheet frame 221 to be opened. In this time, as the example illustrated in FIG. 3, it may be such that the sheet frame 221 itself, to which the maneuvering seat 219 is fixedly installed, is tilted to the front side, so that the upper side of the engine 1 and the like are opened.

In contrast, in the rear of the sheet frame 221, the hood 220 includes a hood cover (protrusion cover portion) 229 protruded upward with respect to the upper surface of the sheet frame 221. The hood cover 229 is arranged on the upper side of the counter weight 215, thereby covering the exhaust gas purification device 2 arranged in the rear of the engine 1, and is configured to be openable/closable. That is, as the example illustrated in FIG. 4, it may be such that a hinge portion 230 arranged on the upper side of the front of the hood cover 229 is configured to pivotally support the hood cover 229 in a rotatable manner, and the hood cover 229 is rotated upward on the front side, which opens the upper side in the rear of the engine 1. In this time, it may be configured such that the hood cover 229 is coupled with the travelling machine body 216 via a hydraulic damper and the like, so that when the hood cover 229 is opened, the hood cover 229 is supported.

The hood 220 includes the hood cover 229 that is openable and closable in the rear thereof, so that when the hood cover 229 is closed, the hood cover 229 covers the exhaust gas purification device 2 arranged on the upper side in the rear of the engine 1. Accordingly, the reduction of the temperature of the exhaust gas purification device 2, which is attributed to wind, rain, and the like, can be suppressed, and the appropriate temperature of the exhaust gas purification device 2 is easily maintained. Also, the risk that the operator comes in contact with the exhaust gas purification device 2 can be reduced. On the other hand, when the hood cover 229 is opened, the upper side in the rear of the engine 1 is left open, which facilitates access to the exhaust gas purification device 2 arranged on the upper side in the rear of the engine 1, so that the maintenance work is easily performed.

Regarding the engine 1, a mission case 132 is coupled with the front surface side of the flywheel housing 10. The power transmitted from the engine 1 to a flywheel 11 is appropriately shifted by the mission case 132 and transmitted to a hydraulic drive source 133 such as the front wheels 213, the rear wheels 214, the lift cylinders 226, and the bucket cylinder 228.

Next, regarding the engine device of the present invention of the instant application, the diesel engine 1 mounted as a power engine in the work machine such as the aforementioned wheel loader 211 is exemplified and described referring to FIGS. 5 to 9. As described above, the diesel engine 1 includes the exhaust gas purification device 2 constituted by the first purification device 2a and the second purification device 2b. The first purification device 2a in the exhaust gas purification device 2 has a function of removing the particulate matter (PM) in the exhaust gas of the diesel engine 1 and a function of reducing carbon monoxide (CO) or hydrogen carbon (HC) in the exhaust gas of the diesel engine 1. In contrast, the second purification device 2b has a function of reducing the nitride oxides (NOx) in the exhaust gas of the diesel engine 1.

The diesel engine 1 includes a cylinder block 4 that incorporates the crankshaft 3 for the output of the engine and pistons (not illustrated). A cylinder head 5 is placed on the cylinder block 4. An intake manifold 6 is arranged on the left-side surface of the cylinder head 5. An exhaust manifold 7 is arranged on the right-side surface of the cylinder head 5. A head cover 8 is arranged on the upper-side surface of the cylinder head 5. The cooling fan 9 is provided on the rear-side surface of the cylinder block 4. The flywheel housing 10 is provided on the front-side surface of the cylinder block 4. The flywheel 11 is arranged in the flywheel housing 10.

The flywheel 11 is pivotally supported on the crankshaft 3 (engine output shaft). The power of the diesel engine 1 is configured to be taken out into the operating unit of a work vehicle (the backhoe, a forklift, and the like) via the crankshaft 3. Also, an oil pan 12 is arranged on the lower surface of the cylinder block 4. The lubricating oil in the oil pan 12 is supplied to each lubricating unit of the diesel engine 1 via an oil filter 13 arranged on the lateral surface of the cylinder block 4.

A fuel supply pump 14 for supplying fuel is mounted above the oil filter 13 (below the intake manifold 6) on the lateral surface of the cylinder block 4. Injectors 15 for four cylinders, each of which includes a fuel injection valve (not illustrated) of an electromagnetic opening/closing control type, are provided in the diesel engine 1. Each injector 15 is connected to a fuel tank (not illustrated) mounted on the work vehicle via the fuel supply pump 14, a cylindrical common rail 16, and a fuel filter (not illustrated).

The fuel in the fuel tank is pressure-fed from the fuel supply pump 14 to the common rail 16, and high-pressure fuel is accumulated in the common rail 16. The fuel injection valve of each injector 15 is controlled in such a manner as to be opened and closed, the high-pressure fuel in the common rail 16 is injected from each injector 15 to each cylinder of the diesel engine 1.

A coolant pump 21 for coolant circulation is arranged coaxially with the fan axis of the cooling fan 9 at a section in proximity of the left on the front surface of the cylinder block 4. The coolant pump 21 along with the cooling fan 9 is driven by the rotation of the crankshaft 3 via a V belt 22 for driving the cooling fan. The coolant in the radiator 24 mounted on the work vehicle is supplied to the coolant pump 21 by means of the drive of the coolant pump 21. Then, the coolant is supplied to the cylinder block 4 and the cylinder head 5, thereby cooling the diesel engine 1. It is noted that an alternator 23 is provided on the left side of the coolant pump 21.

Engine leg mounting units 19 are respectively provided on the right and left lateral surfaces of the cylinder block 4. In each engine leg mounting unit 19, an engine leg body 34 that includes a vibration-proof rubber 35 and is coupled with the right and left lateral walls of a machine body frame 94 is fastened with bolts. The diesel engine 1 is supported in a vibration-isolating manner on the machine body frame 94 of the travelling machine body 216 of the work vehicle such as the aforementioned wheel loader 211 via each engine leg body 34. Accordingly, the vibration of the diesel engine 1 can be prevented from being transmitted to the machine body frame 94.

Furthermore, an EGR device 26 (exhaust gas recirculation device) will be described. The air cleaner 32 is coupled with the inlet port of the intake manifold 6 protruded upward via the EGR device 26 (exhaust gas recirculation device). Fresh air (outside air) is transferred from the air cleaner 32 to the intake manifold 6 via the EGR device 26.

The EGR device 26 includes an EGR main body case 27 (collector) that mixes the part of the exhaust gas (EGR gas from the exhaust manifold) of the diesel engine with the fresh air (outside air from the air cleaner 32) and supplies the mixed air to the intake manifold 6, an intake throttle member 28 through which the EGR main body case 27 communicates with the air cleaner 32 via an intake pipe 33, a recirculation exhaust gas pipe 30 connected to the exhaust manifold 7 via an EGR cooler 29 as a return pipeline, and an EGR valve member 31 through which the EGR main body case 27 communicates with the recirculation exhaust gas pipe 30.

That is, the intake manifold 6 and the intake throttle member 28 for introducing the fresh air are connected via the EGR main body case 27. Then, the EGR main body case 27 communicates with the outlet side of the recirculation exhaust gas pipe 30 extended from the exhaust manifold 7. The EGR main body case 27 is formed in a long cylindrical shape. The intake throttle member 28 is fastened with bolts to one end portion in the longitudinal direction of the EGR main body case 27. The downward opening end portion of the EGR main body case 27 is detachably fastened with bolts to the inlet port of the intake manifold 6.

Also, the outlet side of the recirculation exhaust gas pipe 30 is coupled with the EGR main body case 27 via the EGR valve member 31. The inlet side of the recirculation exhaust gas pipe 30 is coupled with the lower surface side of the exhaust manifold 7 via the EGR cooler 29. The opening degree of the EGR valve (not illustrated) in the EGR valve member 31 is adjusted, thereby adjusting the amount of EGR gas supplied to the EGR main body case 27.

With the aforementioned constitution, the fresh air (outside air) is supplied from the air cleaner 32 into the EGR main body case 27 via the intake throttle member 28, whereas the EGR gas (part of the exhaust gas discharged from the exhaust manifold) is supplied from the exhaust manifold 7 into the EGR main body case 27 via the EGR valve member 31. After the fresh air from the air cleaner 32 and the EGR gas from the exhaust manifold 7 are mixed in the EGR main body case 27, the mixed gas in the EGR main body case 27 is supplied to the intake manifold 6. That is, part of the exhaust gas discharged from the diesel engine 1 to the exhaust manifold 7 is returned from the intake manifold 6 to the diesel engine 1, so that the maximum combustion temperature during high-load operations is reduced, and the amount of NOx (nitride oxides) discharged from the diesel engine 1 is reduced.

The radiator 24 is arranged at a position opposite to the cooling fan 9 via a fan shroud (not illustrated) in the rear of the diesel engine 1. The radiator 24 is coupled with the right and left lateral wall portions of the machine body frame 94 via an upper support bracket 57 that includes a vibration-proof rubber 59 on the upper side thereof, thereby being supported in a vibration-isolating manner. That is, the upper support bracket 57 is fastened with bolts to support members 95 and 96 adhered to the right and left lateral wall portions of the machine body frame 94, and fixed in such a manner as to bridge the upper side of the right and left lateral wall portions of the machine body frame 94. The upper surface of the radiator 24 is connected to the upper support bracket 57, thereby being supported in a vibration-isolating manner via the vibration-proof rubber 59. Also, an oil cooler 25 is arranged on the front surface of the radiator 24 in such a manner as to face the cooling fan 9.

Thus, the radiator 24 and the oil cooler 25 are arranged at a position opposite to the cooling fan 9 in the rear of the diesel engine 1, in a row in the direction that the cooling wind is discharged in the ascending order of the amount of heat discharged. Accordingly, the cooling fan 9 drivingly rotates, which draws in the outside air from the rear of the diesel engine 1, so that the radiator 24 and the oil cooler 25, which are heat exchangers, are sprayed by the outside air (cooling wind) and air-cooled.

The one end side of the air cleaner 32 is coupled with the other end side of the intake pipe 33 coupled with the intake port of the intake throttle member 28. The intake pipe 33 is extended to the rear of the diesel engine 1, so that the air cleaner 32 is arranged in the rear on the left side of the diesel engine 1. That is, the air cleaner 32 is arranged on the left side of the radiator 24 arranged in the rear of the diesel engine 1.

Next, the exhaust gas purification device 2 will be described referring to FIGS. 5 to 9. As described above, the exhaust gas purification device 2 is configured to couple the exhaust side of the first purification device 2a being the DPF with the intake side of the second purification device 2b being the SCR via the urea mixing pipe 172. First, hereinafter, the first purification device 2a of the exhaust gas purification device 2 will be described.

The first purification device 2a includes a DPF case (exhaust gas purification case) 38 that includes a DPF inlet pipe (exhaust gas inlet pipe) 36 and a DPF outlet pipe (exhaust gas outlet pipe) 37. The DPF case 38 is constituted in an approximately cylindrical shape elongated in the horizontal direction. Then, in the interior of the DPF case 38, a diesel oxidation catalyst 39 (gas purification body) such as platinum that generates nitrogen dioxide (NO2), and a soot filter 40 (gas purification body) having honeycomb structure, in which the particulate matter (PM) collected is consecutively oxidized and removed at a relatively low temperature, are placed in series in the transfer direction of the exhaust gas.

With the aforementioned constitution, the nitrogen dioxide (NO2) generated by the oxidation action of the diesel oxidation catalyst 39 is supplied from one lateral end surface (intake lateral end surface) into the soot filter 40. The particulate matter (PM) included in the exhaust gas of the diesel engine 1 is collected by the soot filter 40, consecutively oxidized, and removed by the nitrogen dioxide (NO2). In addition to the removal of the particulate matter (PM) included in the exhaust gas of the diesel engine 1, the content of carbon monoxide (CO) or hydrogen carbon (HC) in the exhaust gas of the diesel engine 1 is reduced.

Also, the DPF case 38 is placed along with an upstream side gas temperature sensor and a downstream side gas temperature sensor of a thermistor type. Accordingly, the temperature of the exhaust gas on the end surface on the gas inflow side of the diesel oxidation catalyst 39 is detected by the upstream side gas temperature sensor, and the temperature of the exhaust gas on the end surface on the gas outflow side of the diesel oxidation catalyst 39 is detected by the downstream side gas temperature sensor. A differential pressure sensor as an exhaust gas pressure sensor is subsidiarily placed in the DPF case 38. Accordingly, the differential pressure sensor detects the pressure difference between the exhaust gas on the upstream side and the exhaust gas on the downstream side of the soot filter 40. That is, it is configured such that the amount of sediment of particulate matter through the soot filter 40 is calculated based on the exhaust pressure difference between the upstream side and the downstream side of the soot filter 40, and a clogging state in the soot filter 40 can be determined.

With the aforementioned constitution, the exhaust pressure difference (the pressure difference of the exhaust gas) between the pressure of the exhaust gas on the inflow side of the soot filter 40 and the pressure of the exhaust gas on the outflow side of the soot filter 40 is detected via the differential pressure sensor subsidiarily placed in the DPF case 38. The residual amount of particulate matter in the exhaust gas collected by the soot filter 40 is proportionate to the pressure difference of the exhaust gas, so that when the amount of particulate matter remained in the soot filter 40 increases to a predetermined value or more, the regeneration control of reducing the amount of particulate matter remained in the soot filter 40 (for example, the control of increasing the temperature of the exhaust) is executed based on the detection results of the aforementioned differential pressure sensor. Also, when the residual amount of particulate matter further increases over the allowable range of the regeneration control, the DPF case 38 is detached and dissembled, and the soot filter 40 is cleaned, and maintenance work for artificially removing the particulate matter is performed.

Next, hereinafter, the second purification device 2b of the exhaust gas purification device 2 will be described. The second purification device 2b includes an SCR case (exhaust gas outlet case) 54 that includes an SCR inlet pipe (exhaust gas inlet pipe) 52 and an SCR outlet pipe (exhaust gas outlet pipe) 53. As is the same with the DPF case 38, the SCR case 54 is constituted in an approximately cylindrical shape elongated in the horizontal direction. Then, an SCR catalyst 63 for urea selective catalyst reduction, with which the nitrogen oxides (NOx) is reduced and changed into nitrogen, and an oxidation catalyst 64, with which ammonia making no contribution to the purification reaction of nitrogen oxides (NOx) is changed into nitrogen, are placed in series in the transfer direction of the exhaust gas in the interior of the SCR case 54. It is noted that one side portion of the SCR case 54 is formed of a silencer 41, and the SCR outlet pipe 53 coupled with the tail pipe 135 is provided on the silencer 41.

Also, the urea mixing pipe 172 connected between the first purification device 2a and the second purification device 2b is coupled with the DPF outlet pipe 37 provided on the lateral end surface on the downstream side in the transfer direction of the exhaust gas (hereinafter, merely referred to as "downstream side") of the DPF case 38 via a urea water injection pipe 173. The DPF outlet pipe 37 has an elbow-pipe shape bent from the lateral direction to the upward direction of the DPF case 38, thereby guiding the exhaust gas from the lateral end surface of the DPF case 38 in the upward direction. Then, the exhaust gas inlet side of the urea water injection pipe 173 is arranged above the DPF outlet pipe 37, and connected to the exhaust gas outlet side of the DPF outlet pipe 37 via a corrugated flexible pipe 174.

Also, the urea water injection pipe 173 coupled with the DPF outlet pipe 37 via the metallic flexible pipe 174 has an elbow-pipe shape bent to the SCR inlet pipe 52. Accordingly, after being discharged from the first purification device 2a and flowing in the upward direction, the exhaust gas flowing through the urea water injection pipe 173 flows to the SCR inlet pipe 52 in the direction parallel and opposite to the transfer direction of the exhaust gas in the first purification device 2a. Furthermore, the exhaust gas outlet side of the urea water injection pipe 173 is coupled with the one end side of the urea mixing pipe 172, and the SCR inlet pipe 52 is coupled with the other end side of the urea mixing pipe 172 with a flange body 140.

That is, it is configured such that the SCR inlet pipe 52 is connected to the DPF outlet pipe 37, and the SCR case 54 is communicated with the DPF case 38, and the exhaust gas is transferred from the DPF case 38 to the SCR case 54, via the flexible pipe 174, the urea water injection pipe 173, and the urea mixing pipe 172. It is noted that the flexible pipe 174 is formed in a corrugated shape in a bendable, extendable, and contractible manner.

Furthermore, a urea water injection nozzle 176 for injecting the urea water is supported by a nozzle support unit 178 in the urea water injection pipe 173 in order to supply the urea to the urea mixing pipe 172. The urea water stored in the urea water tank (not illustrated) is pressure-fed by a urea water injection electric pump (not illustrated), which allows the urea water injection nozzle 176 to inject the urea water to the urea mixing pipe 172. It is noted that the urea water injected from the urea water injection nozzle 176 to the interior of the urea mixing pipe 172 is hydrolyzed by the temperature of the exhaust gas and generated into ammonia.

With the aforementioned constitution, the urea water is injected from the urea water injection nozzle 176 into the urea water injection pipe 173, and the urea water from the urea water injection nozzle 176 is mixed into the exhaust gas from the diesel engine 1 as ammonia in the interior of the urea water injection pipe 173 or the urea mixing pipe 172. The exhaust gas mixed with the ammonia (urea water) passes through the SCR case 54 (the SCR catalyst 63 and the oxidation catalyst 64), and the nitrogen oxides (NOx) in the exhaust gas is reduced, and the exhaust gas is discharged from the SCR outlet pipe 53 to the outside.

At this time, the urea water is sprayed into the exhaust gas, which generates ammonia gas in the exhaust gas, and the ammonia gas and the exhaust gas are mixed and guided from the SCR inlet pipe 52 to the interior of the SCR case 54. In the interior of the SCR case 54, the exhaust gas (mixed gas) mixed with the ammonia gas passes through the SCR catalyst 63, and the nitrogen oxides (NOx) is converted into nitrogen by means of its reduction reaction. Furthermore, the mixed gas through the SCR catalyst 63 passes through the oxidation catalyst 64, and the ammonia gas making no contribution to the purification reaction of the nitrogen oxides (NOx) is changed into nitrogen. Thus, the mixed gas passes through the catalysts 63 and 64, so that after the nitrogen oxides (NOx) and the ammonia gas are removed from the exhaust gas, the exhaust gas is discharged through the tail pipe 135 connected to the SCR outlet pipe 53 to the outside.

Next, the mounting structure of the exhaust gas purification device 2 will be described referring to FIGS. 7 to 9. The DPF case 38 of the first purification device 2a is placed on a first support frame 100 arranged above the cooling fan 9. The first support frame 100 is coupled with coupling brackets 101 and 102 adhered to the right and left lateral wall portions of the machine body frame 94 and fixed in such a manner as to bridge the upper section of the right and left lateral wall portions of the machine body frame 94. Accordingly, the first support frame 100 coupled with the machine body frame 94 via the coupling brackets 101 and 102 is arranged above the cooling fan 9 in the rear of the diesel engine 1.

Figure 7:
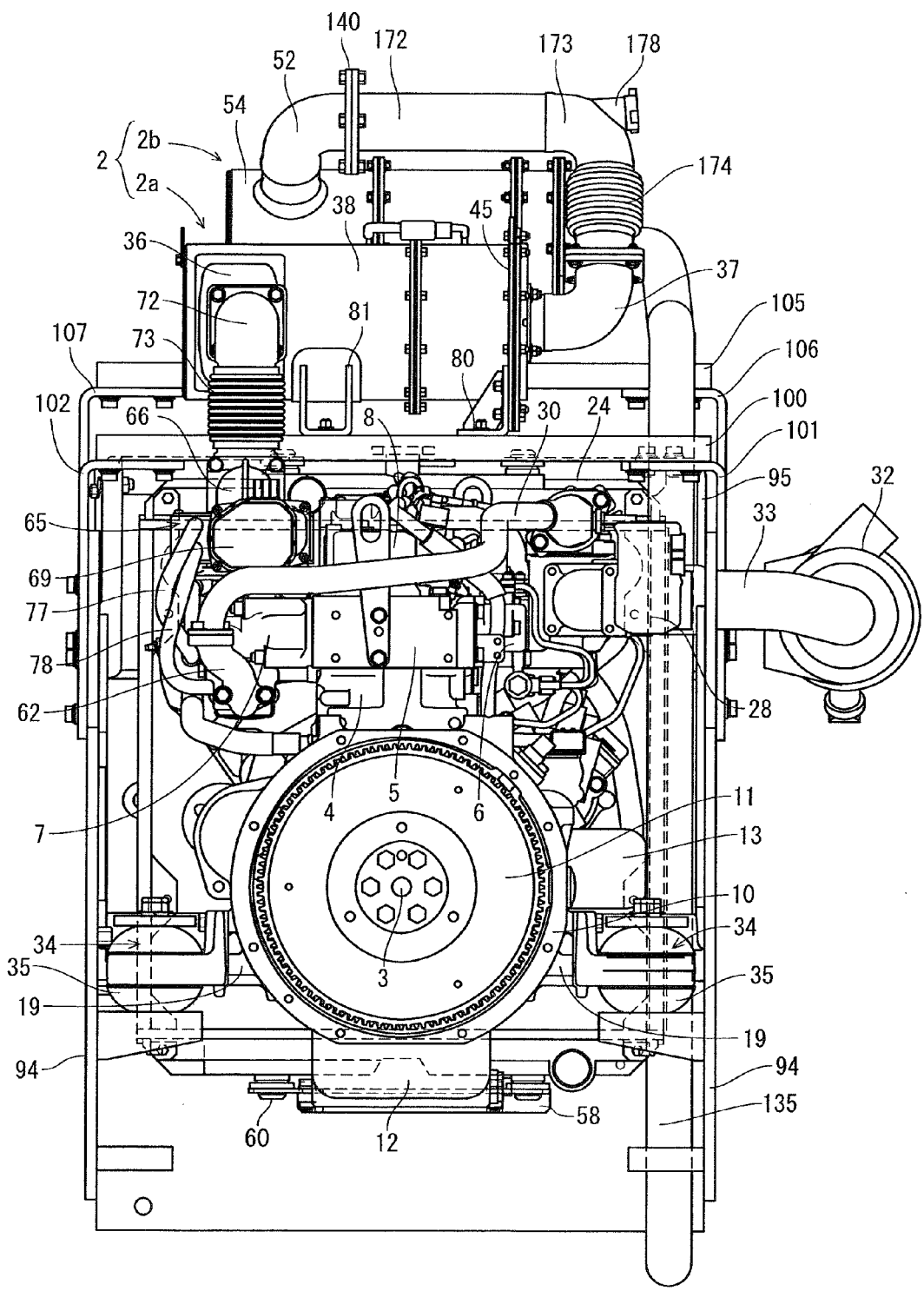
FIG. 7 is a front view of the diesel engine.
Figure 8:
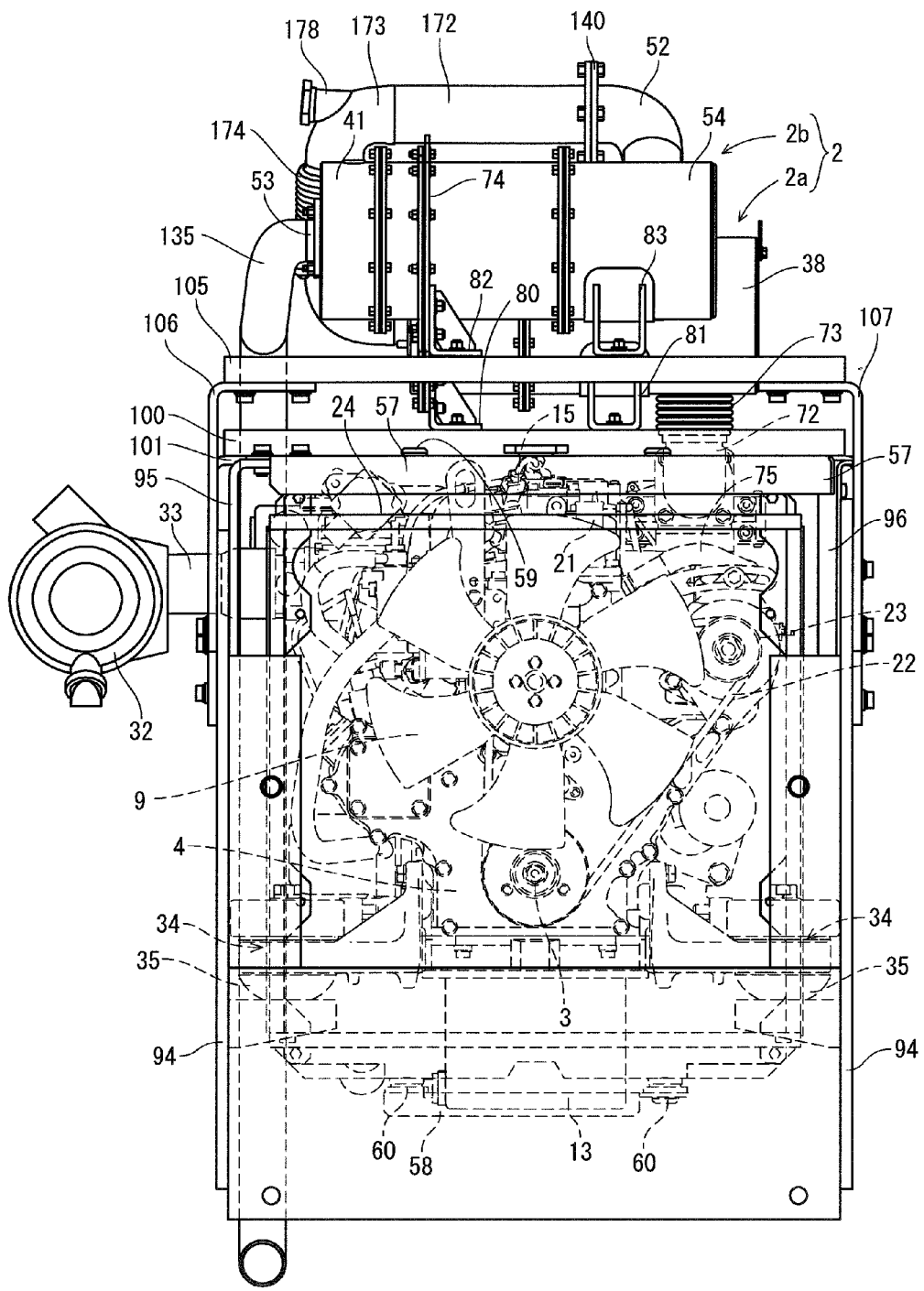
FIG. 8 is a back view of the diesel engine.
Figure 9:
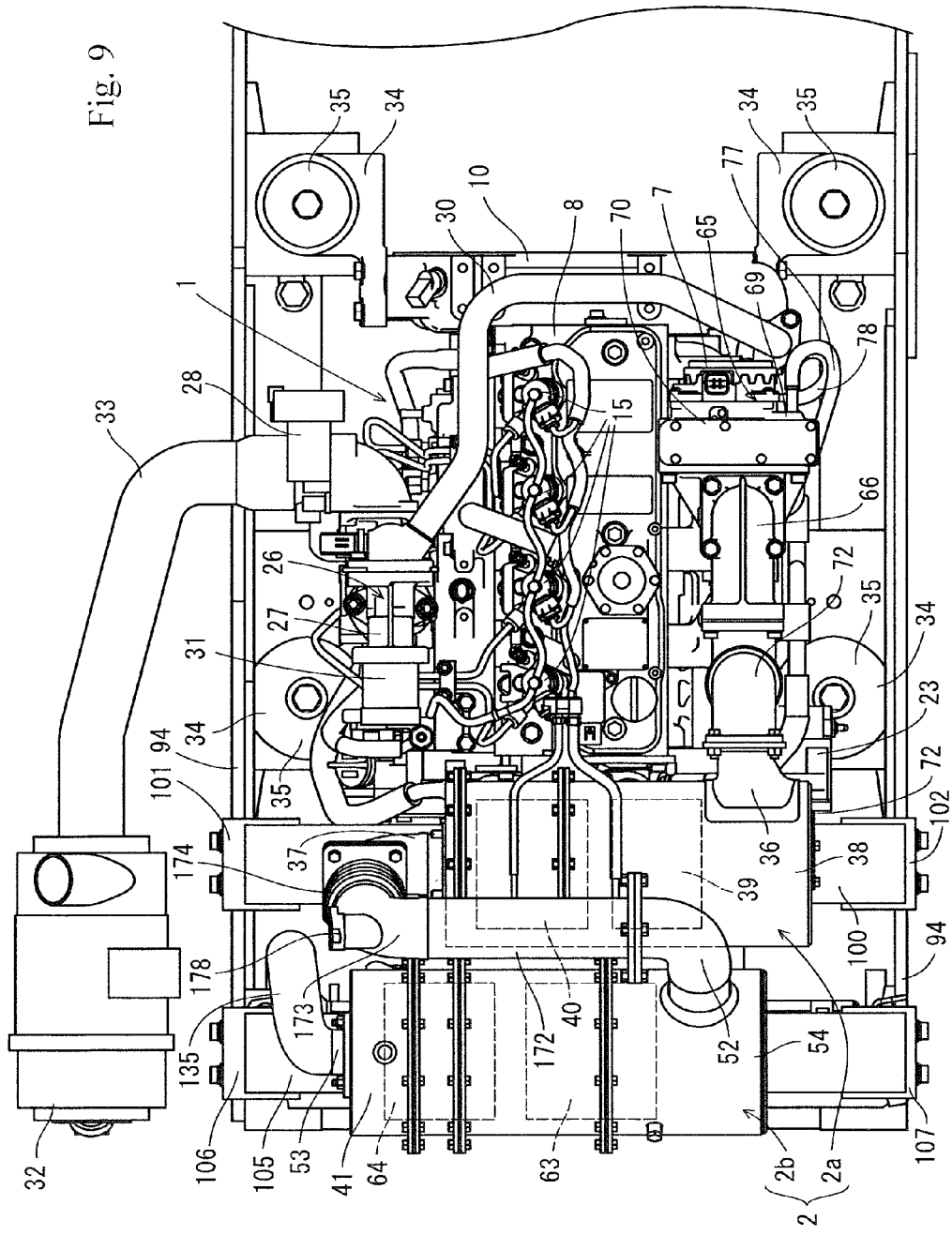
FIG. 9 is a plan view of the diesel engine.

In this time, as illustrated in FIGS. 7 to 9, it may be such that the machine body frame 94, the coupling brackets 101 and 102, and the first support frame 100 are each fastened with bolts, thereby coupling with each other. Also, it may be such that the support member that supports the DPF case 38 is constituted by a member integrally made up of the first support frame 100 and the coupling brackets 101 and 102.

In contrast, regarding the DPF case 38, a coupling leg body (left bracket) 80 is fastened with bolts and detachably mounted on an outlet clamping flange 45 on the downstream side, and a fixation leg body (right bracket) 81 is welded and fixed. In this time, a mounting boss portion of the coupling leg body 80 is fastened with bolts and mounted on a leg body fastening portion with a through-hole, which is provided on the arc body of the outlet clamping flange 45. Also, the fixation leg body 81 is adhered by welding with respect to the outer circumferential surface of the DPF case 38 on the side of the DPF inlet pipe 36. That is, the fixation leg body 81 is installed on the inlet side (upstream side) of the DPF case 38, and the coupling leg body 80 is installed on the outlet side (downstream side) of the DPF case 38. It is noted that the coupling leg body 80 is not limited to the outlet clamping flange 45, but the coupling leg body 80 may be fastened with another clamping flange such as a central clamping flange, which is fastened during the assembly of the DPF case 38.

The coupling leg body 80 and the fixation leg body 81 provided on the outer circumference of the DPF case 38 are each fastened with bolts to the upper surface of the first support frame 100 fixed on the machine body frame 94. Accordingly, the first purification device 2a is supported in such a manner as to bridge the upper section of the machine body frame 94 via the first support frame 100. That is, the first purification device 2a is supported by the machine body frame 94 to which the transmission of vibration from the diesel engine 1 is suppressed. Accordingly, the transmission of vibration from the diesel engine 1 to the first purification device 2a can be prevented, so that the improvement of durability or the enhancement of longevity of the first purification device 2a can be achieved.

An exhaust pipe 72 that couples the DPF inlet pipe 36 of the first purification device 2a with an intermediary pipe 66 includes a corrugated flexible pipe 73 in the part thereof. The flexible pipe 73 is provided in the exhaust pipe 72, so that load attributed to the vibration of the diesel engine 1 can be absorbed by the flexible pipe 73, regarding the exhaust pipe 72 that serves as a connection path for the diesel engine 1. Accordingly, not only the damage of the exhaust pipe 72 can be prevented, but also the first purification device 2a can be protected from the vibration of the diesel engine 1.

Also, the SCR case 54 of the second purification device 2b is placed on a second support frame 105 arranged above the radiator 24. The second support frame 105 is coupled with coupling brackets 106 and 107 adhered to the right and left lateral wall portions of the machine body frame 94 and fixed in such a manner as to bridge the upper section of the right and left lateral wall portions of the machine body frame 94. Accordingly, the second support frame 105 coupled with the machine body frame 94 via the coupling brackets 106 and 107 is arranged above the radiator 24 facing the cooling fan 9 in the rear of the diesel engine 1.

In this time, as is the same with the coupling brackets 101 and 102, and the first support frame 100, it may be such that the coupling brackets 106 and 107 and the second support frame 105 are fastened with bolts, thereby being fixed with each other, and supported by the machine body frame 94. Also, it may be such that the support member that supports the SCR case 54 is constituted by a member integrally made up of the second support frame 105 and the coupling brackets 106 and 107.

In contrast, as is the same with the DPF case 38, regarding the SCR case 54, a coupling leg body (left bracket) 82 is fastened with bolts and detachably mounted on an outlet clamping flange 74 on the downstream, and a fixation leg body (right bracket) 83 is welded and fixed. That is, the fixation leg body 83 is installed on the inlet side (upstream side) of the SCR case 54, and the coupling leg body 82 is installed on the outlet side (downstream side) of the SCR case 54. Then, the coupling leg body 82 and the fixation leg body 83 provided on the outer circumference of the SCR case 54 are each fastened with bolts on the upper surface of the support frame 105 fixed on the machine body frame 94.

Accordingly, the second purification device 2b is also supported in such a manner as to bridge the upper section of the machine body frame 94 via the support frame 105. That is, as is the same with the first purification device 2a, the second purification device 2b is supported by the machine body frame 94 to which the transmission of vibration from the diesel engine 1 is suppressed, so that the transmission of vibration from the diesel engine 1 can be prevented, and the improvement of durability or the enhancement of longevity of the second purification device 2b can be achieved.

It is noted that, as described above, the flexible pipe 174 is arranged in the midway of the coupling portion between the first purification device 2a and the second purification device 2b, but the constitution, in which the flexible pipe 174 is omitted, may be applied because the first purification device 2a and the second purification device 2b both are supported by the machine body frame 94 of the same vibration system. That is, it may be configured such that the DPF outlet pipe 37 of the first purification device 2a is directly coupled with the urea water injection pipe 173, and the SCR inlet pipe 52 of the second purification device 2b is coupled with the urea mixing pipe 172 coupled with the urea water injection pipe 173.

With the aforementioned constitution, when the exhaust gas purification device 2 is supported, the first support frame 100 is arranged at a high position with respect to the highest end portion of the cooling fan 9, and the support frame 105 is arranged at a high position with respect to the first support frame 100. Accordingly, it is configured such that the DPF case 38 is supported at a high position with respect to the highest end portion of the cooling fan 9 via the machine body frame 94 and the first support frame 100, and the SCR case 54 is supported at a higher position than that of the DPF case 38 via the machine body frame 94 and the support frame 105.

Figure 5:
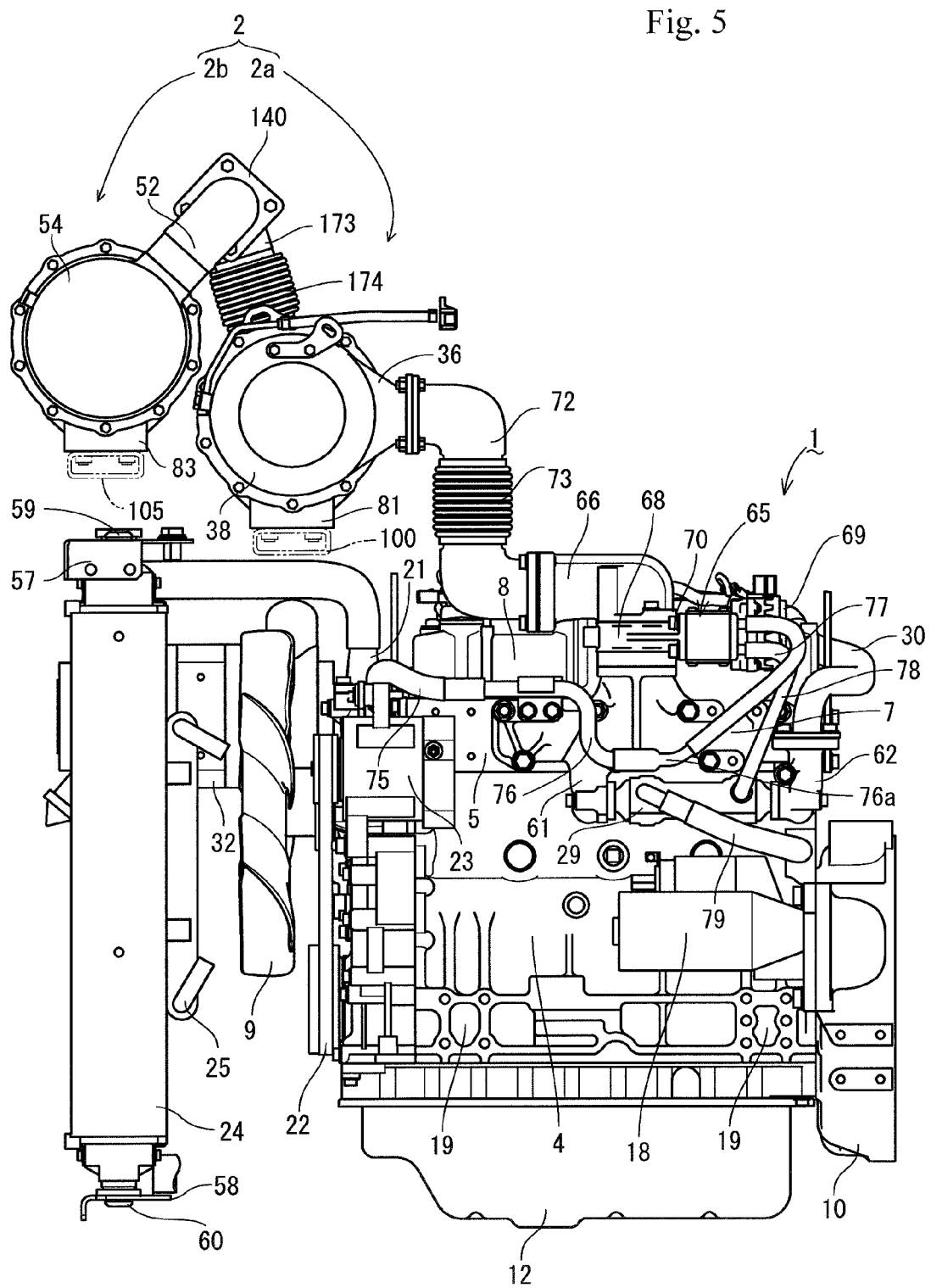
FIG. 5 is a right side view of a diesel engine of the first embodiment of the present invention of the instant application.
Figure 6:
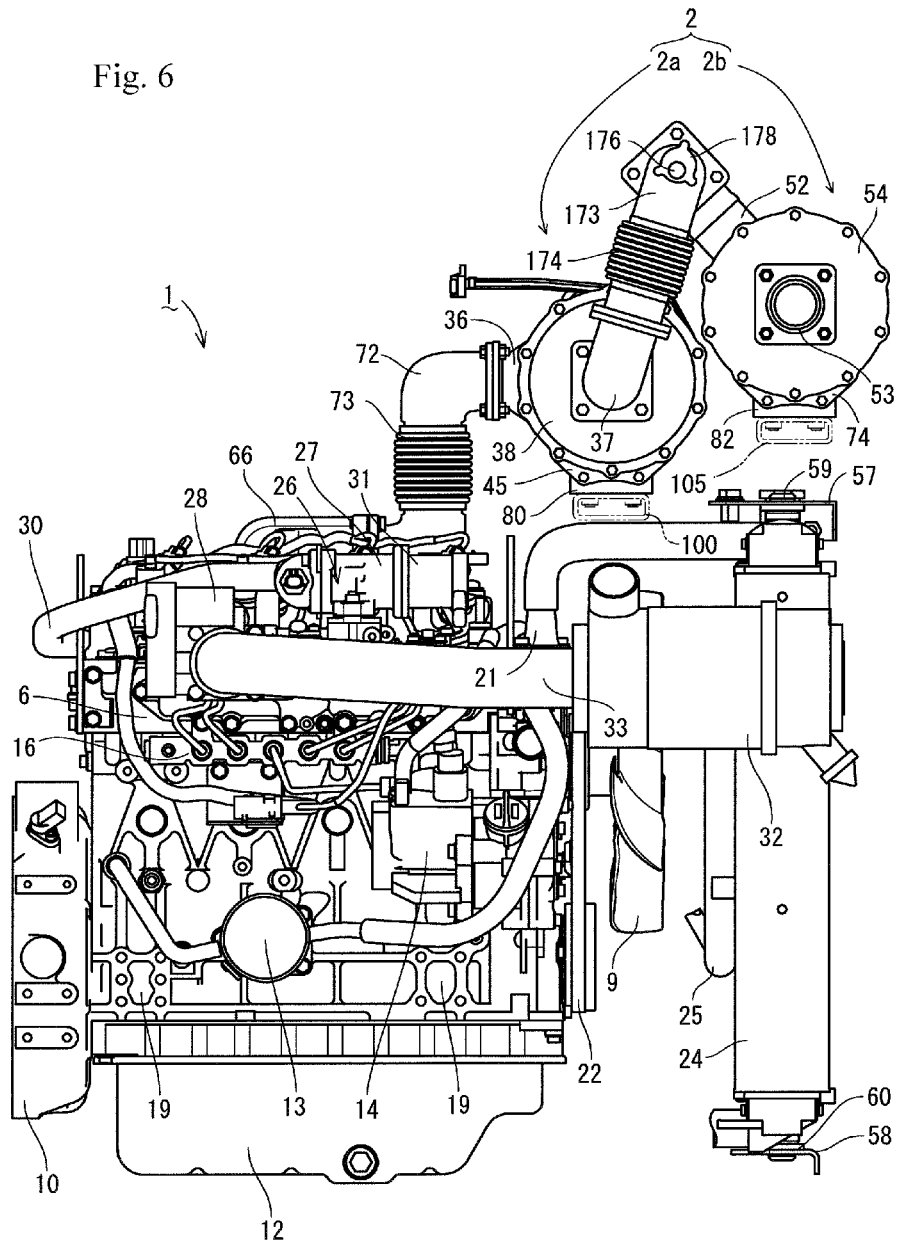
FIG. 6 is a left side view of the diesel engine.

Subsequently, as illustrated in FIG. 5, an EGR gas extraction pipe 61 is integrally formed in the exhaust manifold 7. Also, a pipe fitting member 62 is fastened with bolts to the exhaust manifold 7. The EGR gas inlet portion of the EGR cooler 29 is supported by the EGR gas extraction pipe 61, and the EGR gas outlet portion of the EGR cooler 29 is supported by the pipe fitting member 62 that connects the recirculation exhaust gas pipe 30, so that the EGR cooler 29 is arranged apart from the cylinder block 4 (specifically, the left side surface).

On the other hand, as illustrated in FIGS. 5, 7, and 9, an exhaust throttle device 65 that increases the exhaust pressure of the diesel engine 1 is provided. The exhaust outlet of the exhaust manifold 7 is opened upward. The exhaust outlet of the exhaust manifold 7 is detachably coupled with the elbow-shaped intermediary pipe 66 via the exhaust throttle device 65 that adjusts the exhaust pressure of the diesel engine 1. The exhaust throttle device 65 includes a throttle case 68 that incorporates the exhaust 3, an actuator case 69 that incorporates a power transmission mechanism and the like from a motor (actuator) that performs the control of opening the exhaust throttle valve, and the cooling case 70 that couples the throttle case 68 with the actuator case 69. Regarding the motor, the shaft thereof is configured to be capable of being interlocked with the shaft of the exhaust throttle valve in the throttle case 68, with gears, and the like by means of the power transmission mechanism.

The throttle case 68 is placed on the exhaust outlet of the exhaust manifold 7, and the intermediary pipe 66 is placed on the throttle case 68, and the intermediary pipe 66 is fastened with four bolts to the exhaust outlet body of the exhaust manifold 7 via the throttle case 68. The lower surface side of the throttle case 68 is adhered to the exhaust outlet body of the exhaust manifold 7. The opening portion on the lower surface side of the intermediary pipe 66 is adhered to the upper surface side of the throttle case 68. The sideways opening portion of the intermediary pipe 66 is coupled with the DPF inlet pipe 36 via the exhaust pipe 72. Accordingly, the exhaust manifold 7 is conned to the aforementioned exhaust gas purification device 2 via the intermediary pipe 66 and the exhaust throttle device 65. After being purified in the exhaust gas purification device 2, the exhaust gas, which transfers from the outlet portion of the exhaust manifold 7 into the exhaust gas purification device 2 via the DPF inlet pipe 36, transfers from the SCR outlet pipe 53 to the tail pipe 135 and is finally discharged to the outside of the device.

With the aforementioned constitution, the motor of the exhaust throttle device 65 is activated based on the pressure difference detected by the differential pressure sensor, which causes the regeneration control of the soot filter 40 to be executed. That is, when soot (soot) is accumulated in the soot filter 40, the exhaust pressure of the diesel engine 1 is increased by the control of closing the exhaust throttle valve of the exhaust throttle device 65, which allows the temperature of the exhaust gas discharged from the diesel engine 1 to increase to a high temperature, and the soot (soot) accumulated in the soot filter 40 is combusted. As a result, the soot is eliminated, and the soot filter 40 is regenerated.

Also, even when an operation, in which a load is low, and the temperature of the exhaust gas is likely to be reduced (an operation in which the soot is likely to be accumulated), is continuously performed, the compulsory increase of the exhaust pressure causes the exhaust throttle device 65 to act as an exhaust temperature rising mechanism, so that the soot filter 40 can be regenerated, and the exhaust gas purification capacity of the exhaust gas purification device 2 can be appropriately maintained. Also, a burner for burning the soot accumulated in the soot filter 40 and the like are eliminated. It is noted that a heater for directly increasing the temperature of the exhaust gas to be transferred may be provided as the exhaust temperature rising mechanism that maintains the exhaust gas purification capacity of the exhaust gas purification device 2. Also, the exhaust pressure of the diesel engine 1 increases by the control of the exhaust throttle device 65 at the start-up of the engine 1, which sets the temperature of the exhaust gas from the diesel engine 1 to a high temperature, so that the warm-up of the diesel engine 1 can be facilitated.

As described above, the exhaust throttle device 65 fastens the exhaust gas intake side of the throttle case 68 to the exhaust outlet of the exhaust manifold 7 opened upward, so that the exhaust pipe 72 is connected to the exhaust manifold 7 via the throttle case 68. Accordingly, the exhaust throttle device 65 can be supported by the exhaust manifold 7 having high rigidity, and the support structure of the exhaust throttle device 65 can be constituted with high rigidity, while volume on the exhaust gas intake side of the exhaust throttle device 65 can be reduced, and the exhaust pressure in the exhaust manifold 7 can be adjusted with high accuracy, e.g., compared with the structure in which the throttle case 68 is connected to the exhaust manifold 7 via the intermediary pipe 66. For example, the temperature of the exhaust gas supplied to the exhaust gas purification device 2 can be easily maintained at a temperature suitable for the purification of the exhaust gas.

Also, the throttle case 68 is fastened to the upper surface side of the exhaust manifold 7, and the elbow-shaped intermediary pipe 66 is fastened to the upper surface side of the throttle case 68, and the throttle case 68 and the intermediary pipe 66 are arranged in the multi-layered form with respect to the exhaust manifold 7, and the exhaust pipe 72 is coupled with the intermediary pipe 66 disposed at the uppermost layer portion. Accordingly, the mounting posture of the intermediary pipe 66 (the coupling direction of the exhaust pipe 72) can be changed, for example, in accordance with the mounting position of the exhaust gas purification device 2 without changing the support posture of the exhaust throttle device 65 and without changing the specifications of the intermediary pipe 66.

Also, the exhaust outlet of the exhaust manifold 7 is opened upward, and the throttle case 68 is provided on the upper surface side of the exhaust manifold 7, and the gas outlet of the throttle valve is formed on the upper surface side of the throttle case 68, and the EGR cooler 29 for cooling the EGR gas is arranged below the throttle case 68 with the exhaust manifold 7 sandwiched therebetween. Accordingly, while the exhaust manifold 7, the exhaust throttle device 65, and the EGR cooler 29 can be installed in a limited space along the one side surface of the engine 1, the exhaust pipe 72 can be extended from the gas outlet of the throttle valve of the throttle case 68 in the sideways or upward direction, e.g., in accordance with the arrangement of the exhaust gas purification device 2 and the like. Accordingly, the exhaust gas purification device 2 can be functionally supported on the inside and outside of the engine room of the work vehicle (constituent component except for the diesel engine 1). Also, coolant pipes (a throttle outlet side pipe 77, a throttle inlet side pipe 78, and the like) connected to the exhaust throttle device 65 and the EGR cooler 29 can be supported in a compact way, by use of the outer side surface of the exhaust manifold 7.

In contrast, coolant pipe paths (a flexible coolant return hose 75, an intermediate pipe 76, the throttle outlet side pipe 77, the throttle inlet side pipe 78, a coolant extraction hose 79, and the like) that connect the coolant pump 21 to the EGR cooler 29 and the exhaust throttle device 65 are provided on the left side (the side of the exhaust manifold 7) of the diesel engine 1. It is configured such that not only the coolant from the coolant pump 21 is supplied to the cooling portion of the diesel engine 1, but also part of the coolant is transferred to the EGR cooler 29 and the exhaust throttle device 65.

One end side of the intermediate pipe 76 made of alloy is connected to the return hose 75, and the other end side of the intermediate pipe 76 made of alloy is connected to one end side of the throttle outlet side pipe 77 made of alloy via a flexible hose 76a. The other end side of the throttle outlet side pipe 77 is connected to the cooling case 70 of the exhaust throttle device 65 via a flexible hose (not illustrated) and the like, and one end side of the throttle inlet side pipe 78 made of alloy is connected to the cooling case 70 via a flexible hose (not illustrated) and the like, and the other end side of the throttle inlet side pipe 78 is connected to the coolant discharge port of the EGR cooler 29 via a flexible hose (not illustrated) and the like. It is noted that the coolant discharge port of the EGR cooler 29 is connected to the cylinder block 4 via the coolant extraction hose 79.

That is, the EGR cooler 29 and the exhaust throttle device 65 are connected in series to the coolant pump 21. Then, the exhaust throttle device 65 is arranged between the coolant pump 21 and the EGR cooler 29 in the coolant pipe paths formed by the hoses 75, 76a, and 79 and the pipes 76 to 78, and the like. The exhaust throttle device 65 is positioned on the upstream side of the EGR cooler 29. Part of the coolant from the coolant pump 21 is supplied from the cylinder block 4 to the exhaust throttle device 65 via the EGR cooler 29 and recirculated.

Thus, regarding the exhaust throttle device 65 to which part of the coolant is supplied, the coolant is supplied from the throttle outlet side pipe 77, and the coolant is discharged into the throttle inlet side pipe 78. Accordingly, the water supply position and the drainage position of the coolant to the cooling case 70 are inversely provided with respect to the intake position and the exhaust position of the exhaust gas flowing through the throttle case 68. That is, the water supply position of the coolant of the cooling case 70 is on the upstream side with respect to the drainage position, so that the reverse flow of the coolant flowing through the cooling case 70 can be steadily prevented.

Figure 10:
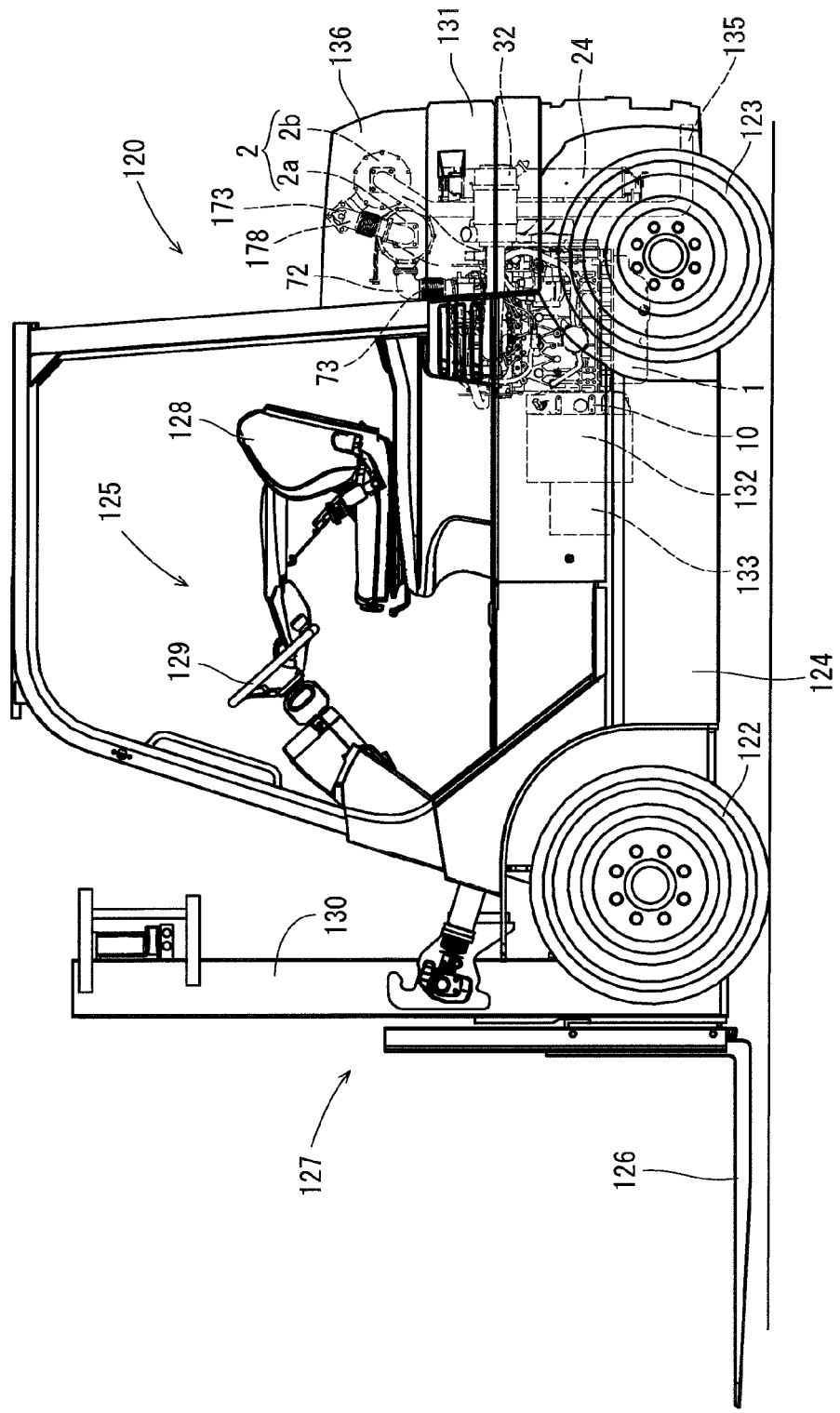
FIG. 10 is a left side view of a forklift car, which is another example of the work machine of the first embodiment of the present invention of the instant application.
Figure 11:
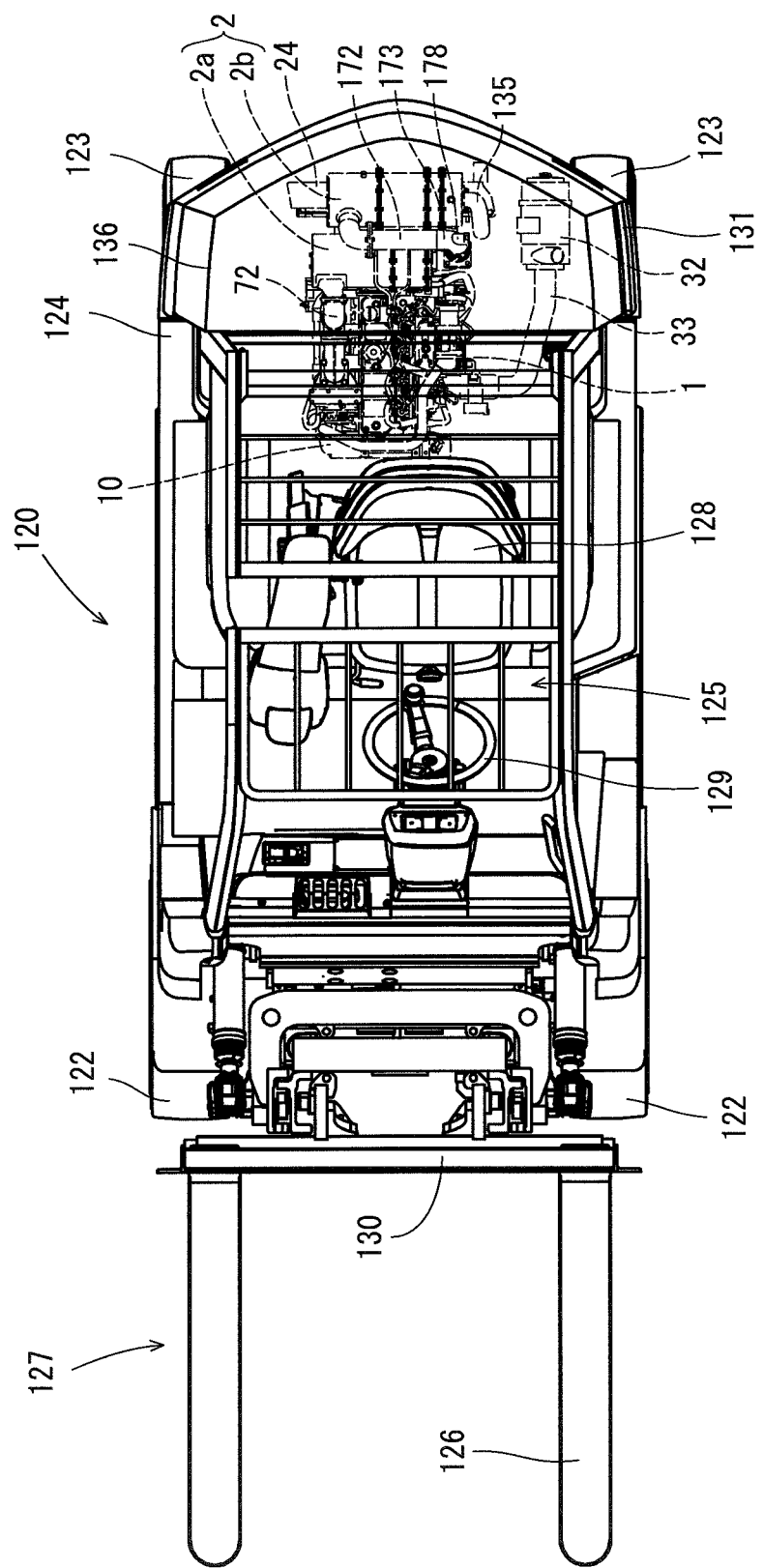
FIG. 11 is a plan view of the forklift car of FIG. 10.

Structure in which the diesel engine 1 is mounted on a forklift car 120 will be described referring to FIGS. 10 and 11. As illustrated in FIGS. 10 and 11, the forklift car 120 includes a travelling machine body 124 that includes a pair of right and left front wheels 122 and a pair of right and left rear wheels 123. An operating unit 125 and the engine 1 are mounted on the travelling machine body 124. A work unit 127 that includes a fork 126 for loading-and-unloading work is provided on the front side portion of the travelling machine body 124. An operating seat 128 on which an operator takes, a steering wheel 129, an operating means for operating the output of the engine 1 and the like, levers or switches as an operating means for the work unit 127 are arranged in the operating unit 125.

The fork 126 is arranged in such a manner as to be capable of being hoisted and lowered on a mast 130, which is a constituent element of the work unit 127. It is configured such that the fork 126 is hoisted and lowered, and a pallet (not illustrated) on which goods are loaded is placed on the fork 126, and the travelling machine body 124 moves forward and backward, and the loading-and-unloading work such as conveyance of the pallet is carried out.

Regarding the forklift car 120, the engine 1 is arranged on the lower side of the maneuvering seat 128, and the exhaust gas purification device 2, in which the first purification device 2a and the second purification device 2b are coupled, is arranged on the upper side in the rear of the engine 1. That is, the first purification device 2a is arranged above the cooling fan 9 provided in the rear of the engine 1. Then, the second purification device 2b that couples the first purification device 2a via the urea mixing pipe 172 is arranged above the radiator 24 arranged in the rear of the engine 1.

Also, the radiator 24 is arranged at a position facing the cooling fan 9 in the rear of the engine 1, and the air cleaner 32 connected to the left side of the engine 1 is arranged on the left side of the radiator 24 in the rear of the left side of the engine 1. Thus, the engine 1, the exhaust gas purification device 2, the radiator 24, and the air cleaner 32, which are arranged on the lower side and the rear of the maneuvering seat 128, are covered with a hood 136 arranged on the upper side of a counter weight 131. Regarding the hood 136, the rear portion thereof is configured to be openable/closable in such a manner that an operator can gain access to the engine 1 or the exhaust gas purification device 2 in the hood 136.

Regarding the diesel engine 1, the flywheel housing 10 is arranged in such a manner as to be positioned on the front portion side of the travelling machine body 124. That is, the diesel engine 1 is arranged in such a manner that the crankshaft 3 of the engine 1 is oriented along the front-and-back direction that the work unit 127 and the counter weight 131 are placed side by side. The mission case 132 is coupled with the front surface side of the flywheel housing 10. The power transmitted from the diesel engine 1 to the flywheel 11 is appropriately shifted by the mission case 132 and transmitted to the hydraulic drive source 133 for the front wheels 122, the rear wheels 123, and the fork 126.

As illustrated in FIGS. 5 to 9, the engine device of the aforementioned embodiment is configured such that the exhaust gas purification device 2 is connected to the machine body frame 94. Accordingly, the exhaust gas purification device 2 is supported by the structure that is blocked from the vibration of the diesel engine 1. Consequently, as described above, the flexible pipe 73 is installed in the exhaust pipe 72, which suppresses the transmission of the vibration of the diesel engine 1 from the exhaust pipe 72 to the exhaust gas purification device 2.

Hereinafter, the engine device according to another embodiment (second embodiment) of the present invention of the instant application will be described referring to FIGS. 12 and 13. It is noted that, regarding the constitution illustrated in FIGS. 12 and 13, the same reference numbers are applied to portions used for the identical purposes in FIGS. 1 to 9. As is different from the engine device (FIGS. 5 to 9) of the aforementioned embodiment, the engine device of the present embodiment is configured such that the first purification device 2a of the exhaust gas purification device 2 is fixed on the diesel engine 1. Accordingly, hereinafter, the fixation structure of the exhaust gas purification device 2 will be described.

Figure 12:
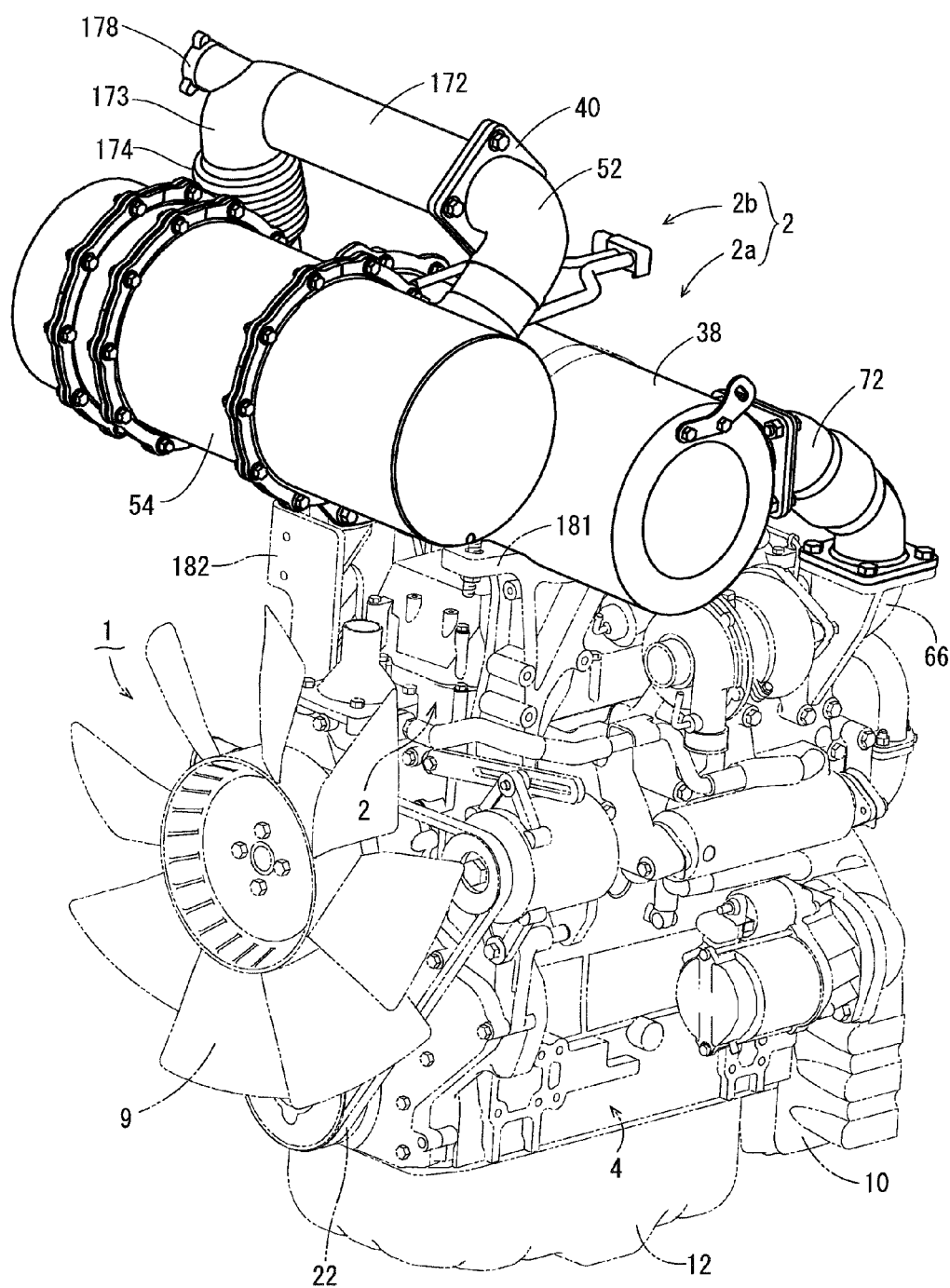
FIG. 12 is a back perspective view of an exhaust gas purification device of the diesel engine of a second embodiment of the present invention of the instant application.
Figure 13:
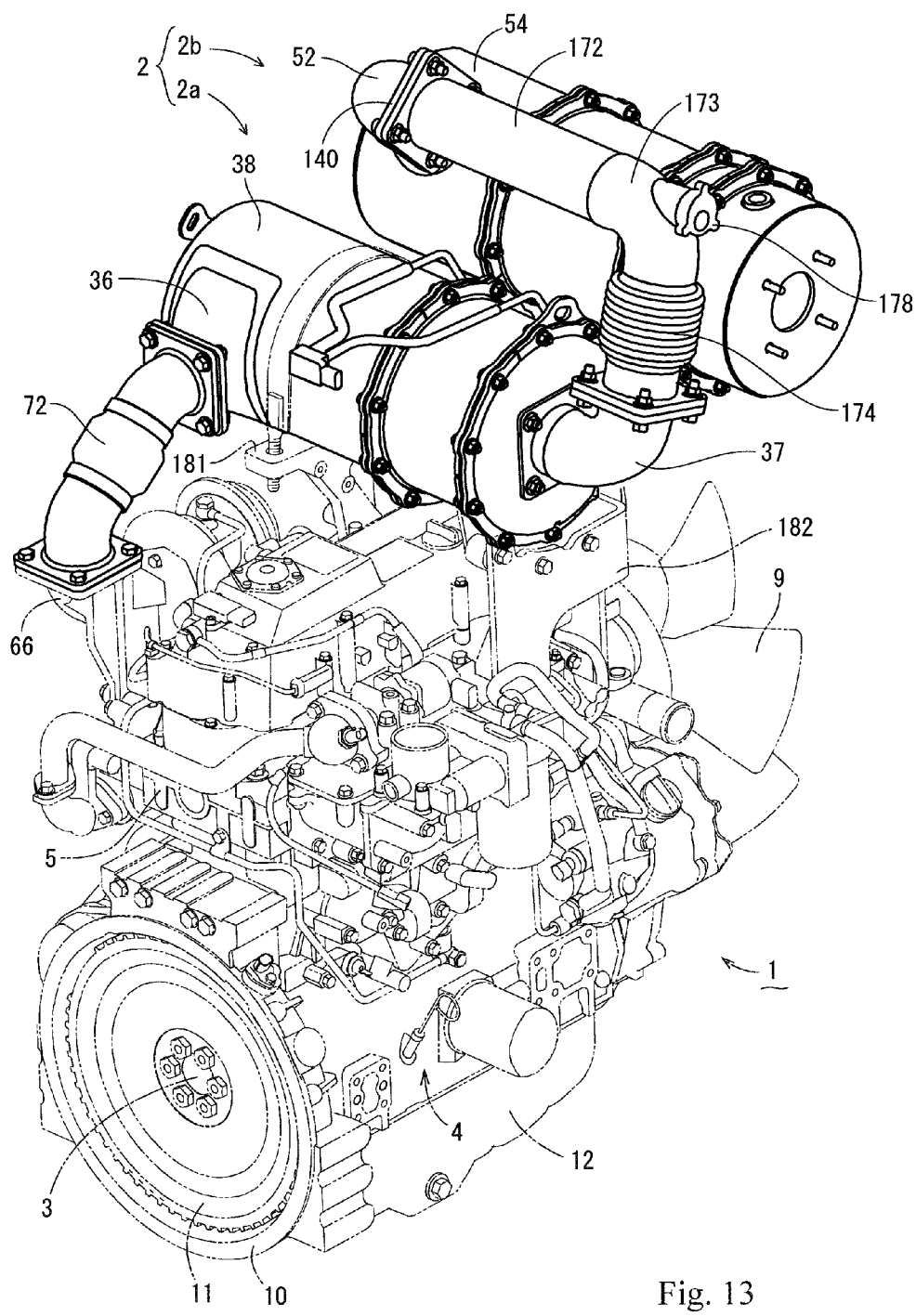
FIG. 13 is a front perspective view of the exhaust gas purification device of FIG. 12.

As illustrated in FIGS. 12 and 13, regarding the exhaust gas purification device 2, the first purification device 2a is supported by a first support leg body 181 and a second support leg body 182 erected on the cylinder head 5 of the diesel engine 1. That is, the first support leg body 181 and the second support leg body 182 are erected on the right and left lateral surfaces opposite to the cylinder head 5, thereby supporting the DPF case 38 in a posture of straddling the cylinder head 5. In this time, regarding the DPF case 38, the side of the DPF inlet pipe 36 is supported by the first support leg body 181, and the side of the DPF outlet pipe 37 is supported by the second support leg body 182. Also, the DPF case 38 is detachably adhered to the upper section of the cylinder head 5 via the first support leg body 181 and the second support leg body 182.

Regarding the exhaust gas purification device 2, as described above, the support structure of the first purification device 2a is the structure in which the diesel engine 1 is integrally formed. Accordingly, regarding the exhaust pipe 72 that couples the DPF inlet pipe 36 of the first purification device 2a with the intermediary pipe 66 of the diesel engine 1, the constitution in which the transmission of vibration is prevented is eliminated, and the constitution in which the flexible pipe 73 is omitted can be provided. Also, the first purification device 2a can be integrally assembled with the diesel engine 1, so that the first purification device 2a assembled with the diesel engine 1 can be shipped at an engine assembly plant.

In contrast, the second purification device 2b coupled with the first purification device 2a is supported by the machine body frame 94, which is a vibration system being different from the diesel engine 1. However, the flexible pipe 174 is connected in the course of coupling with the first purification device 2a, so that the transmission of vibration from the diesel engine 1 is suppressed. Accordingly, not only the damage of the urea mixing pipe 172 and the urea water injection pipe 173 can be prevented, but also the second purification device 2b can be protected from the vibration from the diesel engine 1.

Also, regarding each of the aforementioned embodiments, the present invention of the instant application has been described in the example where the constitution in which the first purification device (DPF) and the second purification device (SCR) are coupled is exemplified as the exhaust gas purification device 2 (see FIGS. 1 to 9). However, one wherein the exhaust gas purification device 2 is constituted by only the first purification device (DPF) may be applied. Hereinafter, the engine device according to another embodiment (third embodiment) of the present invention of the instant application will be further described referring to FIGS. 14 and 17. It is noted that, regarding the constitution illustrated in FIGS. 14 and 17, the same reference numbers are applied to portions used for the identical purposes in FIGS. 1 to 9, and their detailed descriptions are omitted.

As is different from the engine device (see FIGS. 5 to 9) of the aforementioned embodiment, the engine device of the present embodiment includes an exhaust gas purification device 2x constituted only by a first purification device 2c (DPF). That is, the exhaust gas purification device 2x has the constitution in which the second purification device 2b (SCR), the urea mixing pipe 172, the urea water injection pipe 173, the flexible pipe 174, and the urea water injection nozzle 176 are omitted from the exhaust gas purification device 2 (FIGS. 5 to 9) of the first embodiment.

Then, the first purification device 2c of the exhaust gas purification device 2x includes a DPF case 38x whose one side portion is formed by the silencer 41, and the DPF outlet pipe 37 coupled with the tail pipe 135 is provided on the silencer 41. The first purification device 2c is similar to the first purification device 2a of the first embodiment, except for the constitution on the exhaust gas outlet side thereof.

Figure 16:
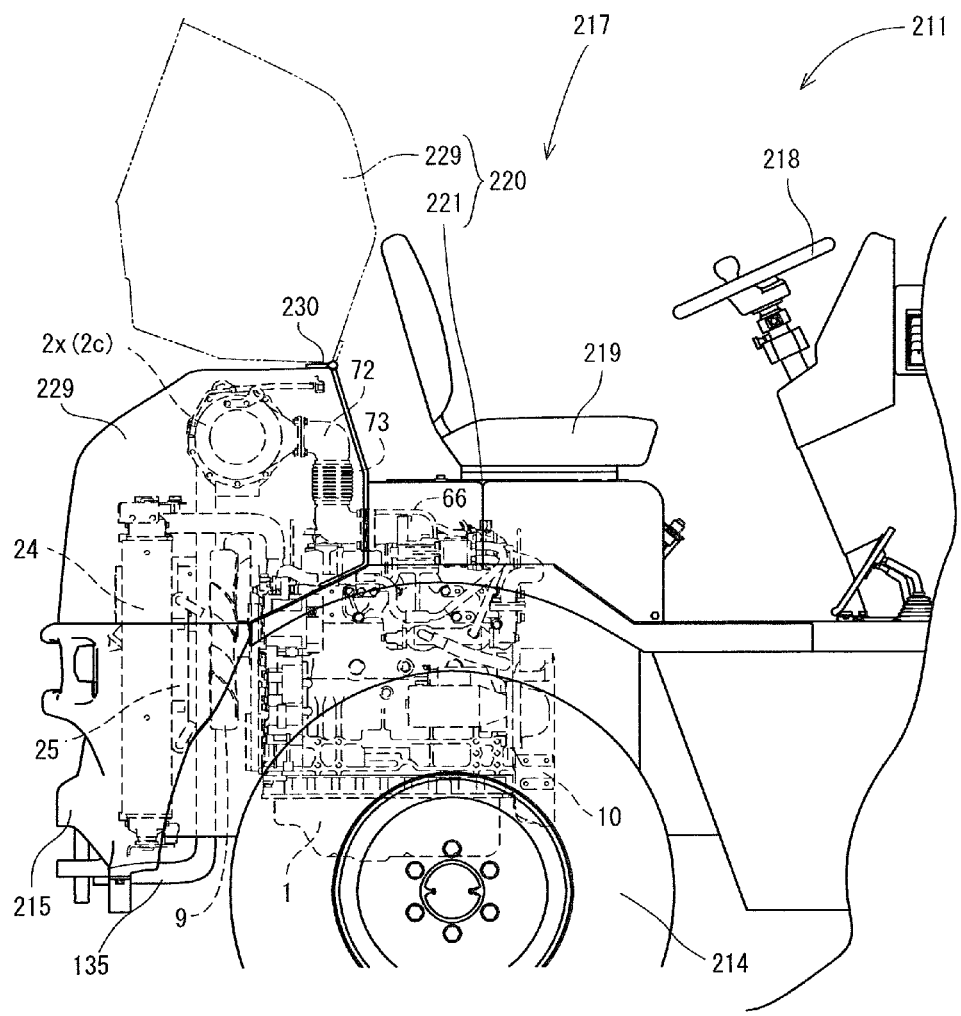
FIG. 16 is an enlarged view of the right lateral surface of the wheel loader illustrated in FIG. 14 to describe the rotation of the hood cover.
Figure 17:
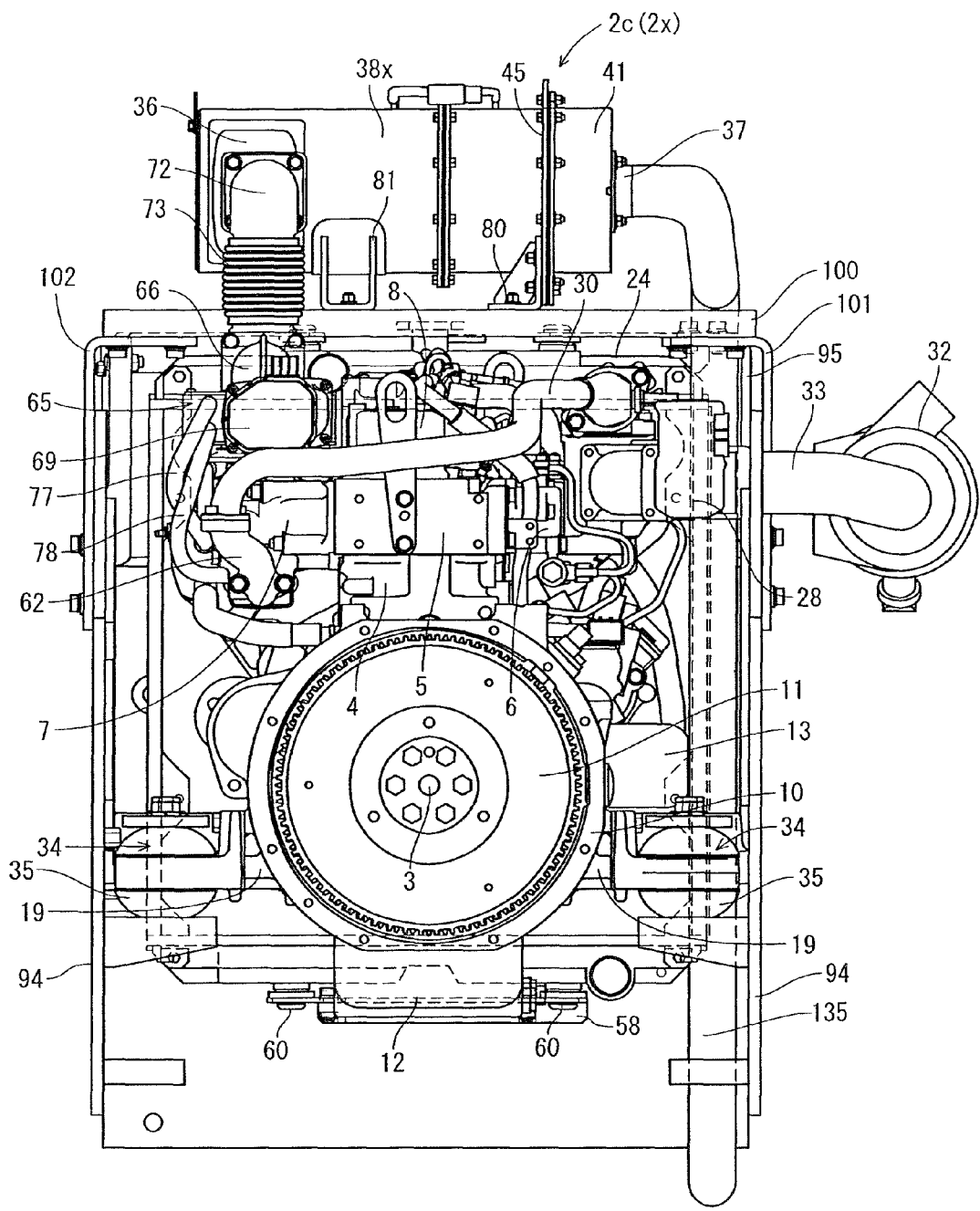
FIG. 17 is a front view of the diesel engine of the third embodiment of the present invention of the instant application.

Thus, the mounting structure of the exhaust gas purification device 2x constituted only by the first purification device 2c, as illustrated in FIGS. 16 and 17, is the structure in which the first purification device 2c is arranged above the cooling fan 9 by means of the first support frame 100 coupled with the coupling brackets 101 and 102 adhered to the right and left lateral wall portions of the machine body frame 94. That is, the coupling leg body 80 and the fixation leg body 81 of the DPF case 38x are fastened with bolts on the upper surface of the first support frame 100 supported in such a manner as to bridge the right and left lateral wall portions of the machine body frame 94, and the first purification device 2c is supported above the cooling fan 9.

Also, as is the same with the first embodiment, the exhaust pipe 72 that couples the DPF inlet pipe 36 of the first purification device 2c with an intermediary pipe 66 includes the corrugated flexible pipe 73 in the part thereof, so that load attributed to the vibration of the diesel engine 1 can be absorbed by the flexible pipe 73. Not only can the damage of the exhaust pipe 72 be prevented, but also the first purification device 2c can be protected from the vibration of the diesel engine 1.

Figure 14:
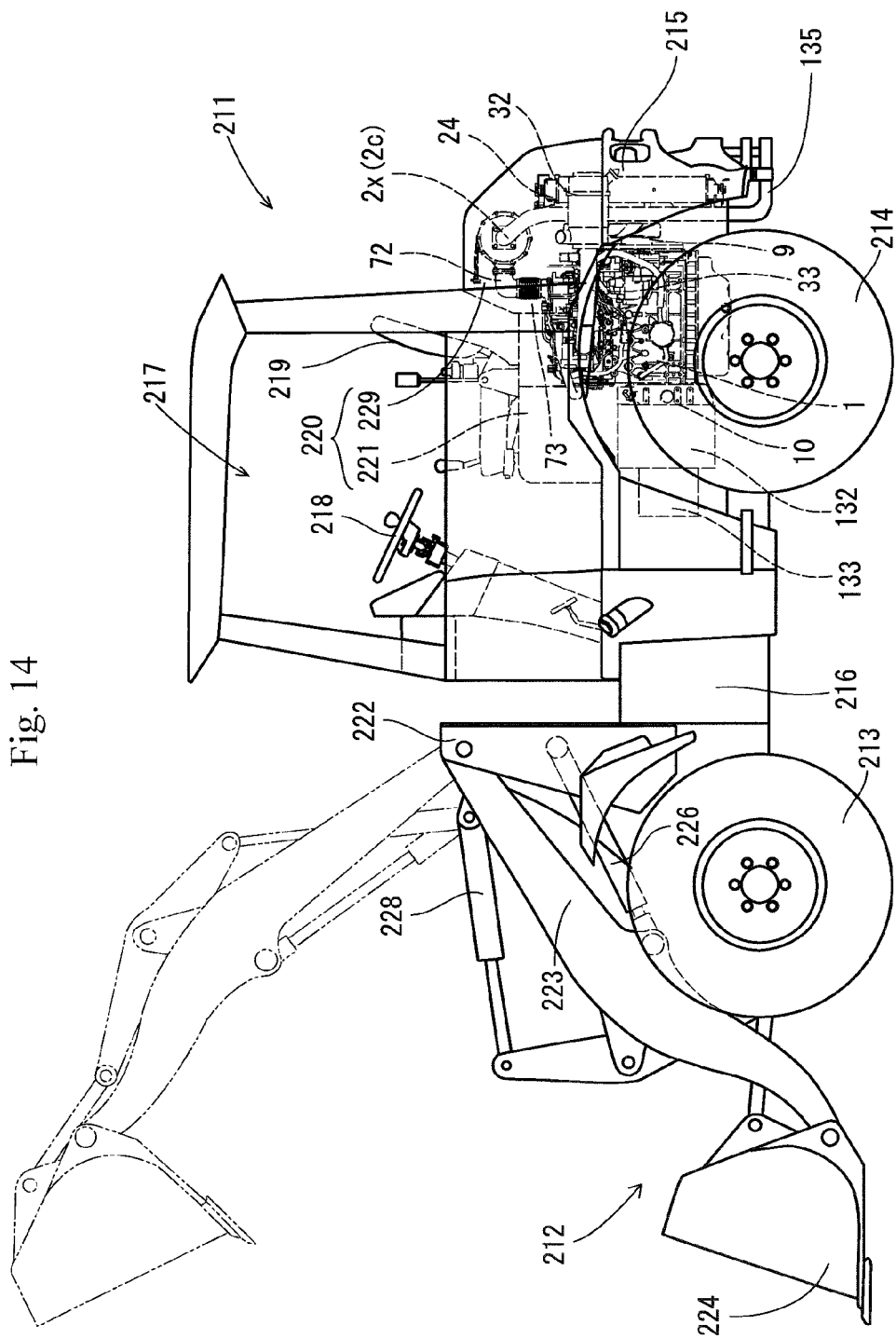
FIG. 14 is a left side view of the wheel loader, which is one example of the work machine of a third embodiment of the present invention of the instant application.
Figure 15:
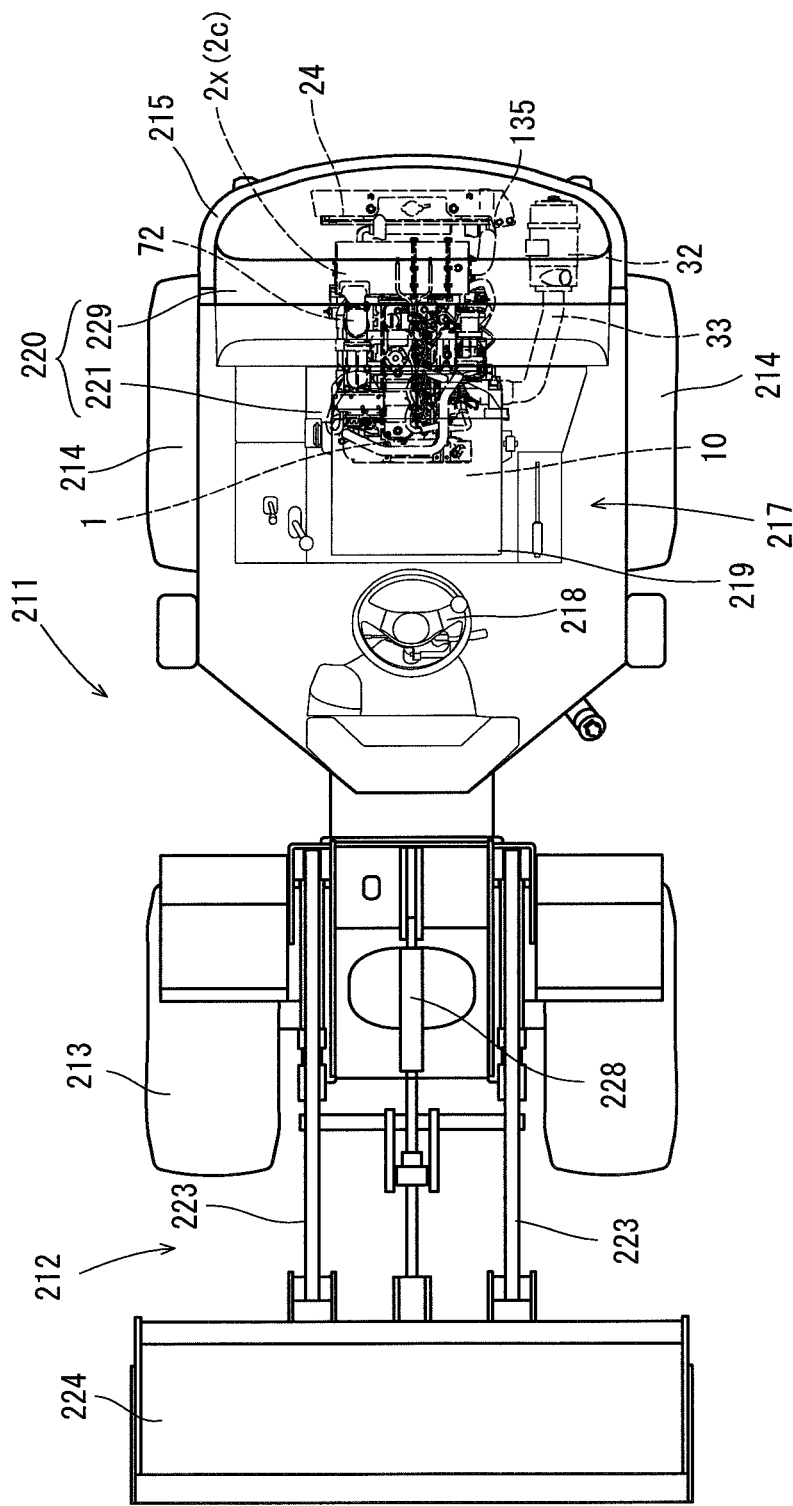
FIG. 15 is a plan view of the wheel loader illustrated in FIG. 14.

A wheel loader 211 illustrated in FIGS. 14 to 16 is exemplified as a work machine in which the engine device having the aforementioned constitution is mounted. In the present embodiment (third embodiment), as is the same with the first embodiment, the engine 1, the exhaust gas purification device 2, the radiator 24, and the air cleaner 32 are arranged on the lower side and the rear of the maneuvering seat 219. Then, the engine 1, the exhaust gas purification device 2, the radiator 24, and the air cleaner 32 are covered with the hood 220 arranged on the upper side of the counter weight 215.

Also, as is the same with the first embodiment, regarding hood 220, the maneuvering seat 219 is detachably installed on the upper side of the sheet frame 221 in the front thereof, and the hood cover (protrusion cover portion) 229 protruded upward with respect to the upper surface of the sheet frame 221 is provided in the rear thereof. Then, as illustrated in FIG. 16, the hood cover 229 is arranged on the upper side of the counter weight 215, thereby covering the exhaust gas purification device 2x arranged in the rear of the engine 1, and is configured to be openable/closable.

Accordingly, when the hood cover 229 is closed, the hood cover 229 covers the exhaust gas purification device 2x arranged on the upper side in the rear of the engine 1, so that the reduction of the temperature of the exhaust gas purification device, which is attributed to wind, rain, and the like, can be suppressed, and the appropriate temperature of the exhaust gas purification device is easily maintained. In contrast, when the hood cover 229 is opened, an access to the exhaust gas purification device 2x arranged on the upper side in the rear of the engine 1 is facilitated, so that the maintenance work is easily performed.

It is noted that, in the present embodiment, as is the same with the first embodiment, the first purification device 2c is supported by the machine body frame 94, which is a vibration system being different from the diesel engine 1, but as is the same with the second embodiment, the first purification device 2c may be configured to be integrally coupled with the diesel engine 1. That is, the DPF case 38a is supported by the first support leg body 181 and the second support leg body 182 erected on the right and left lateral surfaces which the cylinder head 5 faces, so that the support structure of the first purification device 2c is provided as the structure in which the diesel engine 1 is integrally formed.

Hereinafter, the fourth embodiment of the engine device of the present invention of the instant application and the work machine that includes the engine device will be further described based on drawings, referring to FIGS. 18 and 27. It is noted that, hereinafter, as the work machine in the present embodiment, the wheel loader that includes the loader device as the work unit is exemplified, and the constitution thereof will be described in detail. It is noted that, regarding the description of the present embodiment, the same reference numbers are applied to portions used for the identical purposes in the above-mentioned embodiments, and their detailed descriptions are omitted.

Figure 18:
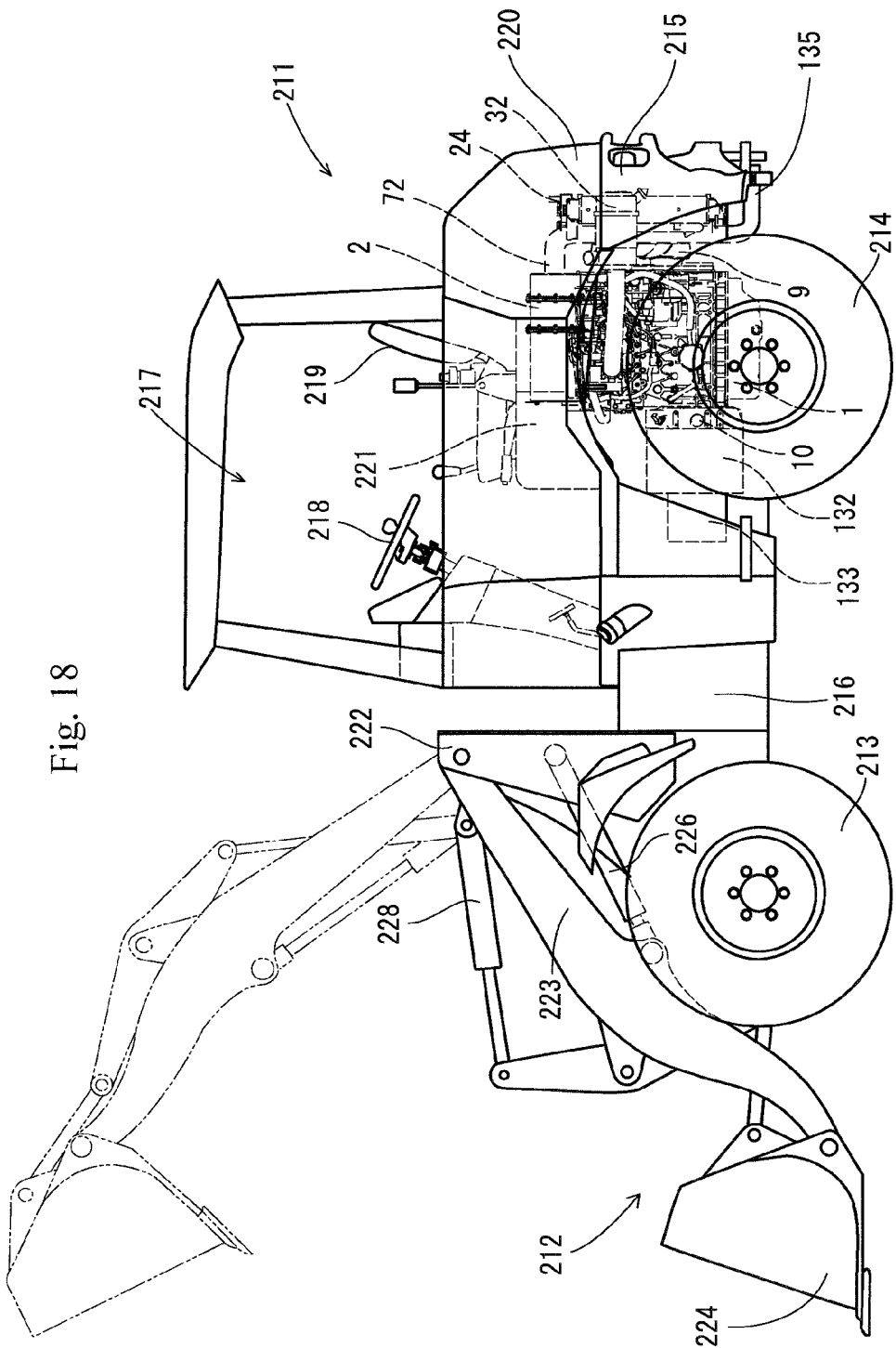
FIG. 18 is a left side view of the wheel loader, which is one example of a fourth embodiment of the present invention of the instant application.
Figure 19:
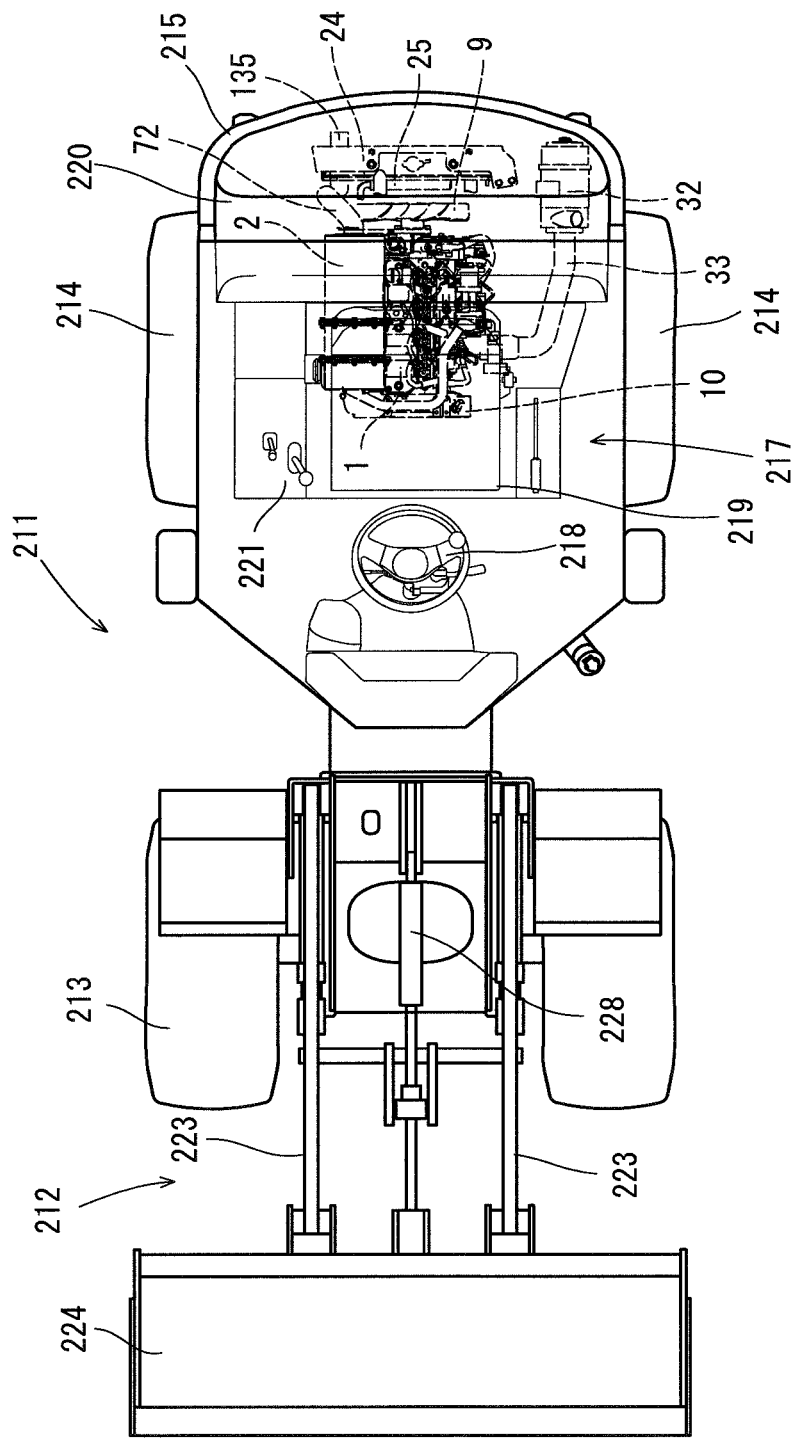
FIG. 19 is a plan view of the wheel loader illustrated in FIG. 18.
Figure 20:
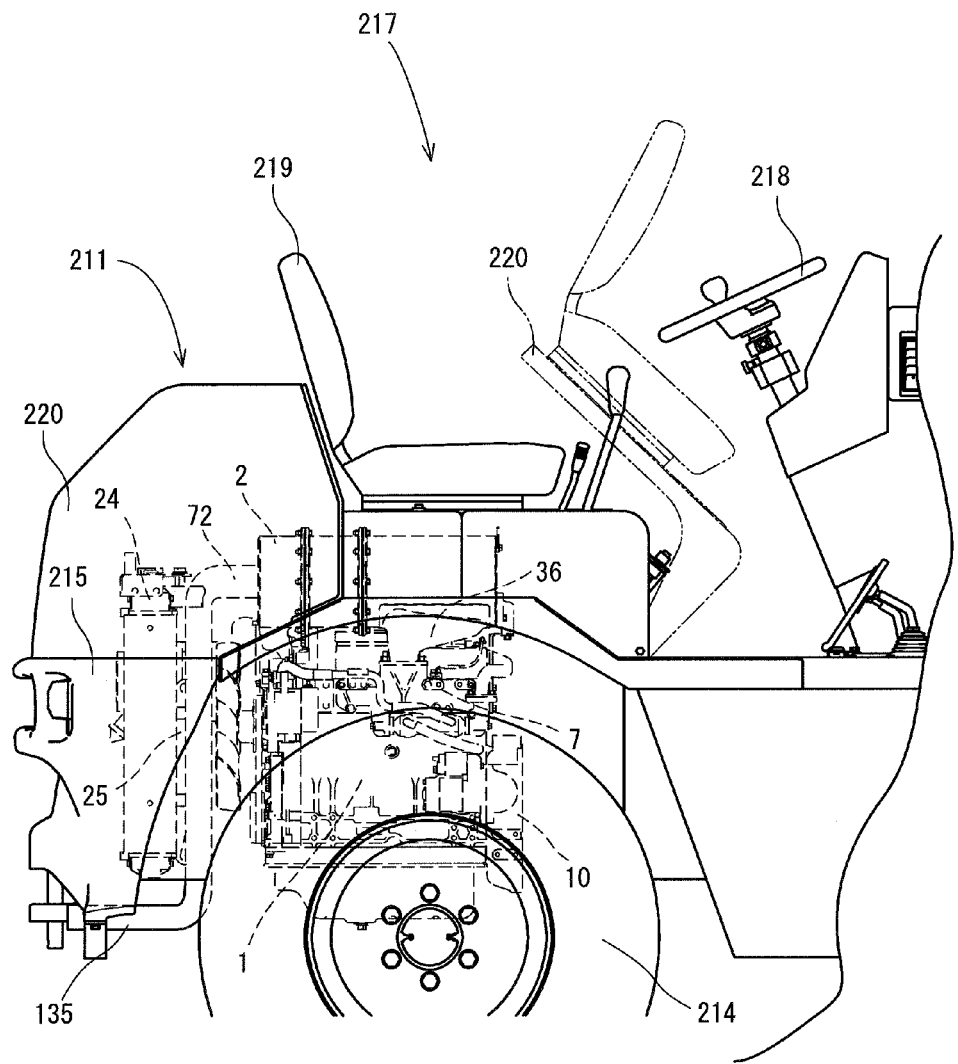
FIG. 20 is an enlarged view of the right lateral surface of the wheel loader illustrated in FIG. 18.
Figure 21:
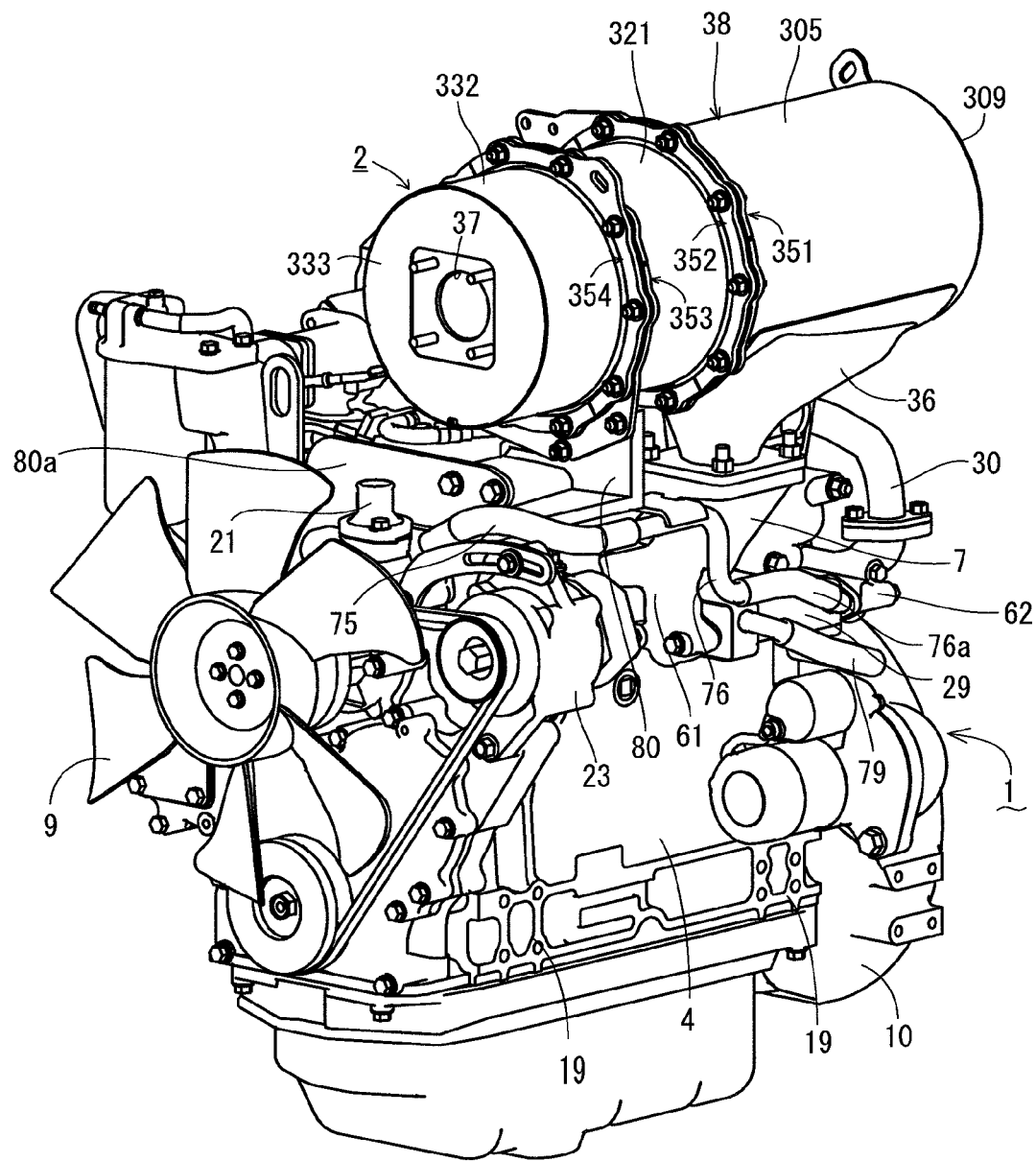
FIG. 21 is a perspective view viewed from the side of a cooling fan of the diesel engine of the present embodiment of the present invention of the instant application.
Figure 22:
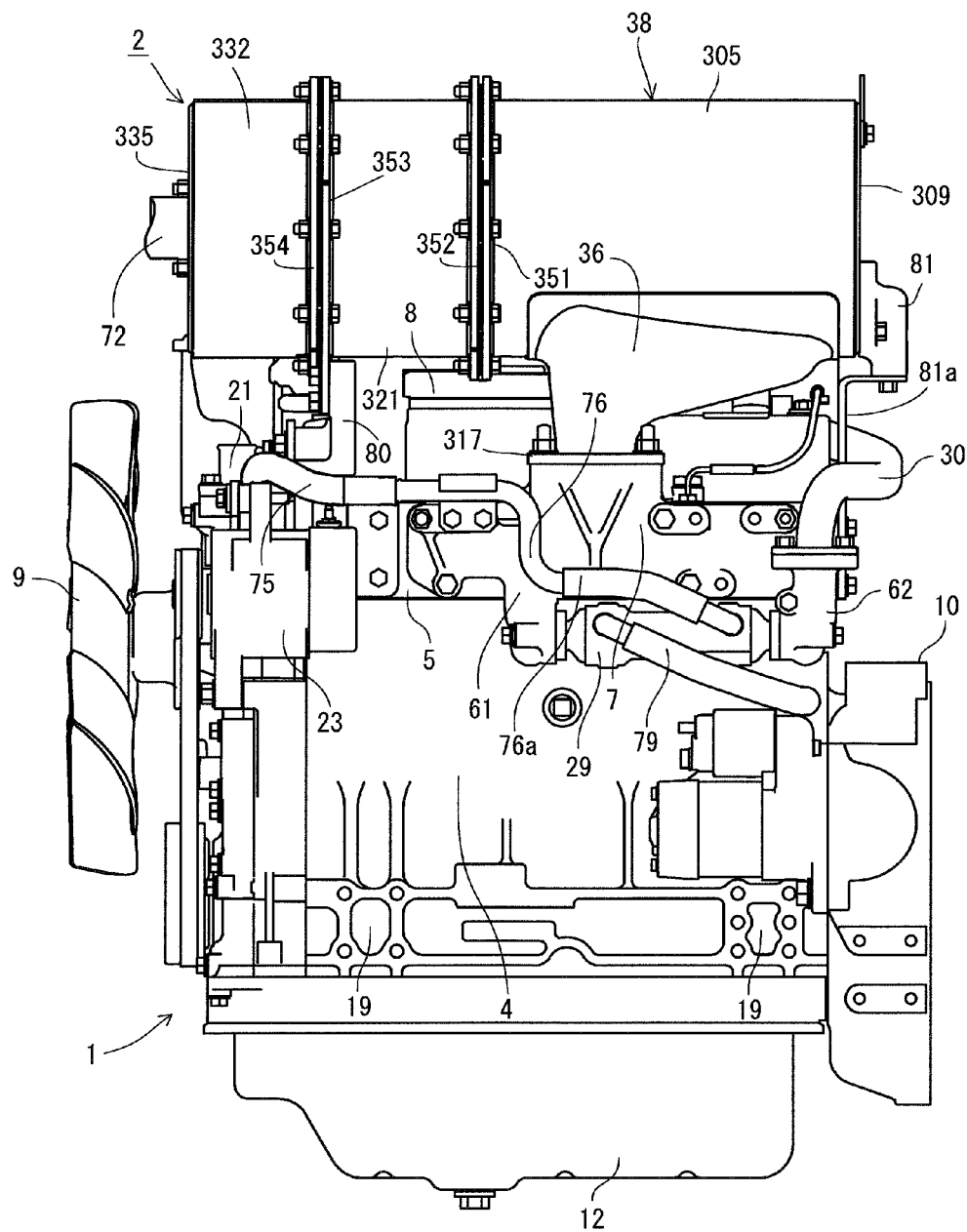
FIG. 22 is a right side view of the same.
Figure 23:
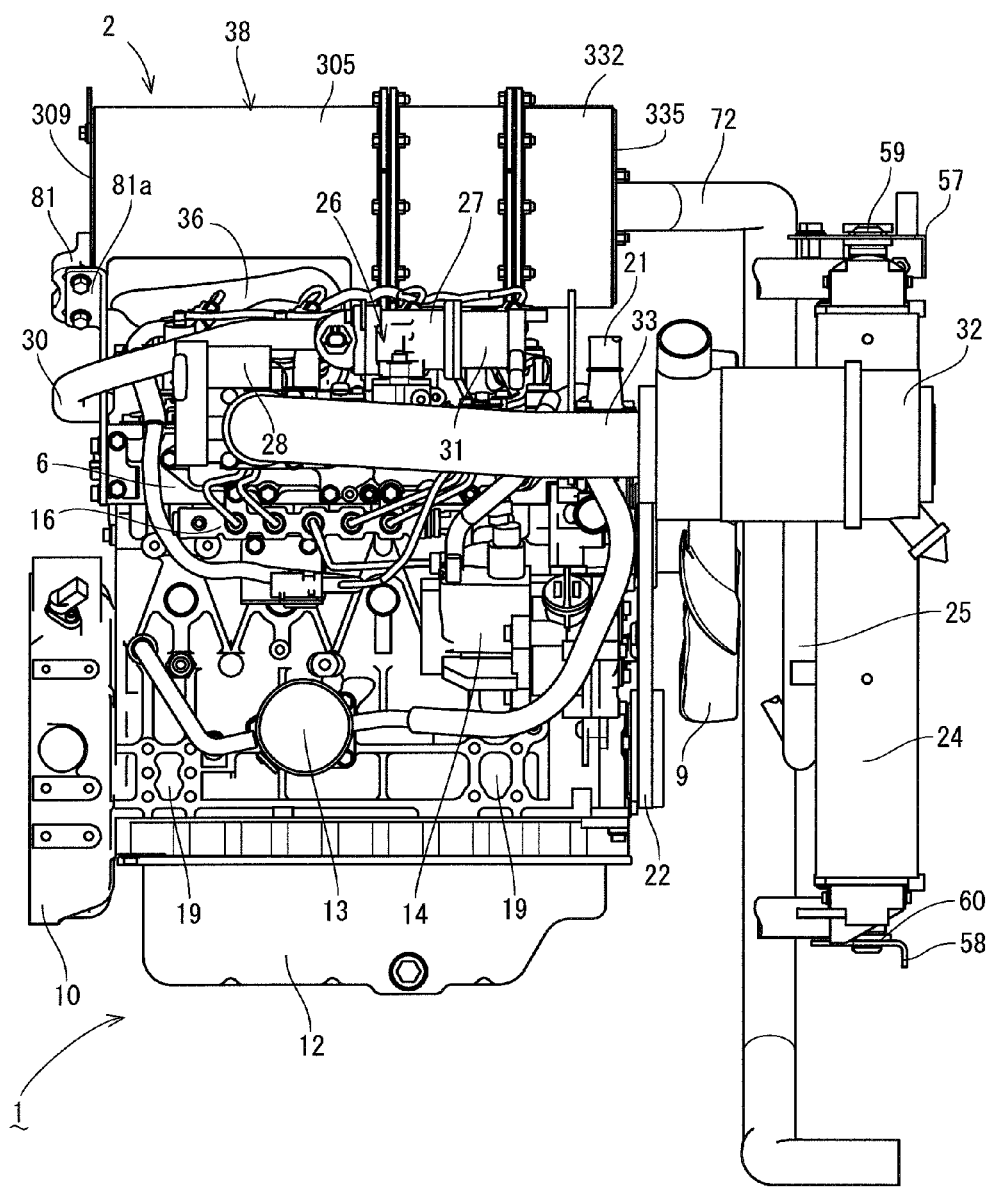
FIG. 23 is a left side view of the same.
Figure 24:
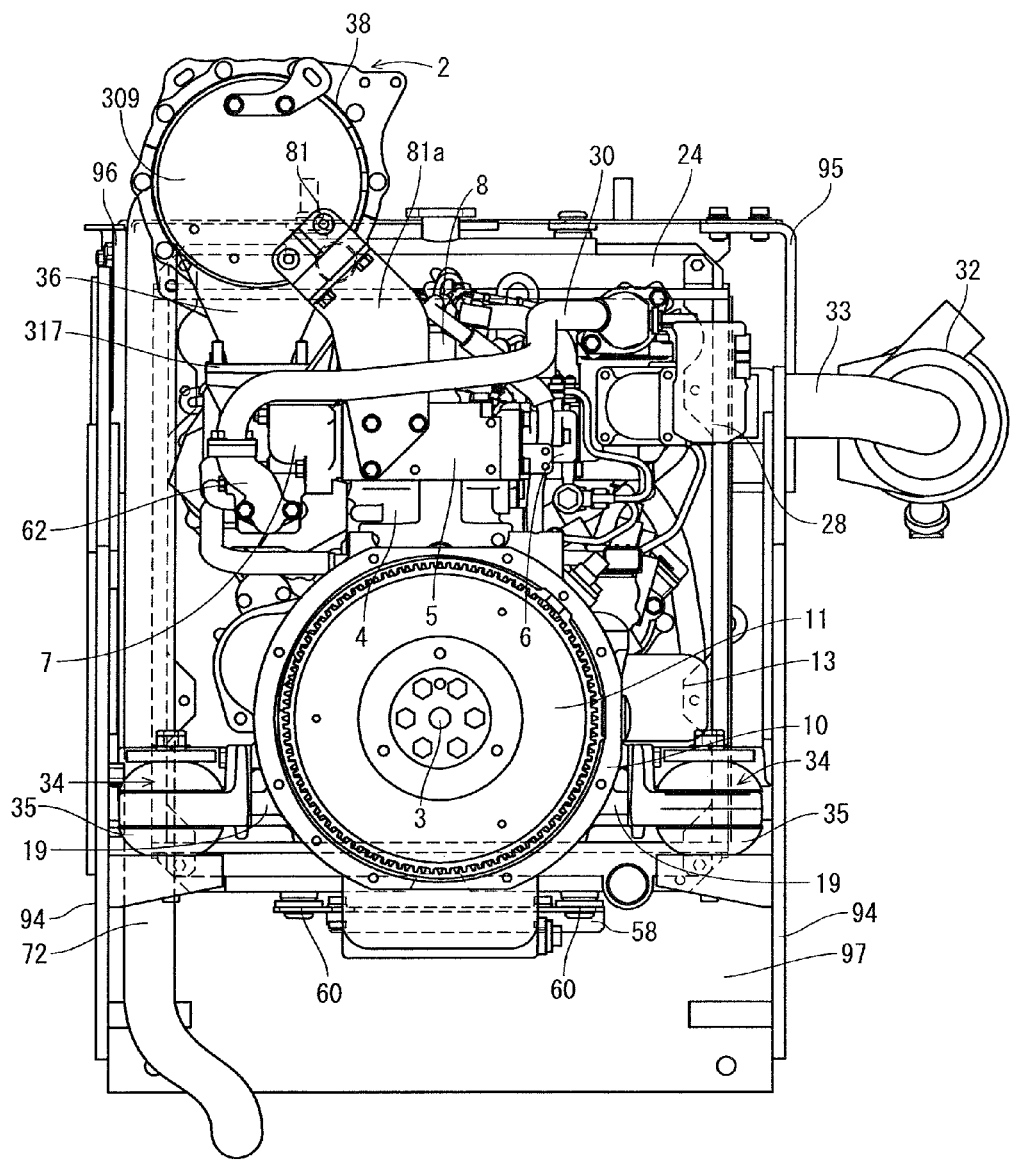
FIG. 24 is a front view of the same.
Figure 25:
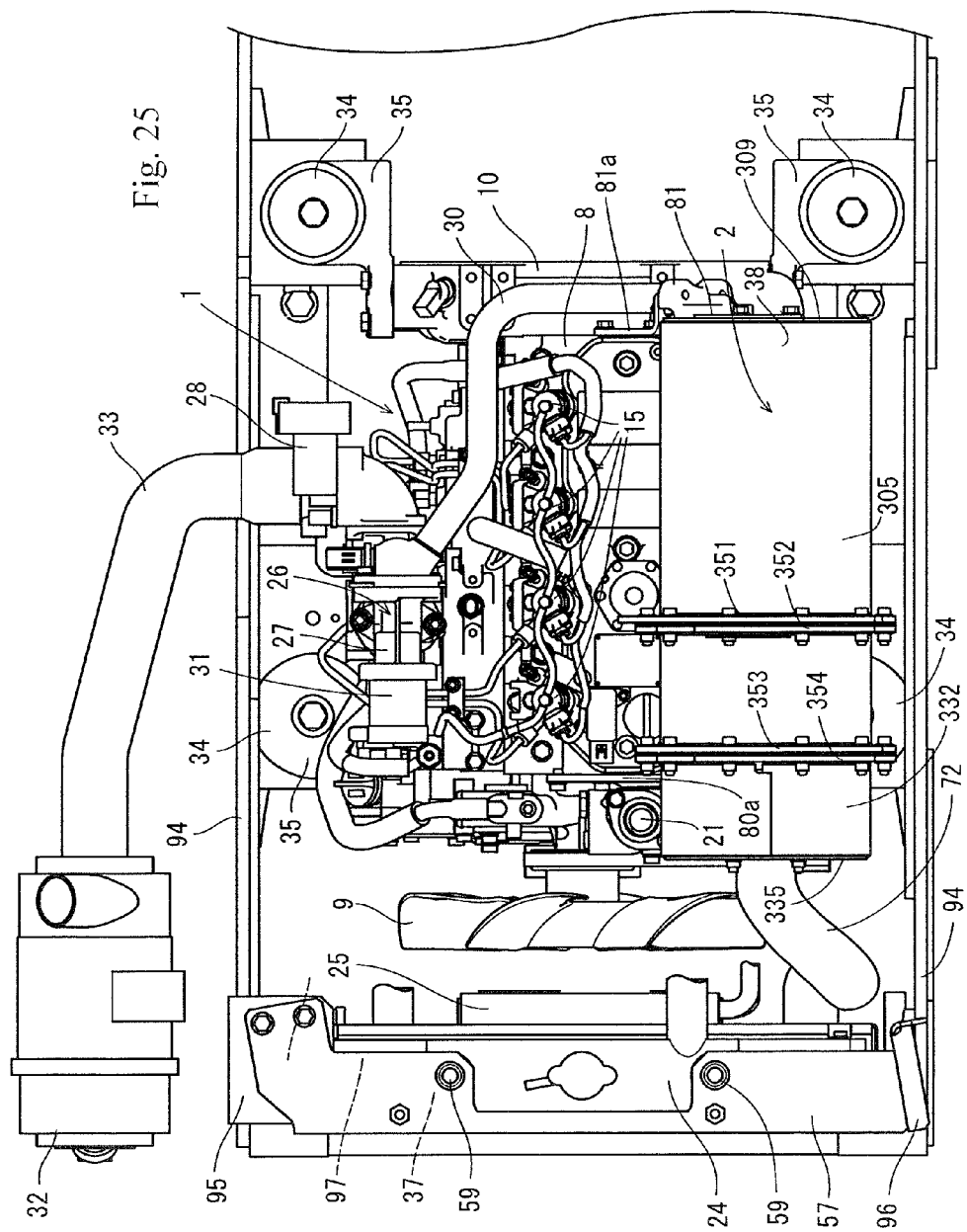
FIG. 25 is a plan view of the same.

As illustrated in FIGS. 18 to 20, in the wheel loader 211, the engine 1 is arranged on the lower side of the maneuvering seat 219, and a flywheel housing 10 is arranged in such a manner as to be positioned on the front portion side of the travelling machine body 216. That is, the engine 1 is arranged in such a manner that the output shaft of the engine is oriented along the front-and-back direction that the loader device 212 and the counter weight 215 are placed side by side. Then, the continuously regenerating exhaust gas purification device 2 (diesel particulate filter) is arranged on the upper portion on the right side of the engine 1.

That is, the exhaust gas purification device 2 is constituted in an approximately cylindrical shape elongated in the front-and-back direction parallel to the output shaft (crankshaft) of the engine 1 and arranged on the exhaust manifold 7 (see FIG. 4) of the engine 1. The exhaust pipe 72 has the constitution, in which one end portion thereof, connected to the end surface on the rear side of the exhaust gas purification device 2, is configured to be bent in the downward direction of the engine 1 in the rear of the engine 1, and the other end portion thereof is connected to the tail pipe 135 arranged on the lower side of the counter weight 215.

Also, the engine 1 is coupled with the air cleaner 32 that draws in fresh air (outside air) on the left side thereof. That is, the air cleaner 32 is arranged at a position on the reverse side of the exhaust gas purification device 2 with the engine 1 interposed therebetween, and the air cleaner 32 is arranged at a position apart from the exhaust gas purification device 2. Accordingly, the air cleaner 32, which is constituted of resin molding and susceptible to heat, can be suppressed from being affected or deformed due to the exhaust heat from the exhaust gas purification device 2.

Next, hereinafter, regarding the engine device of the present invention of the instant application, the diesel engine 1 mounted as a power engine on the work machine such as the aforementioned wheel loader 211 is exemplified and described referring to FIGS. 21 to 25. When the EGR cooler 29 is arranged on the engine 1, the EGR gas extraction pipe 61 is integrally formed in the exhaust manifold 7. Also, the pipe fitting member 62 is fastened with bolts to the exhaust manifold 7. The EGR gas inlet portion of the EGR cooler 29 is supported by the EGR gas extraction pipe 61, and the EGR gas outlet portion of the EGR cooler 29 is supported by the pipe fitting member 62 that connects the recirculation exhaust gas pipe 30, so that the EGR cooler 29 is arranged apart from the cylinder block 4 (specifically, the left side surface).

Also, the exhaust outlet of the exhaust manifold 7 is opened upward, and the EGR cooler 29 for cooling the EGR gas is arranged below the exhaust manifold 7. Accordingly, the exhaust manifold 7 and the EGR cooler 29 can be installed in a limited space along the one side surface of the engine 1. Then, the coolant pipe paths that connect the coolant pump 21 to the EGR cooler 29 are provided on the right side (the side of the exhaust manifold 7) of the diesel engine 1. Accordingly, it is configured such that not only the coolant from the coolant pump 21 is supplied to the cooling portion of the diesel engine 1, but also part of the coolant is transferred to the EGR cooler 29.

That is, one end side of the intermediate pipe 76 made of alloy is connected to the return hose 75 coupled with the coolant pump 21, and the other end side of the intermediate pipe 76 made of alloy is connected via a flexible hose 76a. Then, the coolant intake port of the EGR cooler 29 is connected to the cylinder block 4 via the coolant extraction hose 79. Accordingly, part of the coolant from the coolant pump 21 is supplied from the cylinder block 4 to the EGR cooler 29 and recirculated.

Next, the exhaust gas purification device 2 will be described referring to FIGS. 21 to 27. The exhaust gas purification device 2 is constituted in an approximately cylindrical shape elongated in the front-and-back direction parallel to the output shaft (crankshaft) of the diesel engine 1 and arranged above the exhaust manifold 7. On the front and back bilateral sides (the upstream side and the downstream side of the transfer direction of the exhaust gas) of the exhaust gas purification device 2, a purification inlet pipe (exhaust gas inlet pipe) 36 and a purification outlet pipe (exhaust gas outlet pipe) 37 are allocated and provided in front and back of the diesel engine 1. Then, the purification inlet pipe 36, which is the exhaust gas intake side of the exhaust gas purification device 2, is detachably fastened with bolts to the exhaust manifold 7 of the diesel engine 1, and the purification outlet pipe 37, which is the exhaust gas discharge side of the exhaust gas purification device 2, is connected to the tail pipe 135 via the exhaust pipe 72.

Figure 26:
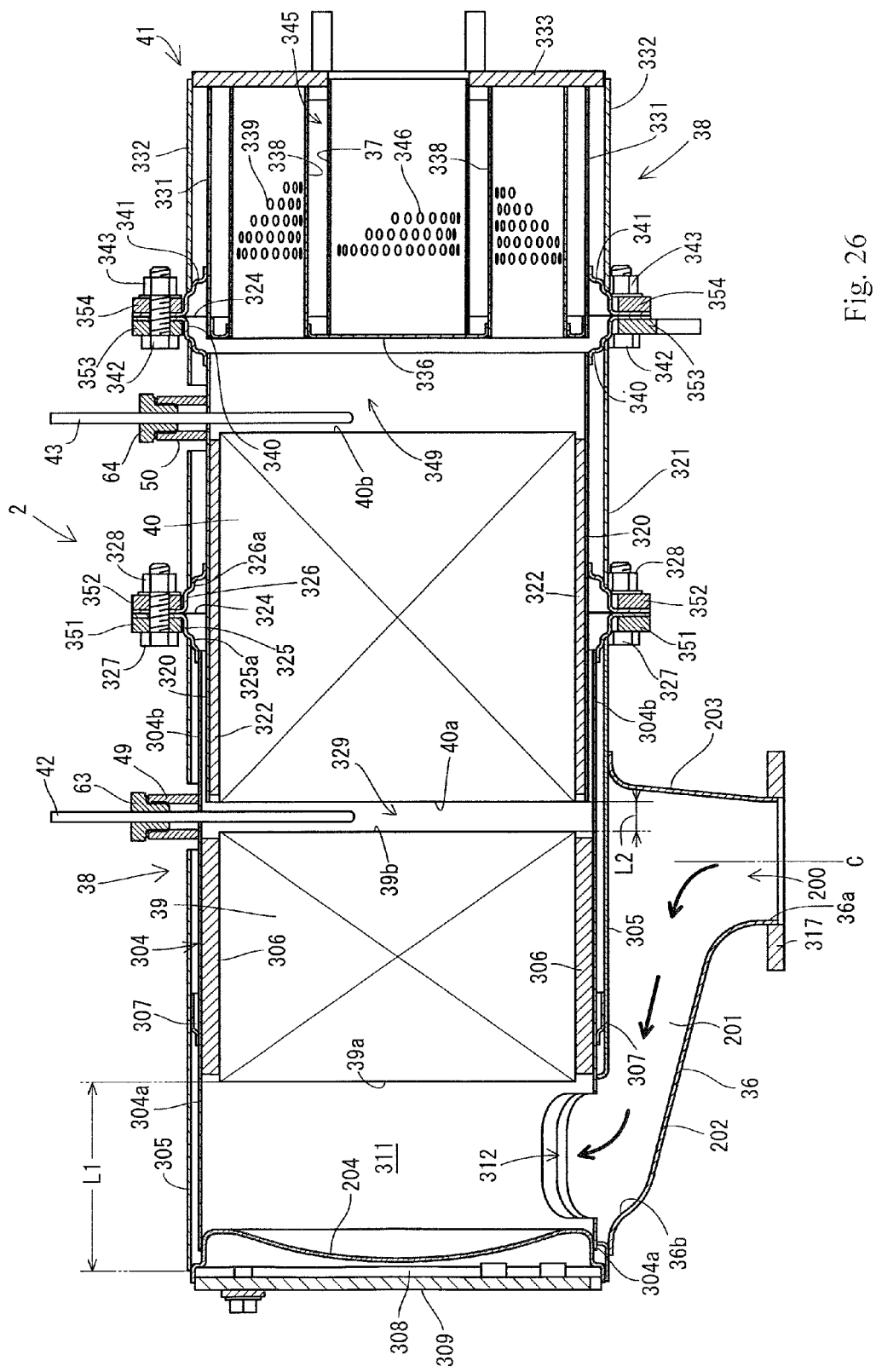
FIG. 26 is cross-sectional explanatory view of the exhaust gas purification device.

As illustrated in FIG. 26, the exhaust gas purification device 2 has structure in which, e.g., the diesel oxidation catalyst 39 such as platinum and the soot filter 40 having honeycomb structure are placed in series and stored in the exhaust gas purification case (DPF casing) 38 as a purification casing made of a heat-resistant metallic material via cylindrical inner-side cases 304 and 320. Then, the rear side portion of the exhaust gas purification case 38 is formed of the silencer 41, and the purification outlet pipe 37 is coupled with the exhaust pipe 72 on the end surface on the rear side of the silencer 41.

Also, as illustrated in FIGS. 21 to 25, the exhaust gas purification device 2 is mounted on the cylinder head 5 and the exhaust manifold 7 of the diesel engine 1 via a flange side bracket leg (first bracket leg) 80 and a casing side bracket leg (second bracket leg) 81 as a support body. In this case, the base end side of the flange side bracket leg 80 is detachably fastened with bolts to an outlet clamping flange 353 disposed on the outer circumferential side of the exhaust gas purification case 38. Also, the base end side of the casing side bracket leg 81 is detachably fastened with bolts to a catalyst external lid body 309 of the exhaust gas purification case 38.

Then, the flange side bracket leg 80 is fastened with bolts to the lateral surface on the side of the exhaust manifold 7 regarding the cylinder head 5 on the tip end side thereof and fastened with bolts to the lateral surface on the side of cooling fan 9 regarding the cylinder head 5 via an auxiliary bracket 80a. Accordingly, the tip end side of the flange side bracket leg 80 is detachably fastened with bolts to the lateral surface on the side of cooling fan 9 and the lateral surface on the side of the exhaust manifold 7 regarding the cylinder head 5. In this time, the flange side bracket leg 80 may be constituted integrally with the auxiliary bracket 80a.

Also, the tip end side of the casing side bracket leg 81 is detachably fastened with bolts to the lateral surface on the side of the flywheel housing 10 regarding the cylinder head 5 via an auxiliary bracket 81a. In this time, as is the same with the flange side bracket leg 80, the casing side bracket leg 81 may be constituted integrally with the auxiliary bracket 81a.

The inlet flange body 317 of the purification inlet pipe 36 is fastened to the outlet portion of the exhaust manifold 7, which allows the exhaust gas purification device 2 to be communicated and connected with the exhaust manifold 7 via the purification inlet pipe 36. As a result, the exhaust gas purification device 2 coupled with the diesel engine 1 by means of the bracket legs 80 and 81 is stably coupled and supported by the exhaust manifold 7 and the cylinder head 5, which are the high-rigidity components of the diesel engine 1. Accordingly, the prevention of the damage of the exhaust gas purification device 2 due to the vibration or the like can be achieved.

Regarding the aforementioned constitution, the exhaust gas of the diesel engine 1 flows from the exhaust manifold 7 of the diesel engine 1 into the side of the diesel oxidation catalyst 39 in the exhaust gas purification case 38 and transfers from the diesel oxidation catalyst 39 to the side of the soot filter 40, thereby being treated for purification. The particulate matter in the exhaust gas cannot pass through a porous partition wall of each cell in the soot filter 40. That is, the particulate matter in the exhaust gas is collected by the soot filter 40. Subsequently, the exhaust gas passing through the diesel oxidation catalyst 39 and the soot filter 40 is discharged from the tail pipe 135.

When the exhaust gas passes through the diesel oxidation catalyst 39 and the soot filter 40, and the temperature of the exhaust gas exceeds a regenerating possibility temperature (e.g., approximately 300 degrees Celsius), NO (nitrogen monoxide) in the exhaust gas is oxidized into unstable NO2 (nitrogen dioxide) by the action of the diesel oxidation catalyst 39. Then, the particulate matter collected by the soot filter 40 is oxidized and removed by O (oxygen) released in a case when NO2 is returned to NO. It is noted that when the particulate matter is accumulated in the soot filter 40, the particulate matter is oxidized and removed by maintaining the temperature of the exhaust gas at the regenerating possibility temperature or higher, so that collection capability of the soot filter 40 for the particulate matter is restored (the soot filter 40 is regenerated).

Figure 27:
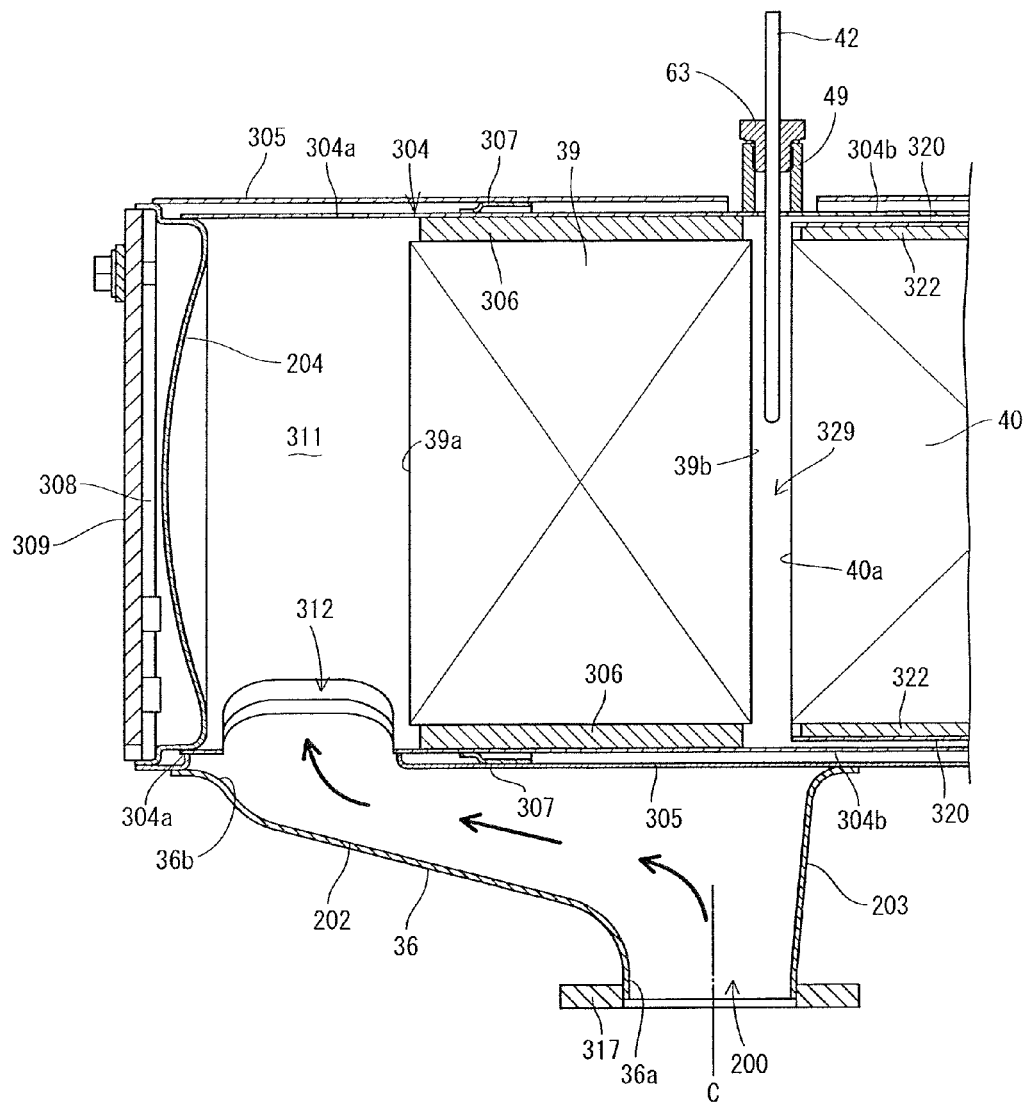
FIG. 27 is an enlarged side cross-sectional view on the exhaust gas upstream side of the exhaust gas purification device.

As illustrated in FIGS. 26 and 27, the diesel oxidation catalyst 39 is provided in the approximately cylindrical catalyst inner-side case 304 made of a heat-resistant metallic material. The catalyst inner-side case 304 is provided in the approximately cylindrical catalyst outer-side case 305 made of a heat-resistant metallic material. That is, the catalyst inner-side case 304 is fitted onto the outer side of the diesel oxidation catalyst 39 via a mat-shaped catalyst heat insulating material 306 made of ceramic fibers. The catalyst heat insulating material 306 is press-fitted between the diesel oxidation catalyst 39 and the catalyst inner-side case 304, thereby protecting the diesel oxidation catalyst 39. Also, the catalyst outer-side case 305 is fitted onto the outer side of the catalyst inner-side case 304 via a thin-plate support body 307 whose cross section is formed in an approximately S shape. The catalyst outer-side case 305 is one of elements constituting the aforementioned exhaust gas purification case 38. The stress (mechanical vibration or deforming force) of the catalyst outer-side case 305, which is transmitted to the catalyst inner-side case 304, is reduced by the thin-plate support body 307.

A disc-shaped catalyst inner lid body 308 is welded and adhered to one side end portions of the catalyst inner-side case 304 and the catalyst outer-side case 305, and a catalyst external lid body 9 is fastened with nuts and bolts to the outer surface side of the catalyst inner lid body 308. Then, the gas inflow lateral end surface 38a of the diesel oxidation catalyst 38 and the catalyst inner lid body 308 are separated from each other at a constant distance L1 apart, and an exhaust gas inflow space 311 is formed between a gas inflow lateral end surface 302a and the catalyst inner lid body 308. Furthermore, an exhaust gas inflow port 312 facing the exhaust gas inflow space 311 is opened in the catalyst inner-side case 304 and the catalyst outer-side case 305. The opening edge of the exhaust gas inflow port 312 of the catalyst outer-side case 305 is bent and formed to the catalyst inner-side case 304. A gap between the opening edge of the catalyst inner-side case 304 and the opening edge of the catalyst outer-side case 305 is closed by the bending edge, so that the exhaust gas can be prevented from flowing between the catalyst inner-side case 304 and the catalyst outer-side case 305.

The purification inlet pipe 36 is arranged on the outer lateral surface of the catalyst outer-side case 305 on which the exhaust gas inflow port 312 is formed. The purification inlet pipe 36 is formed in a semi-cylindrical shape opened upward, a rectangular upward opening end portion 36b on the large-diameter side thereof covers the exhaust gas inflow port 312 and is welded and fixed on the outer lateral surface of the catalyst outer-side case 305 in such a manner as to extend in the longitudinal (right-and-left) direction of the catalyst outer-side case 305. Accordingly, the upward opening end portion 36b, which is on the exhaust gas outlet side of the purification inlet pipe 36, is communicated and connected with the exhaust gas inflow port 312 of the catalyst outer-side case 305. As the exhaust gas inlet side, a small-diameter perfect-circle downward opening end portion 36a is opened on the right end portion in proximity of a longitudinal midway portion of the catalyst outer-side case 305, regarding the purification inlet pipe 36. The inlet flange body 317 is welded and fixed on the outer circumferential portion of the downward opening end portion 36a. The inlet flange body 317 is detachably fastened with bolts to the exhaust gas discharge side of the exhaust manifold 7.

The left end portion side of the purification inlet pipe 36 covers the exhaust gas inflow port 312 of the catalyst outer-side case 305 from the outside. The downward opening end portion 36a as the exhaust gas inlet side is formed on the right end portion of the purification inlet pipe 36. That is, the downward opening end portion 36a of the purification inlet pipe 36 with respect to the exhaust gas inflow port 312 is provided with offset to the exhaust gas downstream side in the exhaust gas purification case 38 (provided by shifting the position to the right side of the catalyst outer-side case 305). Also, the upward opening end portion 36b of the purification inlet pipe 36 covers the exhaust gas inflow port 312 and is welded and fixed on the outer lateral surface of the catalyst outer-side case 305 in such a manner as to extend in the longitudinal (front-and-back) direction of the catalyst outer-side case 305. Accordingly, an exhaust gas introduction path 200 is formed by the outer lateral surface of the catalyst outer-side case 305 and the inner lateral surface of a pipe wall 201 of the purification inlet pipe 36.

As a result, the exhaust gas purification case 38 (the catalyst outer-side case 305) can be warmed by the exhaust gas in the purification inlet pipe 36 (in the introduction path 200), and the reduction of the temperature of the exhaust gas passing through the exhaust gas purification case 38 (the catalyst outer-side case 305) can be suppressed. Accordingly, the exhaust gas purification capacity of the exhaust gas purification device 2 can be improved. Also, the purification inlet pipe 36 can be utilized as the intensity member of the exhaust gas purification case 38 (the catalyst outer-side case 305), and the improvement of the rigidity of the exhaust gas purification case 38 (the catalyst outer-side case 305) can be achieved with simple constitution without increasing the thickness of the exhaust gas purification case 38 (the catalyst outer-side case 305) or without increasing the number of components to an extreme degree.

Also, a portion extended along the exhaust gas purification case 38 (the catalyst outer-side case 305) on the pipe wall 201 of the purification inlet pipe 36 is formed on a longitudinal inclination portion 202 that is inclined in such a manner as to come close to the outer lateral surface of the exhaust gas purification case 38 (the catalyst outer-side case 305) in leading from the exhaust gas inlet side (the downward opening end portion 36a) to the exhaust gas outlet side (the upward opening end portion 36b) of the purification inlet pipe 36. In other words, the portion extended along the exhaust gas purification case 38 (the catalyst outer-side case 305) on the pipe wall 201 is represented as the longitudinal inclination portion 202 formed in a shape that a corner is obliquely cut down when viewed from the side. It is configured such that the inner lateral surface of the longitudinal inclination portion 202 of the purification inlet pipe 36 covers by the exhaust gas inflow port 312 of the exhaust gas purification case 38 (the catalyst outer-side case 305), and the exhaust gas that is flown from the exhaust manifold 7 is drifted to the direction of the exhaust gas inflow port 312.

Regarding the aforementioned constitution, the exhaust gas that flows from the exhaust manifold 7 to the purification inlet pipe 36 collides the inner lateral surface of the longitudinal inclination portion 202 of the purification inlet pipe 36 and is drifted to the exhaust gas inflow port 312 and smoothly guided into the exhaust gas inflow space 311 via the exhaust gas inflow port 312. That is, the inner lateral surface of the longitudinal inclination portion 202 of the purification inlet pipe 36 is used as a guide surface that transfers the exhaust gas to the exhaust gas inflow port 312, and the purification inlet pipe 36 can be utilized as the intensity member of the exhaust gas purification case 38 (the catalyst outer-side case 305).

Accordingly, while the improvement of the rigidity of the exhaust gas purification case 38 (the catalyst outer-side case 305) can be achieved with simple constitution without increasing the thickness of the exhaust gas purification case 38 (the catalyst outer-side case 305) or without increasing the number of components to an extreme degree, the exhaust gas from the exhaust manifold 7 can be smoothly guided into the exhaust gas purification case 38 (the catalyst outer-side case 305) by the inner lateral surface of the longitudinal inclination portion 202 of the purification inlet pipe 36. Consequently, the exhaust gas can be supplied to the wide area of the diesel oxidation catalyst 39, which is the gas purification body in a DPF casing 60 (catalyst outer-side case 5), which contributes to the efficient application of the diesel oxidation catalyst 39.

In contrast, a portion in proximity of the purification outlet pipe 37, which is the exhaust gas outflow port on the pipe wall 201 of the purification inlet pipe 36, is formed on a lateral inclination portion 203 that is inclined in such a manner as to separate from the center liner C of the exhaust gas inlet side (the downward opening end portion 36a) in leading from the exhaust gas inlet side (the downward opening end portion 36a) to the exhaust gas outlet side (the upward opening end portion 36b) of the purification inlet pipe 36. In other words, an approximately half of the portion in proximity of the purification outlet pipe 37 on the pipe wall 201 is represented as the lateral inclination portion 203 whose radius is widen in a horn shape to the downward opening end portion 36a and the upward opening end portion 36b.

Thus, the lateral inclination portion 203 is constituted in the pipe wall 201, so that although the exhaust gas in the portion in proximity of the purification outlet pipe 37 on the inner lateral surface of the pipe wall 201 of the purification inlet pipe 36 collides the outer lateral surface of the exhaust gas purification case 38 (the catalyst outer-side case 305), the area of the portion is secured. Accordingly, the formation of swirling flow or turbulent flow is made on the exhaust gas upstream side with respect to the exhaust gas inflow port 312. Accordingly, the exhaust gas can be more steadily, equally supplied by the end surface 39a (a gas inflow side end surface 39a) on the exhaust gas upstream side of the diesel oxidation catalyst 39.

Furthermore, a concave surface portion 204 concaved outwardly is formed on the inner surface side of the catalyst inner lid body 308, regarding the lateral end portion in proximity of the exhaust gas inflow port 312 of the exhaust gas purification case 38 (the catalyst outer-side case 305). Accordingly, the catalyst inner lid body 308 is formed in a bowl shape whose approximate central portion on the inner surface side is depressed most due to the existence of the concave surface portion 204. Accordingly, the exhaust gas can be supplied from the exhaust gas inflow port 312 of the exhaust gas purification case 38 (the catalyst outer-side case 305) to the concave surface portion 204 of the catalyst inner lid body 308, and the swirling flow or the turbulent flow can be easily formed on the exhaust gas upstream side (the exhaust gas inflow space 311) of the diesel oxidation catalyst 39 by the diffusion action of the exhaust gas by means of the concave surface portion 204. Accordingly, the exhaust gas can be supplied as equally as possible to the end surface (the gas inflow side end surface 39a) on the exhaust gas upstream side of the diesel oxidation catalyst 39.

Regarding the aforementioned constitution, the exhaust gas of the diesel engine 1 enters the exhaust gas inlet pipe 16 from the exhaust manifold 7 and enters the exhaust gas inflow space 311 from the purification inlet pipe 36 via the exhaust gas inflow port 312, and is supplied from the gas inflow side end surface 39a on the front side thereof to the diesel oxidation catalyst 39. The nitrogen dioxide (NO2) is generated by the oxidation action of the diesel oxidation catalyst 39.

Also, the soot filter 40 is provided in the approximately cylindrical filter inner-side case 320 made of a heat-resistant metallic material. The filter inner-side case 320 is provided in an approximately cylindrical filter outer-side case 321 made of a heat-resistant metallic material. That is, the filter inner-side case 320 is fitted on the outer side of the soot filter 40 via a mat-shaped filter insulating material 322 made of ceramic fibers. The filter outer-side case 321, along with the catalyst outer-side case 305, is one of constituent elements constituting the aforementioned exhaust gas purification case 38. It is noted that the soot filter 40 is protected by press-fitting the filter insulating material 322 between the soot filter 40 and the filter inner-side case 320.

The catalyst inner-side case 304 whose ridgeline is formed in a straight, cylindrical shape is constituted by an upstream side cylindrical portion 304a that stores the diesel oxidation catalyst 39, and a downstream side cylindrical portion 304b into which the filter inner-side case 320 is inserted. It is noted that the upstream side cylindrical portion 304a and the downstream side cylindrical portion 304b are cylinders having an approximately identical diameter and integrally formed. Furthermore, the catalyst inner-side case 304 includes a thin-plate and ring-shaped catalyst side joining flange 325 that is welded and fixed on the outer circumference of the catalyst inner-side case 304, and a thin-plate and ring-shaped filter side joining flange 326 that is welded and fixed on the outer circumference of the filter inner-side case 320. The cross sections of the catalyst side joining flange 325 and the filter side joining flange 326 are formed in an approximately L shape and in a doughnut shape.

The end portion of the downstream side cylindrical portion 304b of the catalyst inner-side case 304 is welded and fixed to the inner circumferential side of the catalyst side joining flange 325. The outer circumferential side of the catalyst side joining flange 325 protrudes to the outer circumferential side (radiation direction) of the catalyst outer-side case 305. The bending corner portion of the catalyst side joining flange 325 is provided as a stair-shaped step portion 325a. The end portion on the exhaust gas downstream side of the catalyst outer-side case 305 is welded and fixed on the step portion 325a of the catalyst side joining flange 325.

In contrast, the inner circumferential side of the filter side joining flange 326 is welded and fixed on the longitudinal midway portion (the midway portion in the transfer direction of the exhaust gas) on the outer circumference of the filter inner-side case 320. The outer circumferential side of the filter side joining flange 326 protrudes to the outer circumferential side (radiation direction) of the filter outer-side case 321. The bending corner portion of the filter side joining flange 326 is provided as a stair-shaped step portion 326a. The end portion on the exhaust gas upstream side of the filter outer-side case 321 is welded and fixed on the step portion 326a of the filter side joining flange 326. It is noted that regarding the filter inner-side case 320, the ridgeline thereof is formed in a straight, cylindrical shape. The end portion on the exhaust gas upstream side and the end portion on the exhaust gas downstream side of the filter inner-side case 320 are cylinders having an approximately identical diameter and integrally formed.

The catalyst side joining flange 325 and the filter side joining flange 326, both of which are opposite to each other via the gasket 324, are fastened with bolts by means of a pair of thick-plate center clamping flanges 351 and 352 that surround the outer circumferential side of the outer-side case 305 and 321, in a state of being sandwiched from the bilateral sides of the transfer direction of the exhaust gas. That is, the center clamping flanges 351 and 352 are fastened with nuts 328 and bolts 327, and the center clamping flanges 351 and 352 respectively clamp the joining flanges 325 and 326, so that the catalyst outer-side case 305 and the filter outer-side case 321 are detachably coupled.

Then, in a state where the end portion on the exhaust gas upstream side of the filter outer-side case 321 is coupled with the end portion of the exhaust gas downstream side of the catalyst outer-side case 305 via the center clamping flanges 351 and 352 and the joining flanges 325 and 326, a catalyst downstream side space 329 is formed between the diesel oxidation catalyst 39 and the soot filter 40. That is, the gas outflow side end surface 39b of the diesel oxidation catalyst 39 and the intake side end surface 40a of the soot filter 40 (the filter inner-side case 320) are opposite to each other only with a sensor installation interval L2 apart.

Regarding the aforementioned constitution, the nitrogen dioxide (NO2) generated by the oxidation action of the diesel oxidation catalyst 39 is supplied from one side end surface (the intake side end surface 40a) into the soot filter 40. The particulate matter (PM) included in the exhaust gas of the diesel engine 1 is collected by the soot filter 40 and consecutively oxidized and removed by the nitrogen dioxide (NO2). In addition to the removal of the particulate matter (PM) included in the exhaust gas of the diesel engine 1, the content of carbon monoxide (CO) or hydrogen carbon (HC) in the exhaust gas of the diesel engine 1 is reduced.

Also, the silencer 41 that damps the noise of the exhaust gas discharged from the diesel engine 1 includes an approximately cylindrical silencing inner-side case 331 made of a heat-resistant metallic material, an approximately cylindrical silencing outer-side case 332 made of a heat-resistant metallic material, and a disc-shaped silencing outer lid body 333 welded and adhered to the lateral end portion on the exhaust gas downstream side of the silencing outer-side case 332. The silencing inner-side case 331 is provided in the silencing outer-side case 332. With the catalyst outer-side case 305 and a filter outer-side case 231, the silencing outer-side case 332 constitutes the aforementioned exhaust gas purification case 38.

A disc-shaped silencing inner lid body 336 is welded and adhered to the end portion on the exhaust gas upstream side of the silencing inner-side case 331. A pair of exhaust gas introduction pipes 338 extended parallel to the transfer direction of the exhaust gas is provided in the silencing inner-side case 331. The exhaust gas upstream side of each exhaust gas introduction pipe 38 penetrates the silencing inner lid body 336, but the positions of the end portion on the exhaust gas upstream side of each exhaust gas introduction pipe 338 and the end portion on the exhaust gas upstream side of the silencing inner-side case 331 are approximately corresponded when viewed from the lateral cross-section. The end portion on the exhaust gas upstream side of each exhaust gas introduction pipe 338 is left open as it is. A multitude of communication holes 339 are formed in each exhaust gas introduction pipe 338. Each exhaust gas introduction pipe 338 communicates with an expansion chamber 345 via the communication holes 339. The expansion chamber 345 is formed in the interior of the silencing inner-side case 331 (between the silencing inner lid body 336 and the silencing outer lid body 333).

The silencing outer lid body 333 of the silencing outer-side case 332 is penetrated by an exhaust gas outlet pipe 334 arranged between the exhaust gas introduction pipes 338. The exhaust gas upstream side of the exhaust gas outlet pipe 334 is blocked by the silencing inner lid body 336. A multitude of exhaust holes 346 are formed in a section in the silencing inner-side case 331 regarding the exhaust gas outlet pipe 334. Each exhaust gas introduction pipe 338 communicates with the exhaust gas outlet pipe 334 via the multitude of communication holes 339, the expansion chamber 345, and the multitude of exhaust holes 346. The tail pipe (not illustrated) is connected to the other end side of the exhaust gas outlet pipe 334. Regarding the aforementioned constitution, the exhaust gas that enters both the exhaust gas introduction pipes 338 of the silencing inner-side case 331 passes through the exhaust gas outlet pipe 334 via the plurality of communication holes 339, the expansion chamber 345, and the multitude of exhaust holes 346 and is discharged to the outside of the silencer 41 via the tail pipe.

The inner-diameter side of a thin-plate and ring-shaped filter outlet-side joining flange 340 is welded and fixed on the end portion on the exhaust gas downstream side of the filter inner-side case 320. The outer-diameter side of the filter outlet-side joining flange 340 protrudes to the outer circumferential side (the radiation direction on the radial outer side) of the filter outer-side case 321. The end portion on the exhaust gas downstream side of the filter outer-side case 321 is welded and fixed on the outer circumferential side of the filter outlet-side joining flange 340. A thin-plate silencing side joining flange 341 that projects on the outer circumferential side (the radial outer side) of the silencing outer-side case 332 is welded and fixed on the end portion on the exhaust gas upstream side of the silencing inner-side case 331. The end portion on the exhaust gas upstream side of the silencing outer-side case 332 is welded and fixed on the outer circumferential side of the silencing side joining flange 341.

The filter outlet-side joining flange 340 and the silencing side joining flange 341, both of which are opposite to each other via the gasket 324, are fastened with bolts by means of a pair of thick-plate outlet clamping flanges 353 and 354 that surround the outer circumferential side of the outer-side case 321 and 332, in a state of being sandwiched from the bilateral sides of the transfer direction of the exhaust gas. That is, the outlet clamping flanges 353 and 354 are fastened with nuts 342 and bolts 343, and the outlet clamping flanges 353 and 354 respectively clamp the joining flanges 340 and 341, so that the filter outer-side case 321 and the silencing outer-side case 332 are detachably coupled.

The silencer 41 constituted in the aforementioned manner is configured such that the end portion on the exhaust gas upstream side of the silencing inner-side case 331 protrudes from the end portion (the silencing side joining flange 341) on the exhaust gas upstream side of the silencing outer-side case 332. That is, in a state where the silencing outer-side case 332 is coupled with the filter outer-side case 321, the end portion on the exhaust gas upstream side of the silencing inner-side case 331 is inserted into a filter downstream-side space 349 formed in the end portion (the filter outlet-side joining flange 340) on the exhaust gas downstream side of the filter outer-side case 321.

With the aforementioned constitution, the length of the transfer direction of the exhaust gas in the silencer 41 (the silencing outer-side case 332) can be reduced while the length of the transfer direction of the exhaust gas in each exhaust gas introduction pipe 338 is maintained. Accordingly, regarding the exhaust gas purification device 2 that includes the silencer 41, the miniaturization of the whole of the exhaust gas purification device 2 and the maintenance and improvement of the silencing function of the silencer 41 can be compatibly achieved.

Furthermore, hereinafter, the constitution of an upstream side gas temperature sensor 42 and a downstream side gas temperature sensor that are installed in the exhaust gas purification device 2 will be described. One end side of a cylindrical sensor boss body 49 is welded and fixed between the upstream side cylindrical portion 304a and the downstream side cylindrical portion 304b on the outer circumferential surface of the catalyst inner-side case 304. The other end side of the sensor boss body 49 is extended from the sensor mounting opening of the catalyst outer-side case 305 to the outside of the catalyst outer-side case 305 in the radiation direction. That is, the sensor boss body 49 for supporting the exhaust gas sensor is provided in the vicinity of the boundary position (the catalyst downstream side space 329) connected between the diesel oxidation catalyst 39 and the soot filter 40 on the outer circumferential surface of the catalyst inner-side case 304 in such a manner as to penetrate the catalyst outer-side case 305.

Then, a sensor mounting bolt 63 is threadedly mounted on the other end side of the sensor boss body 49. For example, the sensor mounting bolt 63 penetrates the upstream side gas temperature sensor 42 of a thermistor type, and the upstream side gas temperature sensor 42 is supported by the sensor boss body 49 via the sensor mounting bolt 63. The detection portion of the upstream side gas temperature sensor 42 protrudes into the catalyst downstream side space 329. Regarding the aforementioned constitution, when the exhaust gas is discharged from the gas outflow side end surface 39b of the diesel oxidation catalyst 39, the temperature of the exhaust gas is detected by the upstream side gas temperature sensor 42.

The sensor boss body 49 on the exhaust gas upstream side is positioned on the extension of the gas outflow side end surface 39b orthogonal to the transfer direction of the exhaust gas regarding the diesel oxidation catalyst 39 and on the extension of the intake side end surface 40a orthogonal to the transfer direction of the exhaust gas regarding the soot filter 40. In this case, it is possible to set (contiguously arrange) a very short arrangement interval between the gas outflow side end surface 39b of the diesel oxidation catalyst 39 and the intake side end surface 40a of the soot filter 40, and the upstream side gas temperature sensor 42, so that the miniaturization of the whole of the exhaust gas purification device 2 can be achieved, and the accuracy of detection of the upstream side gas temperature sensor 42 can be improved, which contributes to the improvement of performance such as the regeneration control for the exhaust gas purification device 2.

Also, one end side of a cylindrical sensor boss body 50 is welded and fixed in the vicinity of the filter downstream-side space 349 on the outer circumferential surface of the filter inner-side case 320. The other end side of the sensor boss body 50 is extended from the sensor mounting opening of the filter outer-side case 321 to the outside of the filter outer-side case 321 in the radiation direction. That is, the sensor boss body 50 for supporting the exhaust gas sensor is provided in the vicinity of the connection boundary position of the soot filter 40 on the outer circumferential surface of the filter inner-side case 320 in such a manner as to penetrate the filter outer-side case 321. A sensor mounting bolt 64 is threadedly mounted on the other end side of the sensor boss body 50.

Then, for example, the sensor mounting bolt 64 penetrates the downstream side gas temperature sensor 43 of a thermistor type, and the downstream side gas temperature sensor 43 is supported by the sensor boss body 50 via the sensor mounting bolt 64. The detection portion of the downstream side gas temperature sensor 43 protrudes into the filter downstream-side space 349. Regarding the aforementioned constitution, when the exhaust gas is discharged from the discharge side end surface 40b of the soot filter 40, the temperature of the exhaust gas is detected by the downstream side gas temperature sensor 43. It is noted that, although not illustrated in detail, as is the same with the sensor boss bodies 49 and 50 respectively corresponding to the gas temperature sensors 42 and 43, it goes without saying that the sensor boss body of a differential pressure sensor can be constituted.

Figure 28:
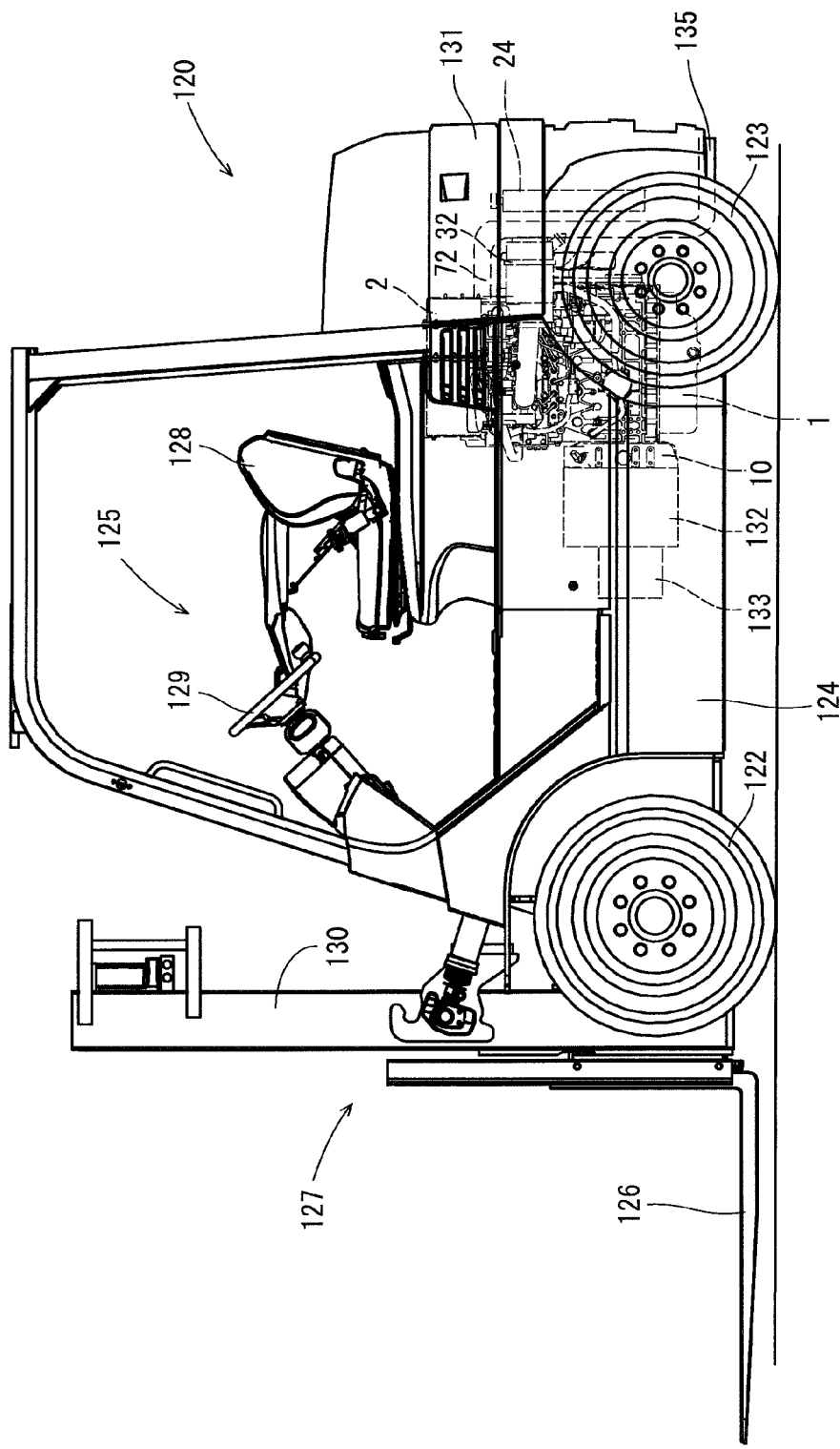
FIG. 28 is a side view of the forklift car, which is another example of the work machine of the present embodiment of the present invention of the instant application.
Figure 29:
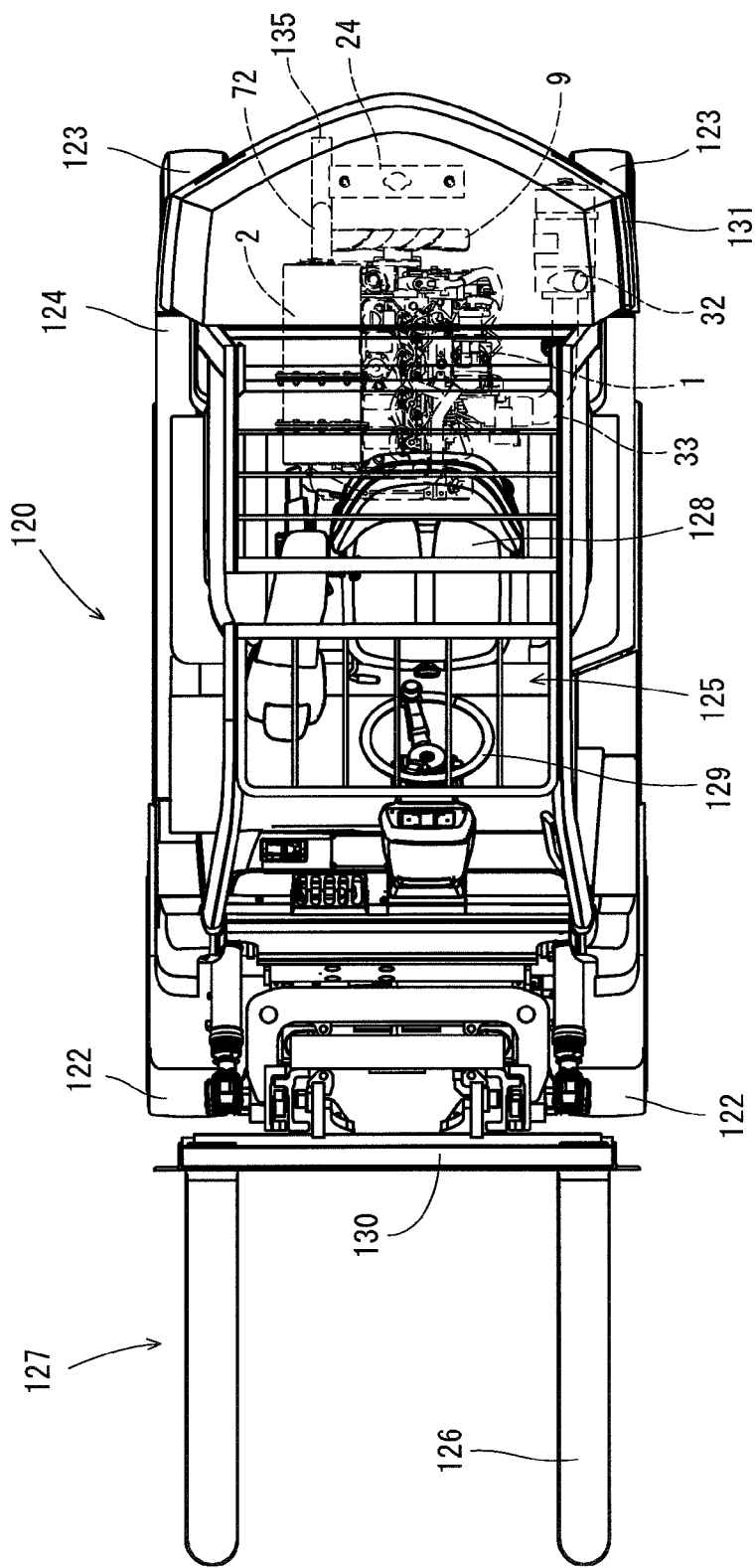
FIG. 29 is a plan view the forklift car of FIG. 28.

Subsequently, structure in which the diesel engine 1 is mounted on the forklift car 120 will be described referring to FIGS. 28 and 29. Regarding the forklift car 120, the diesel engine 1 is arranged on the lower side of the crankshaft 3 for the engine output, the pistons, and the maneuvering seat 128, and the exhaust gas purification device 2 is arranged on the upper right side of the diesel engine 1. Then, the radiator 24 is arranged at a position facing the cooling fan 9 in the rear of the diesel engine 1, and the air cleaner 32 is arranged on the left side in the rear of the diesel engine 1. That is, the air cleaner 32 is arranged at a position on the side opposite to the exhaust gas purification device 2 with the diesel engine 1 interposed therebetween.

The diesel engine 1 is arranged in such a manner that the flywheel housing 10 is positioned on the front portion side of the travelling machine body 124. That is, the diesel engine 1 is arranged in such a manner that an engine output shaft 74 is oriented along the front-and-back direction that the work unit 127 and the counter weight 131 are placed side by side. The mission case 132 is coupled with the front surface side of the flywheel housing 10. The power transmitted from the diesel engine 1 to the flywheel 11 is appropriately shifted by the mission case 132 and transmitted to the hydraulic drive source 133 for the front wheels 122, the rear wheels 123, and the fork 126.

Figure 39:
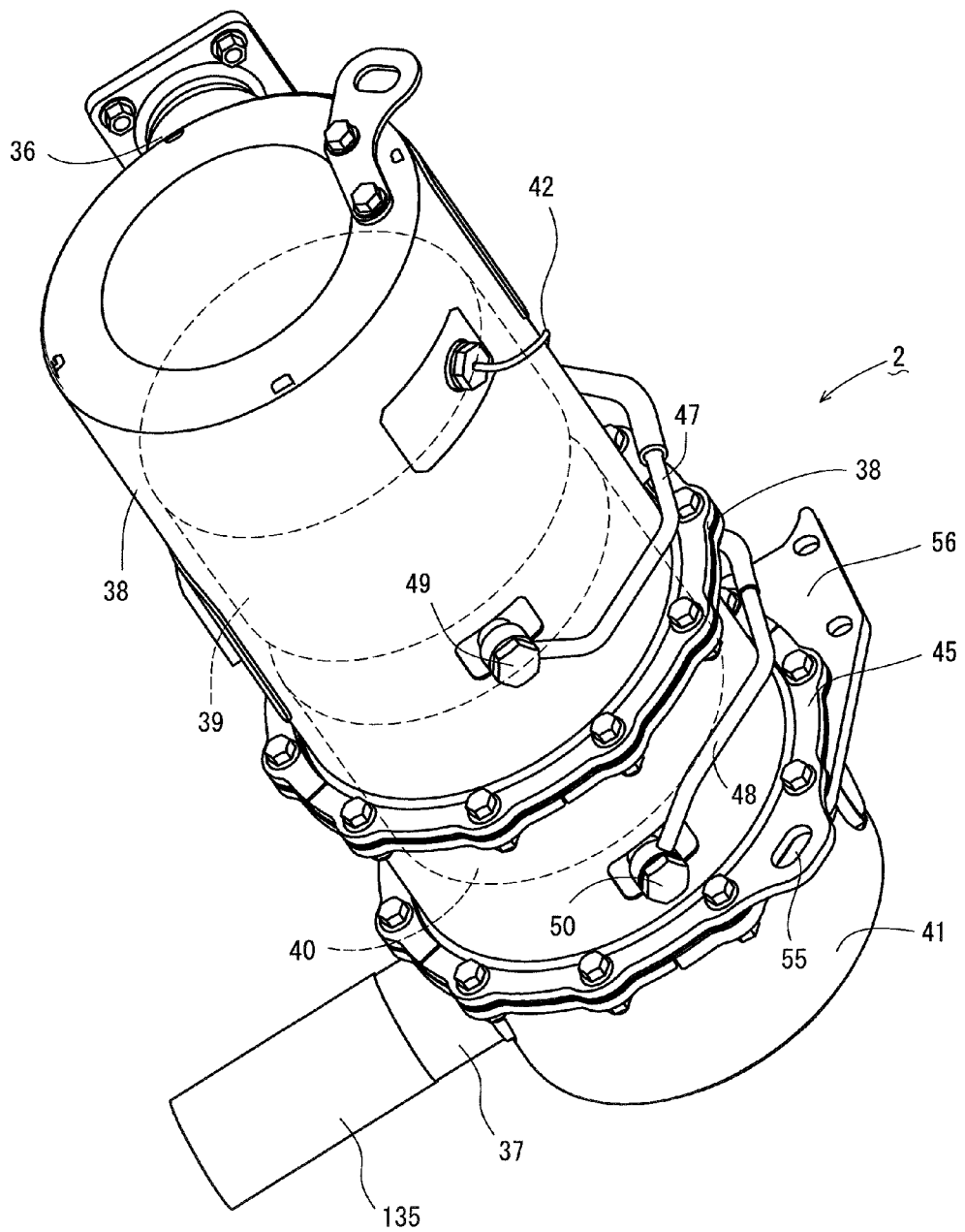
FIG. 39 is an external perspective view of the exhaust gas purification device.

Hereinafter, the fifth embodiment of the engine device of the present invention of the instant application and the work machine that includes the engine device will be described referring to FIGS. 30 and 39. It is noted that, hereinafter, as the work machine of the present embodiment, the wheel loader that includes the loader device as the work unit is exemplified, and the constitution thereof will be described in detail. It is noted that, regarding the description of the present embodiment, the same reference numbers are applied to portions used for the identical purposes in the above-mentioned embodiments, and their detailed descriptions are omitted.

As illustrated in FIGS. 30 to 34, in the wheel loader 211, the engine 1 is arranged on the lower side of the maneuvering seat 219, and the flywheel housing 10 is arranged in such a manner as to be positioned on the front portion side of the travelling machine body 216. That is, the engine 1 is arranged in such a manner that the engine output shaft is oriented along the front-and-back direction that the loader device 212 and the counter weight 215 are placed side by side. Then, the oil cooler 25 and the radiator 24 are arranged in the order from the front on the rear side of the front of the cooling fan 9, in the rear of the engine 1. Also, the exhaust gas purification device 2 fixed on the upper portion of the flywheel housing 10 is arranged on the upper side of the front of the engine 1.

Figure 34:
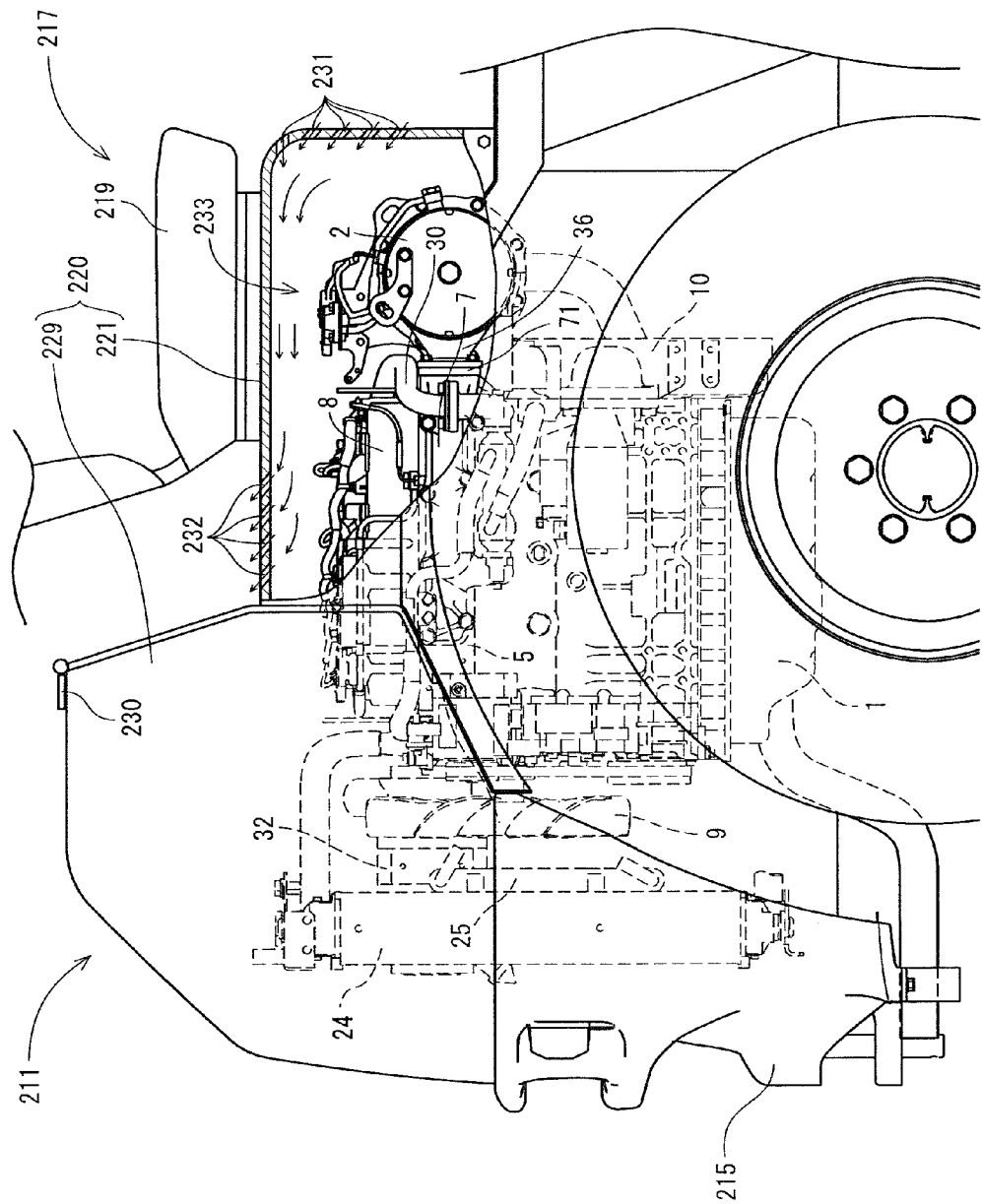
FIG. 34 is a partial cross-sectional view of the right lateral surface of the wheel loader illustrated in FIG. 30 to describe the constitution in the hood.
Figure 35:
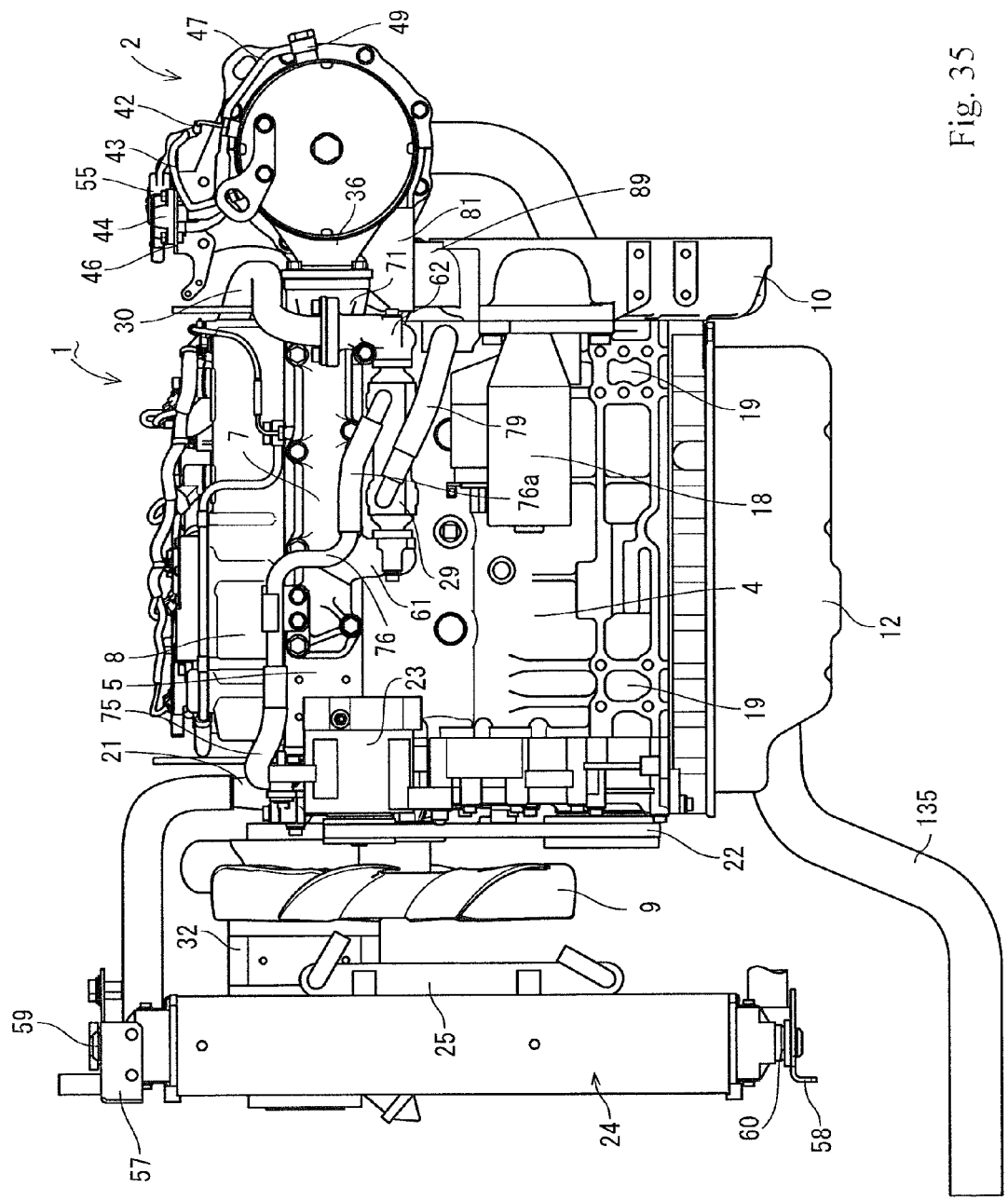
FIG. 35 is a right side view of the diesel engine of the present invention of the instant application.

Regarding the exhaust gas purification device 2, as illustrated in FIG. 34, the purification inlet pipe 36 thereof is directly connected to the exhaust outlet 71 of the exhaust manifold 7 installed on the right side of the engine 1. The exhaust gas purification device 2 is installed in such a manner that the transfer direction of the exhaust gas therein is identical. That is, the exhaust gas flown from the purification inlet pipe 36 into the exhaust gas purification case 38 flows from the right side to the left side in the exhaust gas purification case 38, which removes the particulate matter (PM). Then, the exhaust gas purified is discharged to the outside of the device through the tail pipe 135 connected on the lateral surface on the lower left side of the exhaust gas purification device 2.

The engine 1, the exhaust gas purification device 2, the radiator 24, and the air cleaner 32, which are arranged on the lower side and the rear of the maneuvering seat 219, are covered with the hood 220 arranged on the upper side of the counter weight 215. The hood 220 is configured to serve as a sheet frame (front cover portion) 221 protruded from the floor surface of the operating unit 217, and the front portion in the operating unit 217 and the rear portion of the operating unit 217 are configured to serve as the hood cover (protrusion cover portion) 229 that is openable and closable.

That is, the sheet frame 221 covers the upper section of the front portion of the engine 1, so that the exhaust gas purification device 2 arranged on the upper side of in the front of the engine 1 is covered by the sheet frame 221. In contrast, the hood cover 229 has a shape in such a manner as to cover the engine 1 from the upper section to the rear of the engine 1, so that the radiator 24 and the oil cooler 25 arranged in the rear of the engine 1 are also covered.

The maneuvering seat 219 is detachably installed on the upper side of the sheet frame 221 of the hood 220. Accordingly, when the maneuvering seat 219 is detached from the sheet frame 221, the upper surface of the sheet frame 221 is opened, which makes it possible to perform maintenance for the engine 1 on the lower side of the sheet frame 221, the exhaust gas purification device 2 and the like. It is noted that the present invention is not limited to the constitution in which the maneuvering seat 219 is detachable, but may apply one wherein the maneuvering seat 219 is tilted to the front side above the sheet frame 221, which allows the upper surface of the sheet frame 221 to be opened. In this time, as the example illustrated in FIG. 32, it may be such that the sheet frame 221 itself, to which the maneuvering seat 219 is fixedly installed, is tilted to the front side, so that the upper side of the engine 1 and the like are opened.

The hood 220 includes the sheet frame 221, whose upper surface can be opened, on the front thereof, so that when the upper surface of the sheet frame 221 is closed, the sheet frame 221 covers the exhaust gas purification device 2 arranged on the upper side in the front of the engine 1. Accordingly, the reduction of the temperature of the exhaust gas purification device 2, which is attributed to wind, rain, and the like, can be suppressed, and the appropriate temperature of the exhaust gas purification device 2 is easily maintained. Also, the risk that the operator comes in contact with the exhaust gas purification device 2 can be reduced. On the other hand, when the upper surface of the sheet frame 221 is opened, the upper side in the front of the engine 1 is released, which facilitates access to the exhaust gas purification device 2 arranged on the upper side in the front of the engine 1, so that the maintenance work is easily performed.

Figure 33:
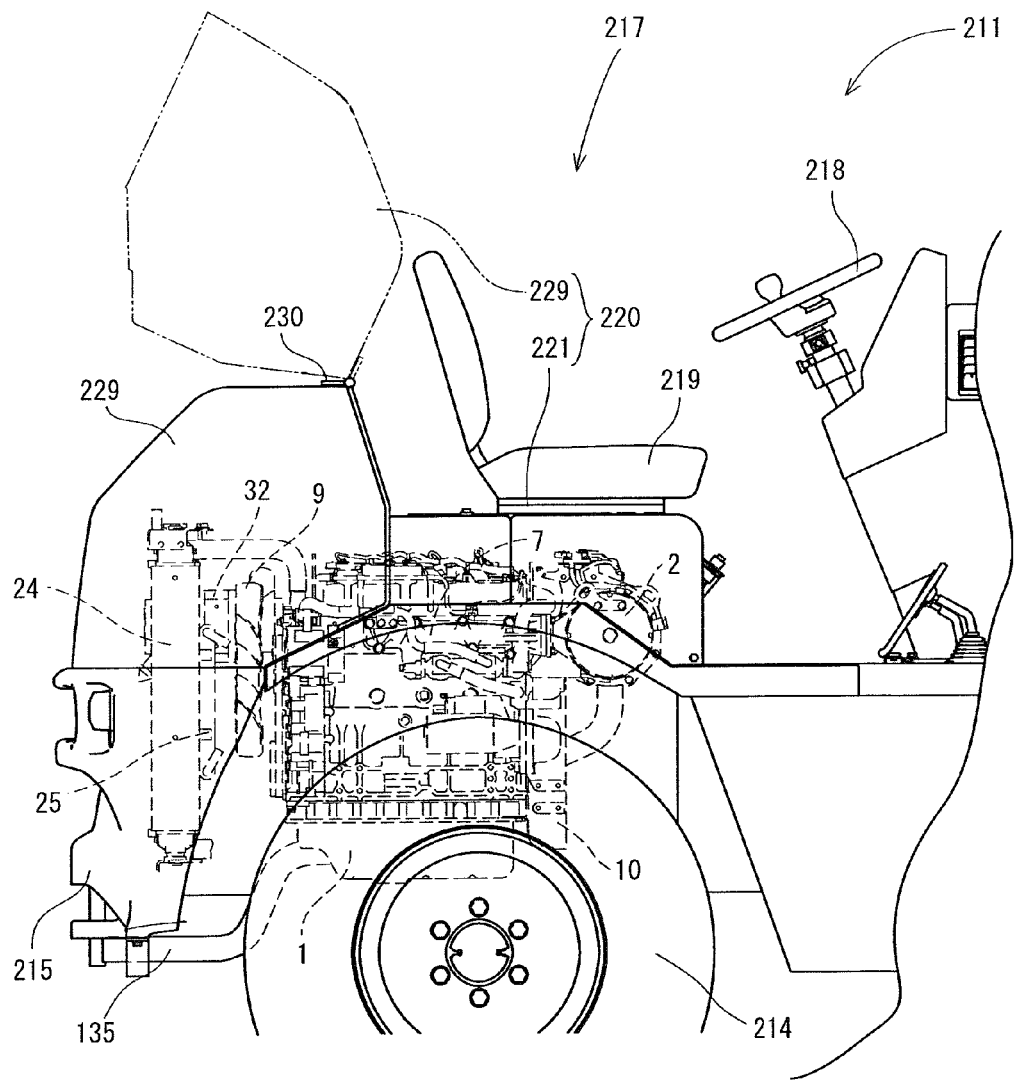
FIG. 33 is an enlarged view of the right lateral surface of the wheel loader illustrated in FIG. 30 to describe the rotation of the hood cover.

In contrast, in the rear of the sheet frame 221, the hood 220 includes the hood cover 229 protruded upward with respect to the upper surface of the sheet frame 221. The hood cover 229 is arranged on the upper side of the counter weight 215, thereby covering the radiator 24 and the oil cooler 25 arranged in the rear of the engine 1, and is configured to be openable/closable. That is, as illustrated in the example of FIG. 33, it may be such that the hinge portion 230 arranged on the upper side of the front of the hood cover 229 is configured to pivotally support the hood cover 229 in a rotatable manner, and the hood cover 229 is rotated upward on the front side, which releases the upper side in the rear of the engine 1. In this time, it may be configured such that the hood cover 229 is coupled with the travelling machine body 216 via a hydraulic damper and the like, so that when the hood cover 229 is opened, the hood cover 229 is supported.

As illustrated in FIG. 34, the hood 220 includes an intake port 231 through which the outside air is drawn in front thereof, and an exhaust port 232 through which the air in the device is discharged on the upper surface at a position in the rear of the maneuvering seat 219. That is, the sheet frame 221 includes the intake port 231 provided on the front surface thereof and the exhaust port 232 provided at the position in the rear of the maneuvering seat 219 on the upper surface thereof. With the aforementioned constitution, in the interior of the hood 220, after the air taken in from the front into the device through the intake port 231 flows along the upper surface of the sheet frame 221, the air is discharged from the exhaust port 232 in the rear of the maneuvering seat 219 to the outside of the device.

Accordingly, the structure is provided wherein the hood 220 includes a cooling air path 233 through which the cooling air flows, on the lower side of the maneuvering seat 219. That is, a heat-insulating layer by the cooling air path 233 is provided from the front to the rear of the sheet frame 221, so that the transmission of the exhaust heat from the exhaust gas purification device 2 to the maneuvering seat 219 can be prevented. Accordingly, the environmental temperature in the operating unit 217 can be maintained as a comfortable temperature for the operator, without an increase in temperature in the maneuvering seat 219 due to the exhaust heat from the exhaust gas purification device 2.

Furthermore, the intake port 231 provided on the front surface of the sheet frame 221 has the constitution in which the intake port 231 is inclined upward from the front to the rear. Accordingly, when the outside air in front of the sheet frame 221 flows from the intake port 231 into the hood 220, the air flows to the upper surface of the sheet frame 221. That is, with the aforementioned constitution of the intake port 231, the cooling air flown into the hood 220 flows from the front to the rear on the obliquely upper side.

Accordingly, the outside air from the intake port 231 avoids the exhaust gas purification device 2, and the flow of the cooing air in the cooling air path 233 can be controlled in such a manner that the outside air flows along the upper surface of the sheet frame 221 on the lower side of the maneuvering seat 219. Accordingly, not only can the lower side of the maneuvering seat 219 be cooled by means of the cooling air flowing through the cooling air path 233, but also the reduction of the temperature of the exhaust gas purification device 2, which is attributed to the cooling air, can be suppressed, and the appropriate temperature of the exhaust gas purification device 2 is easily maintained.

Next, the exhaust gas purification device 2 will be described referring to FIGS. 35 to 39. The exhaust gas purification device 2 includes the exhaust gas purification case 38 that includes the purification inlet pipe 36 and the purification outlet pipe 37. The exhaust gas purification case 38 is constituted in a cylindrical shape elongated in the right-and-left direction. Then, the purification inlet pipe 36 and the purification outlet pipe 37 are respectively provided on the right side (the upstream side in the transfer direction of the exhaust gas) and the left direction (the downstream side in the transfer direction of the exhaust gas) of the exhaust gas purification case 38.

Also, the exhaust gas purification device 2 is fixed on the flywheel housing 10 and arranged in front of the cylinder head 5 and the head cover 8. In this time, the purification inlet pipe 36 is provided in the rear on the right side on the cylindrical shaped lateral surface of the exhaust gas purification case 38. Then, the exhaust outlet 71 of the exhaust manifold 7 is arranged between the flywheel housing 10 and the recirculation exhaust gas pipe 30 and opened in such a manner as to discharge the exhaust gas to the front. The purification inlet pipe 36, which is the exhaust gas intake side of the exhaust gas purification device 2, is detachably fastened with bolts to the exhaust outlet 71 of the exhaust manifold 7. In contrast, the purification outlet pipe 37 is provided below the left side on the cylindrical shaped lateral surface of the exhaust gas purification case 38 and connected to the tail pipe 135.

Thus, the purification inlet pipe 36 of the exhaust gas purification device 2 is arranged on the extension of the transfer direction of the exhaust gas in the exhaust manifold 7. That is, the inner-pipe shapes of the exhaust manifold 7 and the purification inlet pipe 36 are respectively constituted in such a manner as to flow along the flow of the exhaust gas through the exhaust manifold 7. Accordingly, when the exhaust gas flown into the exhaust manifold 7 flows into the exhaust gas purification device 2 through the exhaust manifold 7, an impediment to the flow of the exhaust gas is reduced. Accordingly, the exhaust gas flown into the exhaust gas purification device 2 efficiently flows to the exhaust gas purification device 2, so that its temperature can be maintained at a high temperature.

Figure 30:
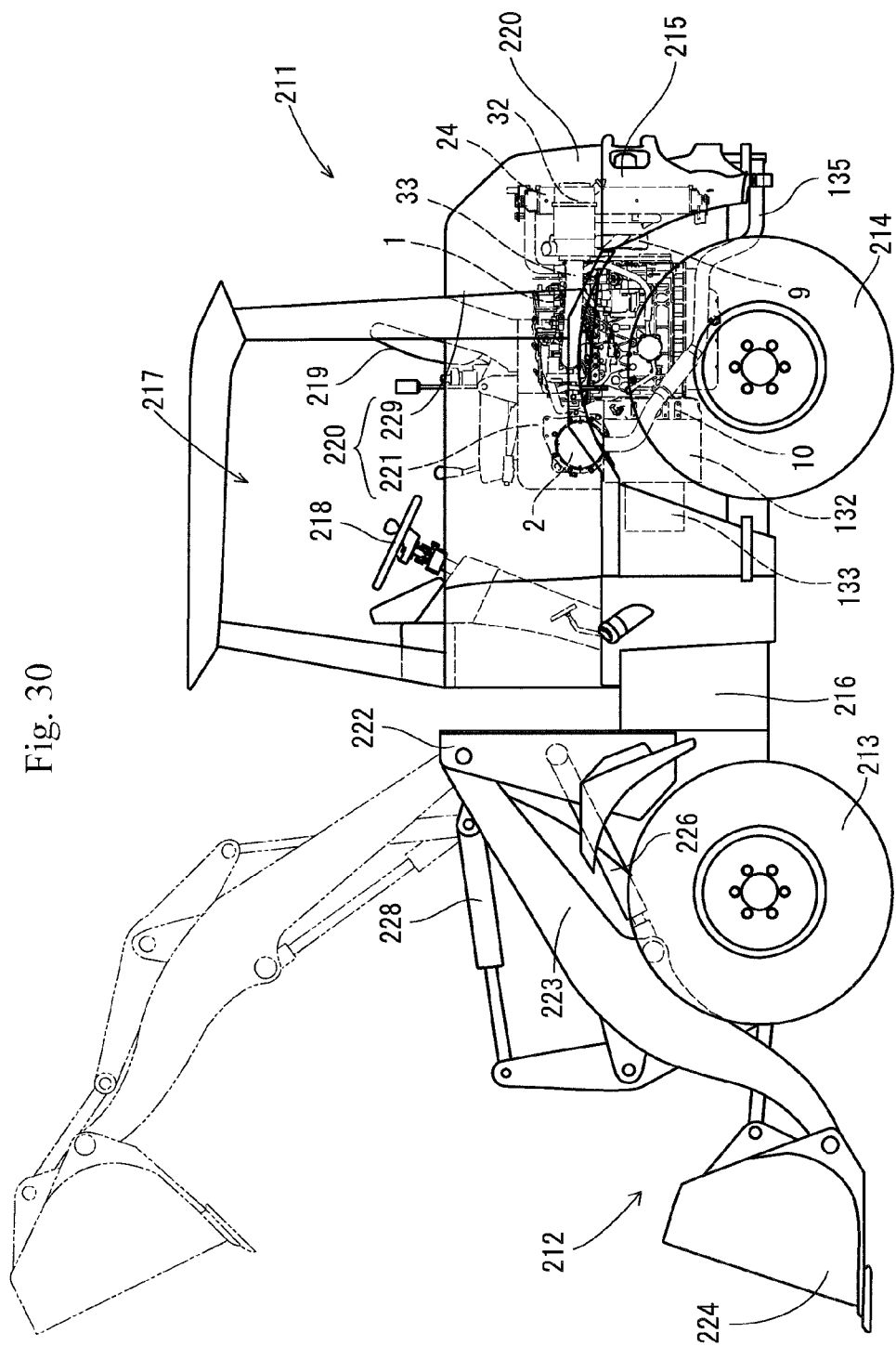
FIG. 30 is a left side view of the wheel loader, which is one example of the work machine of a fifth embodiment of the present invention of the instant application.
Figure 31:
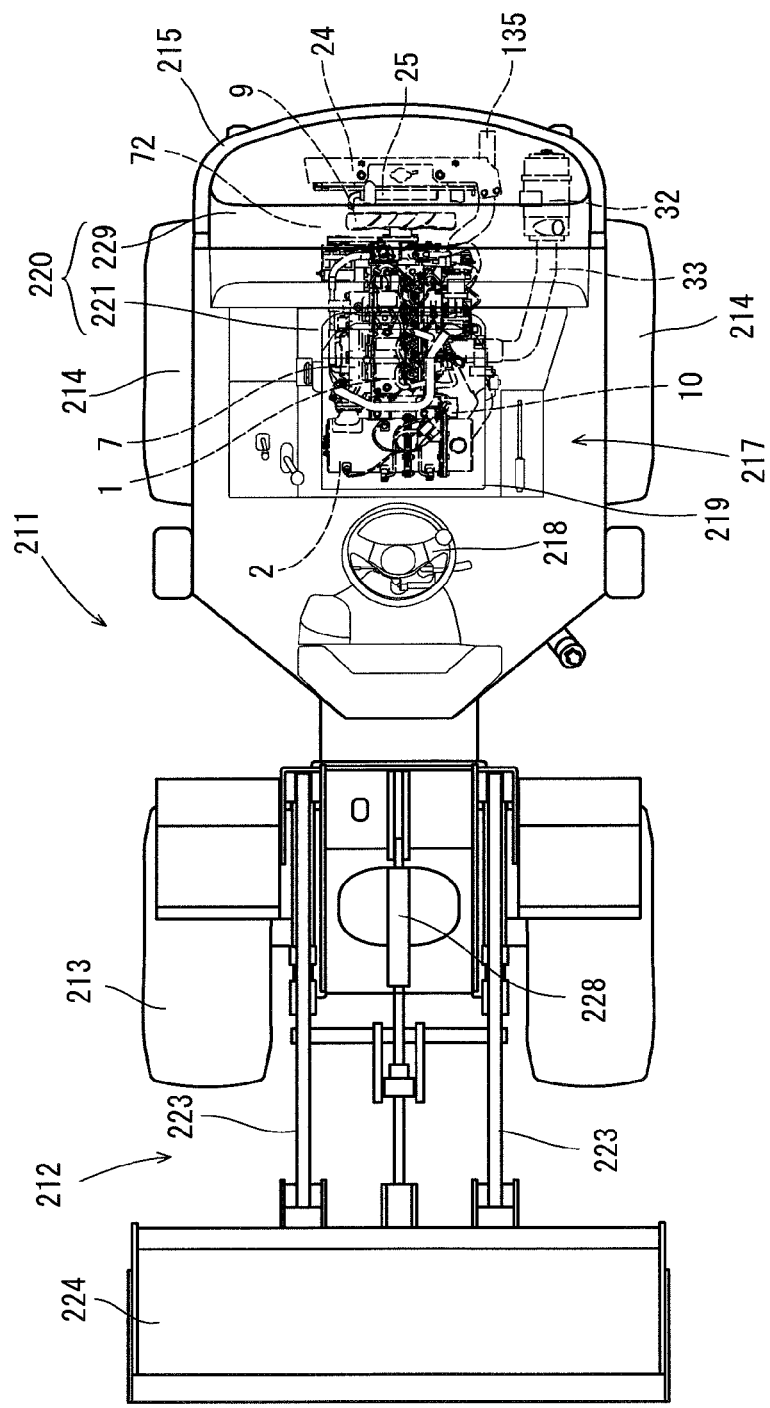
FIG. 31 is a plan view of the wheel loader illustrated in FIG. 30.
Figure 32:
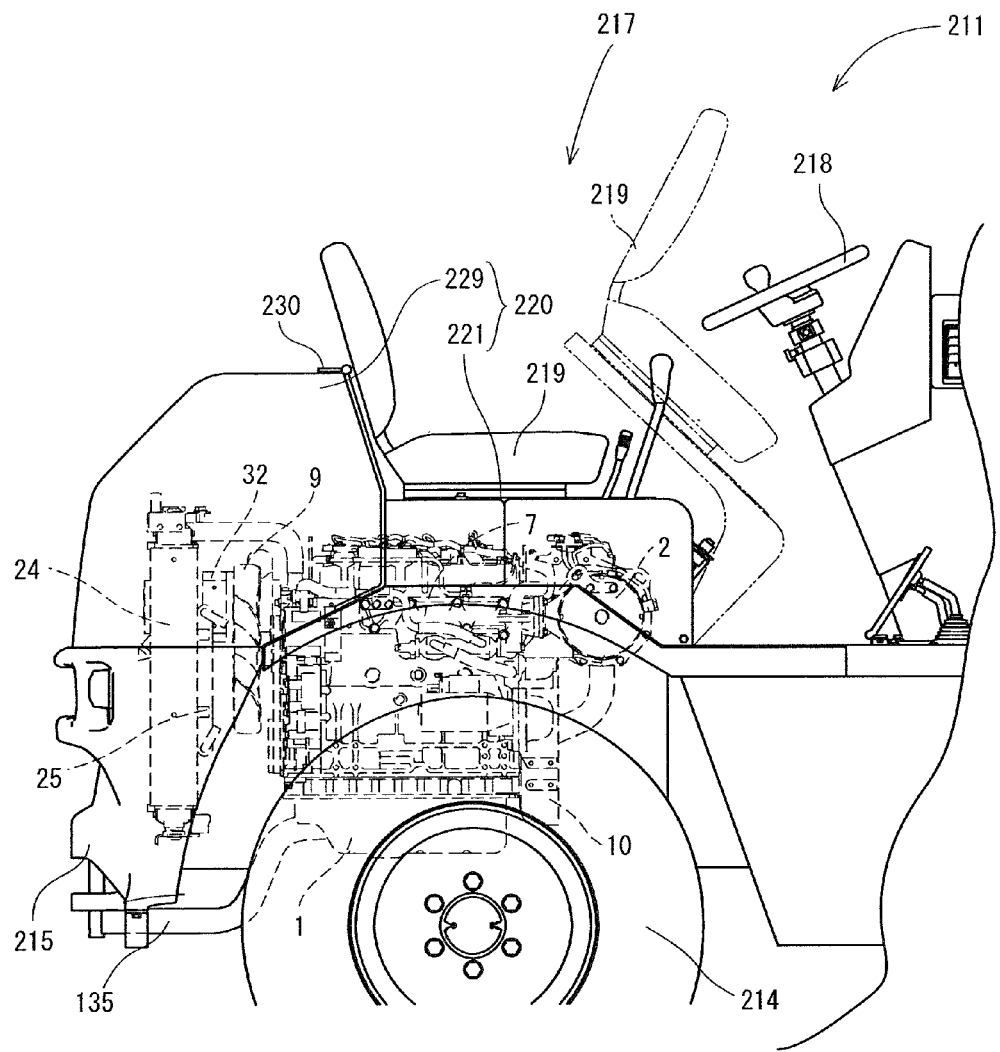
FIG. 32 is an enlarged view of the right lateral surface of the wheel loader illustrated in FIG. 30 to describe the rotation of the hood cover.

Then, in the interior of the exhaust gas purification case 38, the diesel oxidation catalyst 39 (gas purification body) such as platinum that generates nitrogen dioxide (NO2), and the soot filter 40 (gas purification body) having honeycomb structure, in which the particulate matter (PM) collected is consecutively oxidized and removed at a relatively low temperature, are placed in series in the transfer direction of the exhaust gas (the lower side to the upper side in FIG. 30). It is noted that one side portion of the exhaust gas purification case 38 is formed of the silencer 41, and the purification outlet pipe 37 coupled with the tail pipe 135 is provided at the silencer 41.

Also, the exhaust gas purification case 38 is placed along with an upstream side gas temperature sensor 42 and a downstream side gas temperature sensor 43 of a thermistor type. The temperature of the exhaust gas on the end surface on the gas inflow side of the diesel oxidation catalyst 39 is detected by the upstream side gas temperature sensor 42. The temperature of the exhaust gas on the end surface on the gas outflow side of the diesel oxidation catalyst is detected by the downstream side gas temperature sensor 43.

A differential pressure sensor 44, which is provided integrally with an electric wiring connector 51, is supported by a sensor bracket 46 that is approximately L shaped and plate-shaped, along with the electric wiring connector 55 of the gas temperature sensors 42 and 43. The sensor bracket 46 is detachably mounted on a sensor support portion 56 formed on one circular arc body of the outlet clamping flange 45. That is, the sensor support portion 56 is formed on part of the outlet clamping flange 45 on the silencing side farthest away from the side of the purification inlet pipe 36. Then, a perpendicular plate portion of the sensor bracket 46 is fastened with bolts to the sensor support portion 56 of the arc body, thereby detachably mounting the sensor bracket 46 on the outlet clamping flange 45 on the silencing side. It is noted that the sensor bracket 46 is not limited to the outlet clamping flange 45, but the sensor bracket 46 may be fastened with another clamping flange such as a central clamping flange, which is fastened during the assembly of the exhaust gas purification case 38.

One end sides of an upstream side sensor pipe 47 and a downstream side sensor pipe 48 are connected to the differential pressure sensor 44. The sensor boss bodies 49 and 50 on the upstream side and the downstream side are arranged in the exhaust gas purification case 38 in such a manner that the soot filter 40 in the exhaust gas purification case 38 is sandwiched therebetween. The sensor boss bodies 49 and 50 are respectively connected to the other end sides of the upstream side sensor pipe 47 and the downstream side sensor pipe 48.

Figure 36:
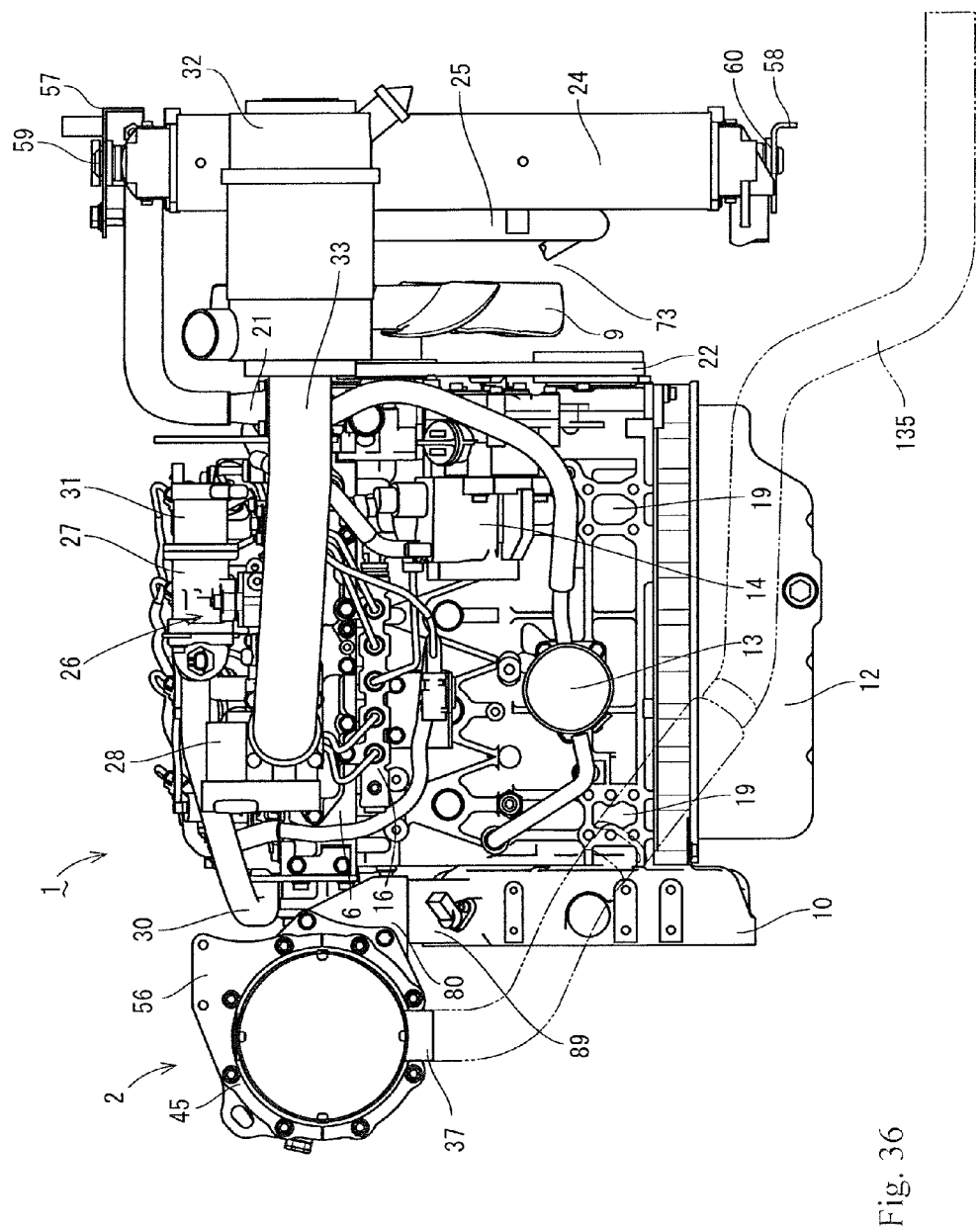
FIG. 36 is a left side view of the diesel engine.
Figure 37:
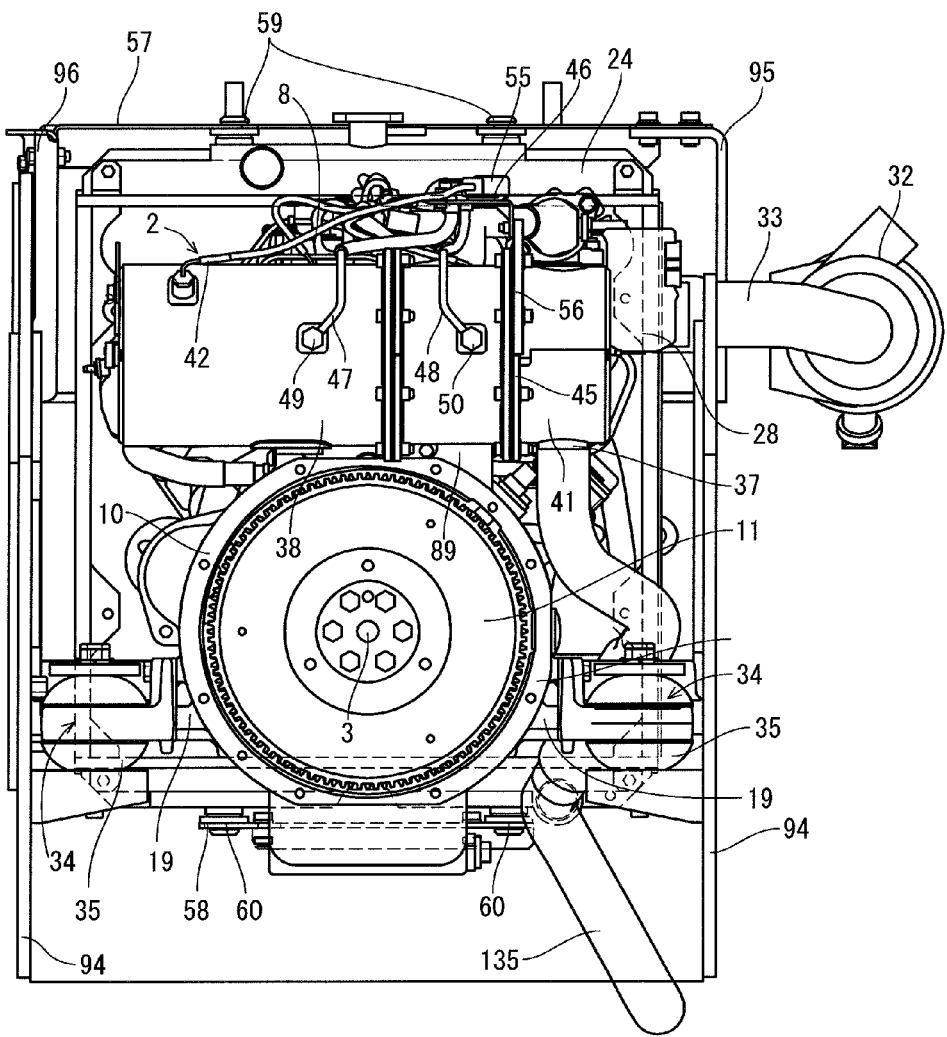
FIG. 37 is a front view of the diesel engine.
Figure 38:
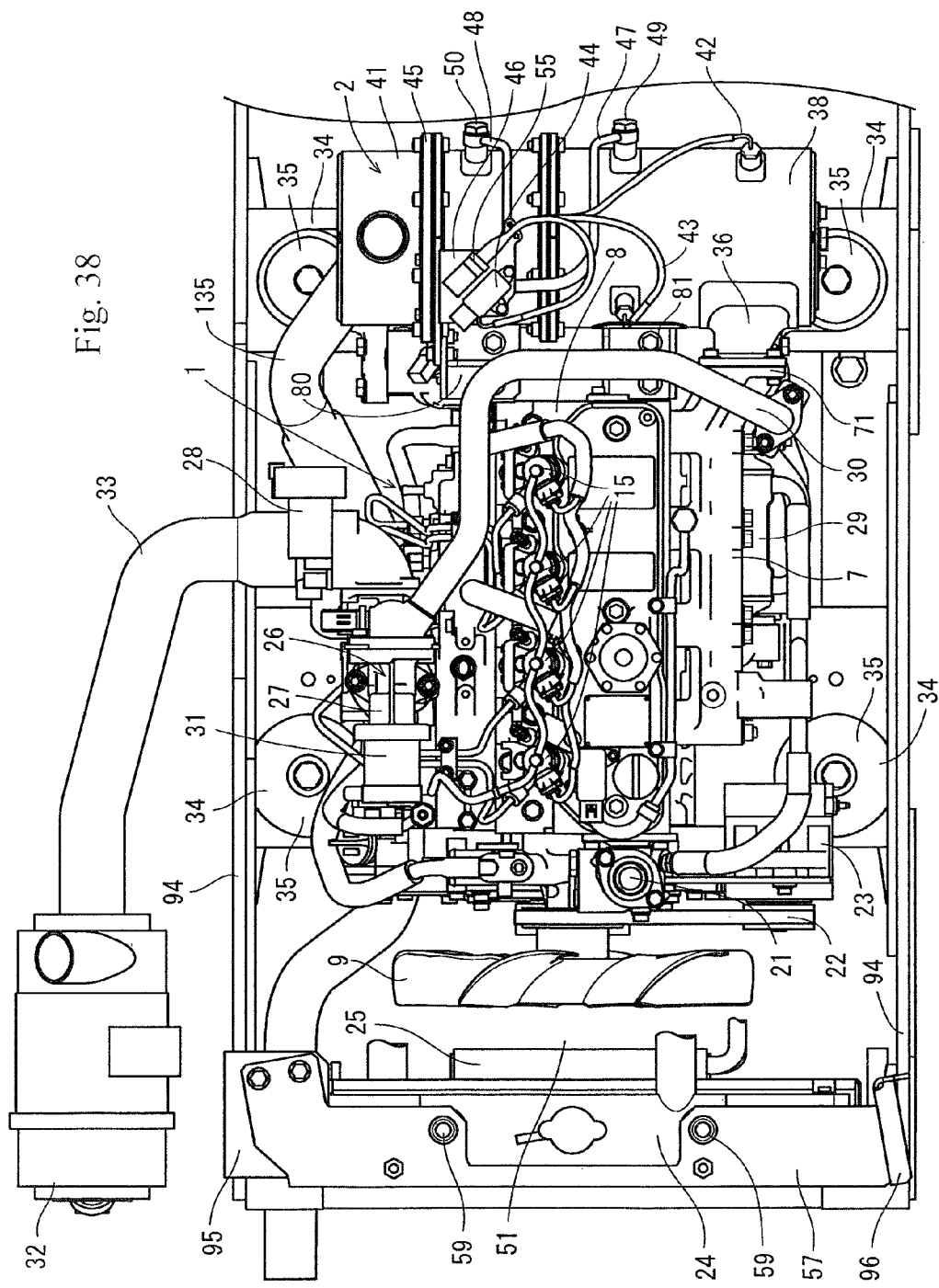
FIG. 38 is a plan view of the diesel engine.

Next, the mounting structure of the exhaust gas purification device 2 will be described referring to FIGS. 36 to 38. Regarding the exhaust gas purification case 38 of the exhaust gas purification device 2, the coupling leg body (left bracket) 80 is fastened with bolts and detachably mounted on the outlet clamping flange 45 on the downstream side, and the fixation leg body (right bracket) 81 is welded and fixed on the outlet clamping flange 45. In this time, the mounting boss portion of the coupling leg body 80 is fastened with bolts and mounted on the leg body fastening portion with the through-hole, which is provided on the arc body of the outlet clamping flange 45. Also, the fixation leg body 81 is adhered by welding with respect to the outer circumferential surface of the exhaust gas purification case 38 on the side of the purification inlet pipe 36. That is, the fixation leg body 81 is installed on the inlet side (upstream side) of the exhaust gas purification case 38, and the coupling leg body 80 is installed on the outlet side (downstream side) of the exhaust gas purification case 38. It is noted that the coupling leg body 80 is not limited to the outlet clamping flange 45, but the coupling leg body 80 may be fastened with another clamping flange such as a central clamping flange, which is fastened during the assembly of the exhaust gas purification case 38.

The coupling leg body 80 and the fixation leg body 81 provided on the outer circumference of the exhaust gas purification case 38 are each fastened with bolts on a purification device mounting portion 89 formed on the upper surface side of the flywheel housing 10. That is, the exhaust gas purification device 2 is stably coupled and supported on the flywheel housing 10, which is a high rigidity member, by means of the coupling leg body 80 and the fixation leg body 81. Accordingly, although the exhaust gas purification device 2 is included in the vibration system of the engine 1, the exhaust gas purification device 2 can be firmly coupled with the flywheel housing 10 being a high rigidity member as one of constituent components of the engine 1, and the damage of the exhaust gas purification device 2 due to the vibration of the engine 1 can be prevented. The exhaust gas purification device 2 incorporated in the engine 1 at a manufacturing plant of the engine 1 can be shipped. Also, the exhaust gas purification device 2 can be communicated with the exhaust manifold 7 of the engine 1 at point-blank range, so that the appropriate temperature in the exhaust gas purification device 2 is easily maintained, and the high exhaust gas purification capacity can be maintained.

Figure 40:
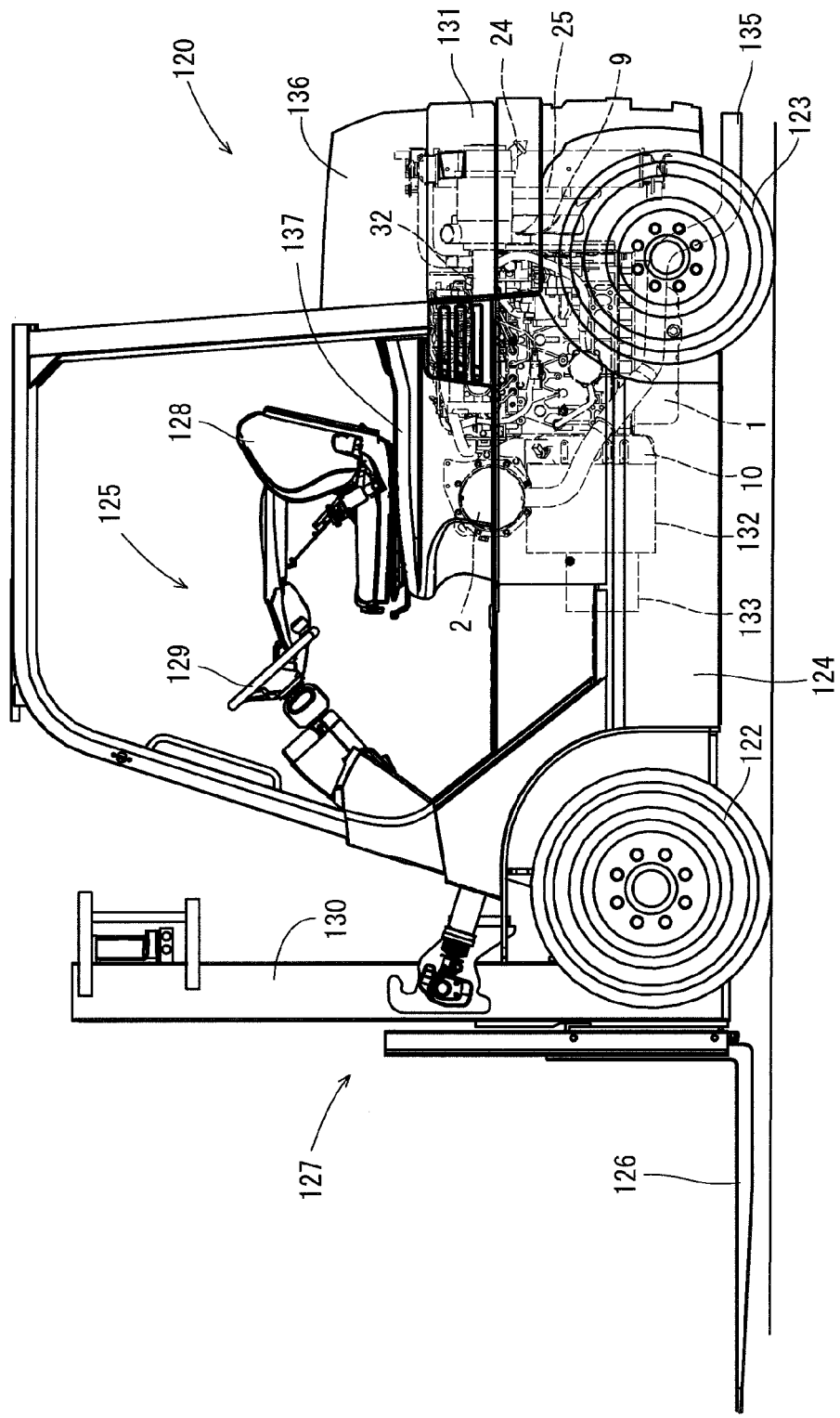
FIG. 40 is a side view of the forklift car, which is another example of the work machine of the present invention of the instant application.
Figure 41:
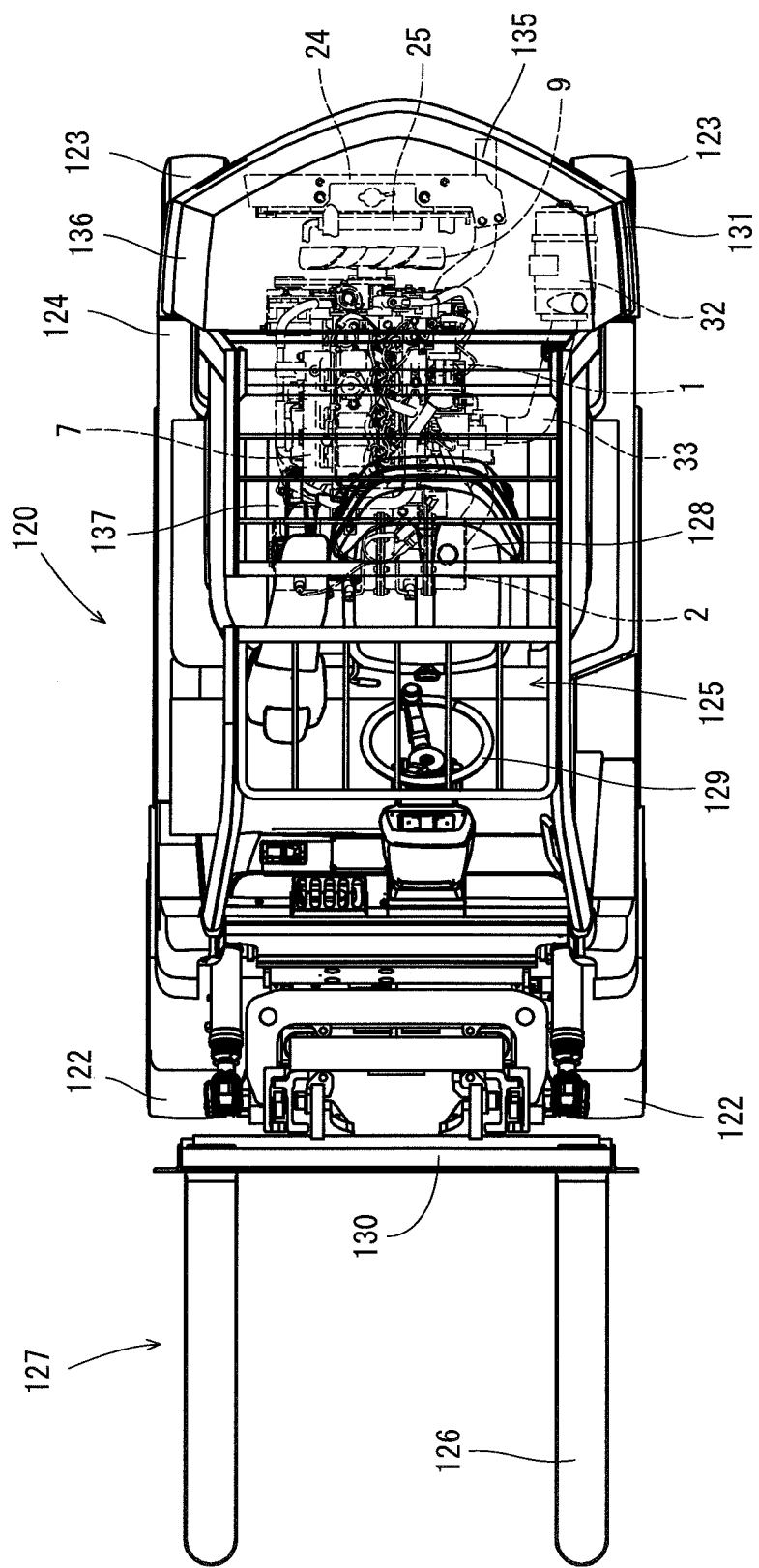
FIG. 41 is a plan view of the forklift car of FIG. 40.

The structure in which the diesel engine 1 is mounted on the forklift car 120 will be described referring to FIGS. 40 and 41. Regarding the forklift car 120, the engine 1 is arranged on the lower side of the maneuvering seat (driving seat) 128, and the flywheel housing 10 is arranged in such a manner as to be positioned on the front portion side of the travelling machine body 124. Then, the exhaust gas purification device 2 is arranged on the upper side in front of the engine 1. That is, the exhaust gas purification device 2 is arranged above the flywheel housing 10 provided in front of the engine 1. Also, the radiator 24 and the oil cooler 25 are arranged at positions opposite to the cooling fan 9 in the rear of the engine 1, and the air cleaner 32 connected to the left side of the engine 1 is arranged on the left side of the radiator 24 disposed in the rear of the left side of the engine 1.

Thus, the engine 1, the exhaust gas purification device 2, the radiator 24, and the air cleaner 32, which are arranged on the lower side and the rear of the maneuvering seat 128, are covered with the hood 136 arranged on the upper side of a counter weight 131. Then, regarding the hood 136, the maneuvering seat 128 is detachably provided, and the front upper surface portion is configured to be opened in such a manner that an operator can gain access to the engine 1 or the exhaust gas purification device 2 in the hood 136. Also, the rear of the hood 136 is also configured to be openable/closable.

Furthermore, there is provided a cooling air path (not illustrated) that takes in the air in the outside of the device as cooling air from the front surface of the hood 136 and discharges the air from the rear of the maneuvering seat 128 to the outside of the device, in the front portion of the hood 136. That is, the cooling air taken in the interior of the hood 136 flows along the inner wall on the upper surface of the hood 136 in a section immediately below the maneuvering seat 128 of the hood 136. Accordingly, the influence of the exhaust heat caused by the exhaust gas purification device 2 arranged on the lower side of the maneuvering seat 128 can be reduced in the operating unit 125.

As described above, the diesel engine 1 is arranged in such a manner that the crankshaft 3 is oriented along the front-and-back direction that the work unit 127 and the counter weight 131 are placed side by side. The mission case 132 is coupled with the front surface side of the flywheel housing 10. The power transmitted from the diesel engine 1 to the flywheel 11 is appropriately shifted by the mission case 132 and transmitted to the hydraulic drive source 133 for the front wheels 122, the rear wheels 123, and the fork 126.

Hereinafter, regarding the work machine of another embodiment (sixth embodiment) of the present invention of the instant application, the wheel loader is exemplified and described. As is the same with the fifth embodiment, the wheel loader 211 of the present embodiment includes the constitution in FIGS. 30 to 33, but the constitution (see FIG. 34) of the cooling air path 233 is different in the interior of the hood 220. Accordingly, hereinafter, the constitution of the cooling air path 233 in the hood 220 will be described based on FIG. 42. It is noted that, regarding the constitution illustrated in FIG. 42, the same reference numbers are applied to portions used for the identical purposes in FIG. 34.

Figure 42:
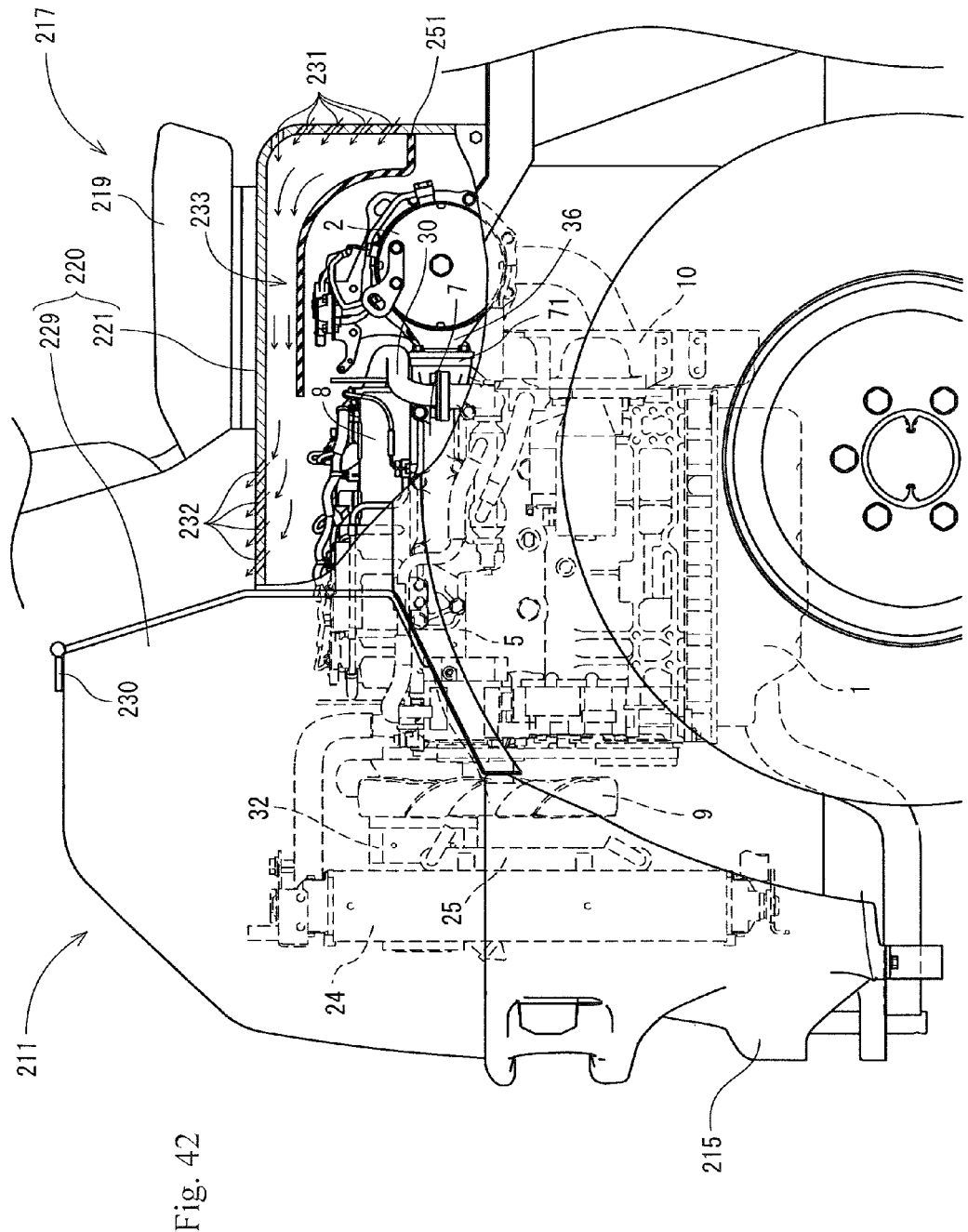
FIG. 42 is a partial cross-sectional view of the right lateral surface of the wheel loader, which is one example of the work machine of a sixth embodiment of the present invention of the instant application.

As illustrated in FIG. 42, regarding the wheel loader 211 of the present embodiment, a heat insulating board 251 is extended from the front surface of the sheet frame 221 to the rear in the hood 220. The heat insulating board 251 has the constitution in which the board is bent from the lower side in the front of the sheet frame 221 to the upper side in the rear of the sheet frame 221 in such a manner that the exhaust gas purification device 2 is covered from the front to the upper section thereof. Then, the front end of the heat insulating board 251 is adhered to the front surface of the sheet frame 221 on the lower side with respect to the intake port 231 disposed at the lowermost position, so that the heat insulating board 251 is fixed in the interior of the hood 220. In contrast, the rear end of the heat insulating board 251 is positioned on the upper portion of the head cover 8 of the diesel engine 1.

That is, the heat insulating board 251 adhered to the sheet frame 221 below the intake port 231 is configured to be bent on the upper portion of the exhaust gas purification device 2 in such a manner as to extend to the exhaust port 232 on the upper surface of the sheet frame 221. Accordingly, the cooling air path 233 that guides the cooling air flown from the intake port 231 to the exhaust port 232 is formed by the heat insulating board 251 and the inner wall on the front surface and the inner wall on the upper surface of the sheet frame 221. Also, the heat insulating board 251 covers the front and the upper section of the exhaust gas purification device 2, thereby preventing the reduction in temperature of the exhaust gas purification device 2 due to the cooling air flowing through the cooling air path 233.

Figure 43:
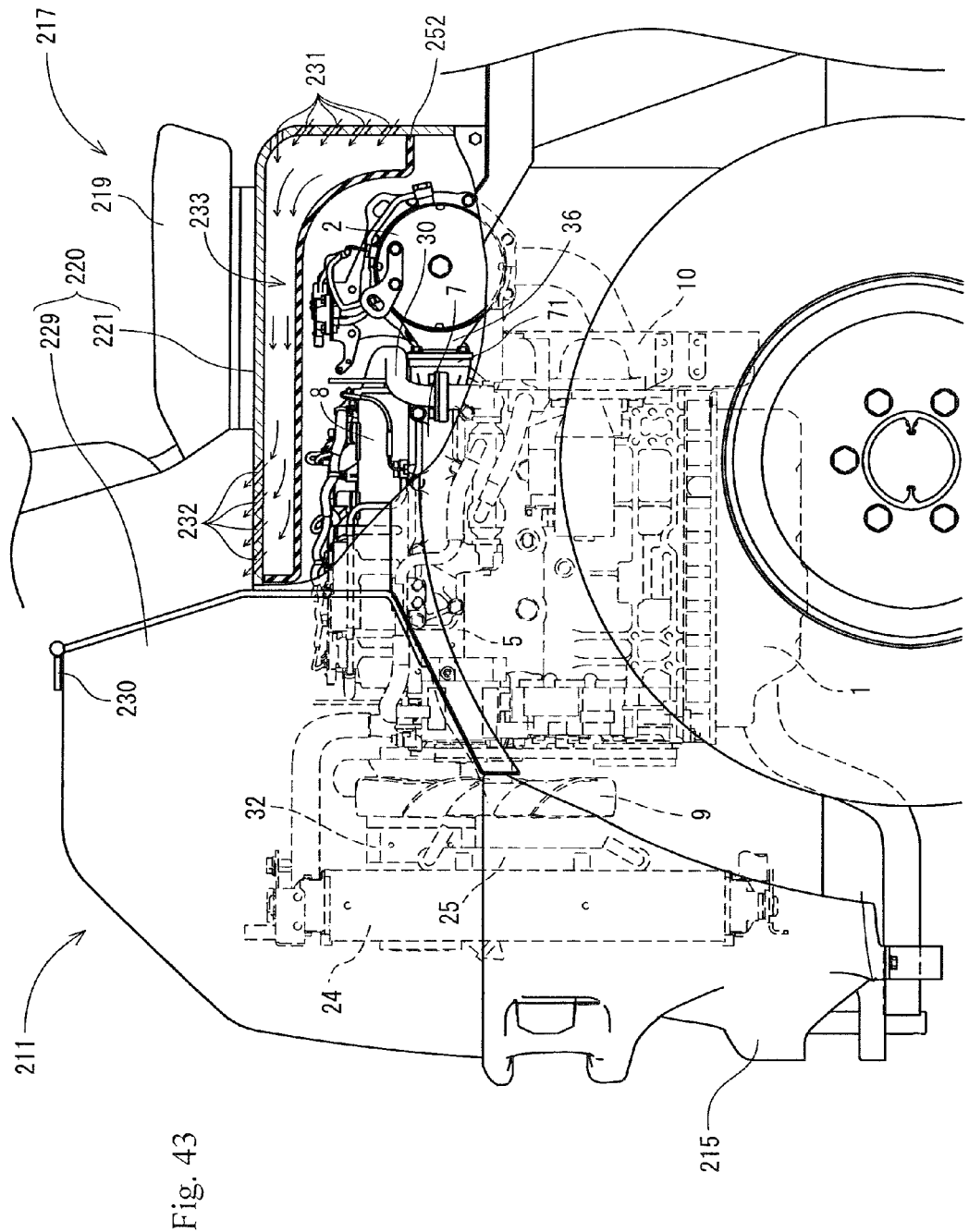
FIG. 43 is a partial cross-sectional view of the right lateral surface of the wheel loader, which is one example of the work machine of a seventh embodiment of the present invention of the instant application.

Regarding the work machine of another embodiment (seventh embodiment) of the present invention of the instant application, the wheel loader is exemplified and described. As is the same with the first and second embodiments, the wheel loader 211 of the present embodiment includes the constitution in FIGS. 30 to 33. Also, as illustrated in FIG. 43, regarding the wheel loader 211 of the present embodiment, a heat insulating board 252 that has the structure different from that of the heat insulating board 251 (see FIG. 42) of the sixth embodiment is provided in the hood 220. Accordingly, hereinafter, the constitution of the heat insulating board 252 in the hood 220 will be described based on FIG. 43. It is noted that, regarding the constitution illustrated in FIG. 43, the same reference numbers are applied to portions used for the identical purposes in FIG. 42.

As illustrated in FIG. 43, the wheel loader 211 of the present embodiment includes the heat insulating board 252 of which the front end and the rear end are respectively adhered to the front surface and upper surface of the sheet frame 221 in the hood 220. The heat insulating board 252 has the constitution in which the heat insulating board 251 of the sixth embodiment is further extended in the rear, and the board is bent in such a manner that the rear end thereof is adhered on the upper surface of the sheet frame 221. Then, the rear end of the heat insulating board 252 is adhered to the upper surface of the sheet frame 221 in the rear with respect to the exhaust port 232 disposed at the rearmost position.

With the aforementioned constitution, the cooling air path 233 constituted in the hood 220 is configured as a space independent from the space on the lower side of the heat insulating board 252 in the sheet frame 221. Accordingly, the cooling air flown from the intake port 231 disposed on the front to the cooling air path 233 is steadily guided to the exhaust port 232 on the upper side in the rear, so that the cooling effect on the side of the maneuvering seat 219 can be enhanced. Also, the cooling air path 233 formed by the sheet frame 221 and the heat insulating board 252 is constituted of a space different from the installation space of the diesel engine 1 on the lower side of the heat insulating board 252. Accordingly, the cooling air path 233 functions as the heat insulating layer between the installation space of the diesel engine 1 and the outer side of the sheet frame 221.

Figure 44:
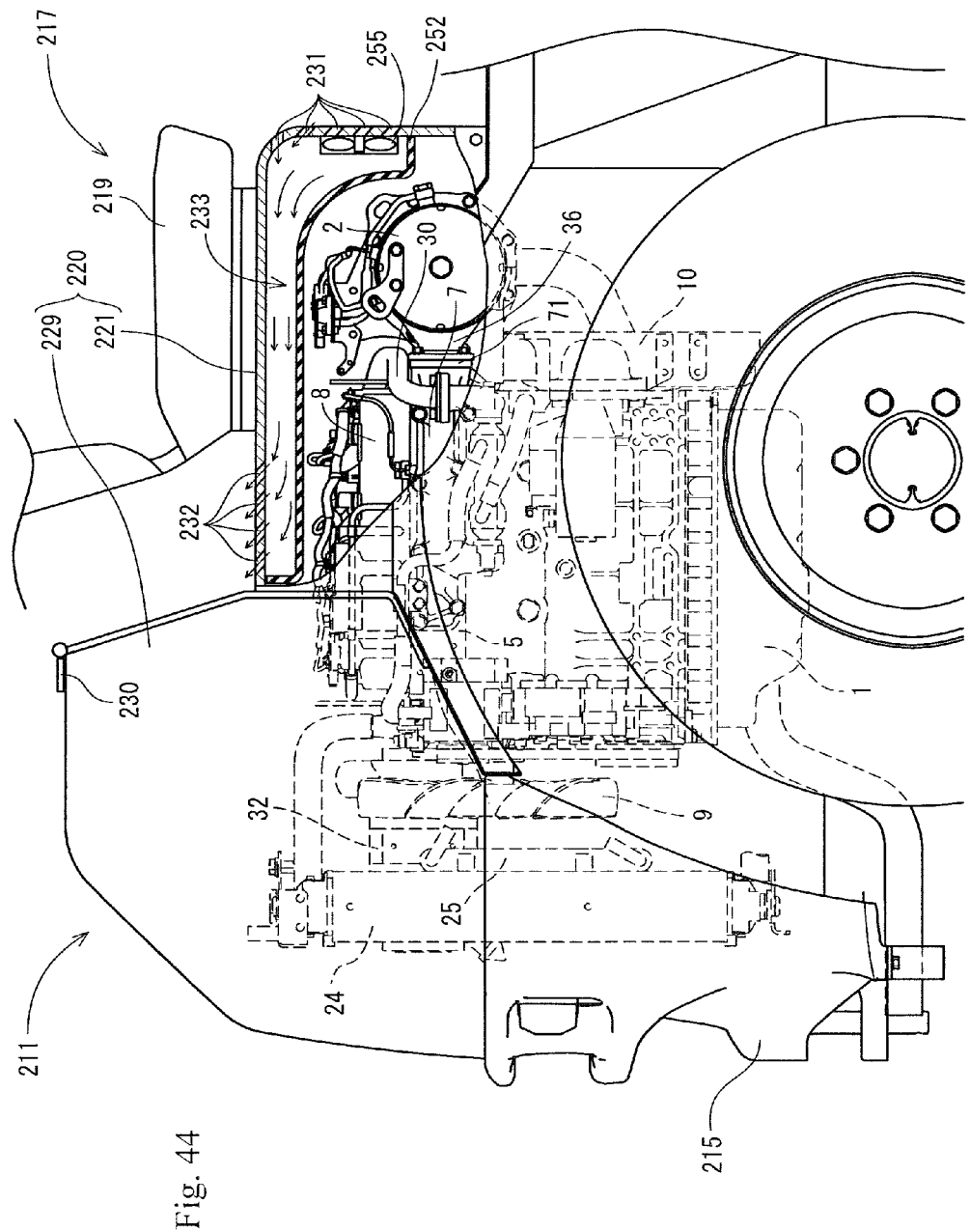
FIG. 44 is a partial cross-sectional view of the right lateral surface of the wheel loader, which is one example of the work machine of an eighth embodiment of the present invention of the instant application.

Regarding the work machine of another embodiment (eighth embodiment) of the present invention of the instant application, the wheel loader is exemplified and described. As is the same with the fifth to seventh embodiments, the wheel loader 211 of the present embodiment includes the constitution in FIGS. 30 to 33. Also, as illustrated in FIG. 44, regarding the wheel loader 211 of the present embodiment, an electric fan 255 is provided for the cooling air path 233 of the seventh embodiment. Accordingly, hereinafter, the constitution of the cooling air path 233 in the hood 220 will be described based on FIG. 44. It is noted that, regarding the constitution illustrated in FIG. 44, the same reference numbers are applied to portions used for the identical purposes in FIG. 43.

As illustrated in FIG. 44, the wheel loader 211 of the present embodiment includes the electric fan 255 installed in the cooling air path 233 constituted by the sheet frame 221 and the heat insulating board 252 in the hood 220. The electric fan 255 is arranged in the rear of the intake port 231, thereby facilitating the inflow of the outside air from the intake port 231. Accordingly, the flow rate of the cooling air flowing through the cooling air path 233 can be controlled in order to obtain the optimal amount, so that the cooling effect on the lower side of the maneuvering seat 219 by means of the cooling air path 233 can be enhanced.

It is noted that the present embodiment discloses the constitution in which the electric fan 255 in the cooling air path 233 is provided on the side of the intake port 231, but the electric fan 255 only needs to be provided in the cooling air path 233, for example, it may be such that the electric fan 255 is provided at another position such as the lower side of the exhaust port 232. Also, in the present embodiment, as is the same with the fifth embodiment, constitution may be applied wherein the heat insulating board 252 is omitted from the constitution of FIG. 44. Furthermore, in the present embodiment, as is the same with the sixth embodiment, constitution may be applied wherein the heat insulating board 251 (see FIG. 42) in a cantilever state is provided in the hood 220, in place of the heat insulating board 252.

It is noted that the present invention of the instant application is not limited to the aforementioned embodiments, but can be embodied in various modes. For example, the engine device according to the present invention of the instant application is not limited to the aforementioned forklift car 120 and wheel loader 211, but can be widely applied to various work machines inclusive of farm work machines such as a combine harvester and a tractor and vehicles for special work such as a crane truck. Also, the constitution of each portion of the present invention of the instant application is not limited to the embodiments illustrated, but various modifications can be applied without departing from the scope of the gist of the present invention of the instant application.

REFERENCE SIGNS LIST

1 Diesel engine
2, 2x Exhaust gas purification device
2a First purification device (DPF)
2b Second purification device (SCR)
5 Cylinder head
7 Exhaust manifold
10 Flywheel housing
24 Radiator
25 Oil cooler
32 Air cleaner
33 Intake pipe
65 Exhaust throttle device
66 Intermediary pipe
68 Throttle case
70 Cooling case
72 Exhaust pipe
73 Flexible pipe
77 Throttle outlet side pipe
78 Throttle inlet side pipe
80 Flange side bracket leg (first bracket leg)
81 Casing side bracket leg (second bracket leg)
94 Machine body frame
220 Hood
221 Sheet frame
231 Intake port
232 Exhaust port
233 Cooling air path

The invention claimed is:

1. An engine device mounted on a work machine in which an operating seat is arranged on a hood provided in a rear of a travelling machine body, and an engine is arranged in the hood, comprising:
   a first purification device that removes particulate matter in the exhaust of the engine, a second purification device that removes nitrogen oxides in the exhaust gas of the engine, and a cooling fan and a radiator all positioned at a rear of the engine and within the hood, the radiator being rearward of and proximate to the cooling fan wherein
   the first and second purification devices are positioned behind the operating seat a length of each along which gas flows therein being parallel to the other and oblique with respect to an output shaft of the engine, and
   the first purification device is mounted on top of a first support frame positioned above the cooling fan, and the second purification device is mounted on top of a second support frame positioned above the radiator, the second purification device being positioned more toward the rear of the engine than the first purification device, and
   wherein the second support frame is positioned higher than the first support frame with respect to the cooling fan, and the second purification device is positioned higher than the first purification device with respect to the cooling fan.

2. The engine device according to claim 1,
   wherein the first and second purification devices are arranged so that the exhaust gas circulates from the first purification device to the second purification device, and
   wherein a reducing agent mixing pipe that connects an exhaust gas outlet pipe of the first purification device to an exhaust gas inlet pipe of the second purification device is provided in such a manner that respective transfer directions of the exhaust gas in the first purification device and the second purification device are identical, and
   wherein the reducing agent mixing pipe is configured for the injection of a reducing agent into the reducing agent mixing pipe.

3. The engine device according to claim 1,
   wherein an exhaust gas inlet side of the first gas purification device is connected to an exhaust manifold of the engine via an exhaust connecting pipe, and wherein an exhaust temperature increasing mechanism configured to increase a temperature of the exhaust gas leading to the first gas purification device is provided in a midway portion of the exhaust connecting pipe,
   and in the engine, an air cleaner is connected to an inlet facing right-and-left inner lateral surface of the hood through an intake pipe extending toward the rear of the engine, and the air cleaner is positioned away from the first and second gas purifying devices, and toward the rear of the engine.

4. The engine device according to claim 1, wherein the first and second purification devices are arranged so that the exhaust gas circulates from the first purification device to the second purification device, and wherein a reducing agent mixing pipe that connects an exhaust gas outlet pipe of the first purification device to an exhaust gas inlet pipe of the second purification device is provided in such a manner that respective transfer directions of the exhaust gas in the first purification device and the second purification device are identical, and wherein the reducing agent mixing pipe is configured for the injection of a reducing agent into the reducing agent mixing pipe.

5. The engine device according to claim 1, wherein the first and second gas purifying devices together comprise a combined gas purification device which is located on a first side of the engine and wherein the air cleaner is positioned facing a second side of the engine.

6. An engine device mounted on a work machine in which an operating seat is arranged on a hood provided in a rear of a travelling machine body, and an engine is arranged in the hood, comprising:
an exhaust manifold configured to be provided on one right-and-left lateral surface of the engine and configured to include an exhaust gas outlet above; and
an exhaust gas purification device configured to be supported above the exhaust manifold and configured to purify exhaust gas of the engine by coupling an exhaust gas outlet side of the exhaust manifold with an exhaust gas inlet side of the exhaust manifold,
wherein the exhaust gas purification device is arranged parallel to one lateral surface of the engine between a head cover of the engine and one right-and-left inner lateral surface of the hood, and wherein the work machine comprises a heat exchanger in a rear of the engine facing a cooling fan provided on the engine, the heat exchanger being supported by a support member bridging a left and right side walls of a body frame of the traveling machine body, and wherein a portion of the exhaust gas purification device is arranged above an upper side of the support member, while an air cleaner is arranged below the upper side of the support member.

7. The engine device according to claim 6,
wherein the exhaust gas purification device is supported by support bodies coupled with a cylinder head of the engine, and
wherein the support bodies are a first bracket leg fixed on a side of a cooling fan of the engine and a second bracket leg fixed on a side of a flywheel housing of the engine, and
wherein the second bracket leg supports an upstream side in a transfer direction of the exhaust gas in the exhaust gas purification device, and the first bracket leg supports a downstream side in the transfer direction of the exhaust gas in the exhaust gas purification device, and
wherein the exhaust gas purification device couples with the exhaust manifold at a position between the first bracket leg and the second bracket leg.

8. The engine device according to claim 6, wherein the exhaust gas purification device is located on a first side of the engine and wherein the air cleaner is positioned facing a second side of the engine.

9. The engine device according to claim 6, wherein the air cleaner is connected to an inlet facing right-and-left inner lateral surface of the hood through an intake pipe extending toward the rear of the engine, and wherein the air cleaner is positioned away from the first and second gas purifying devices and toward the rear of the engine.

* * * * *